United States Patent
Deenoo et al.

(10) Patent No.: US 10,813,085 B2
(45) Date of Patent: Oct. 20, 2020

(54) DOWNLINK CONTROL CHANNEL DESIGN AND SIGNALING FOR BEAMFORMED SYSTEMS

(71) Applicant: IDAC HOLDINGS, INC., Wilmington, DE (US)

(72) Inventors: Yugeswar Deenoo, King of Prussia, PA (US); Tao Deng, Roslyn, NY (US); Kyle Jung-Lin Pan, Saint James, NY (US); Moon-il Lee, Melville, NY (US); Ravikumar V. Pragada, Warrington, PA (US); Janet A. Stern-Berkowitz, Little Neck, NY (US); Mihaela C. Beluri, Jericho, NY (US)

(73) Assignee: IDAC HOLDINGS, INC., Wilmington, DE (US)

(*) Notice: Subject to any disclaimer, the term of this patent is extended or adjusted under 35 U.S.C. 154(b) by 85 days.

(21) Appl. No.: 15/775,028

(22) PCT Filed: Nov. 10, 2016

(86) PCT No.: PCT/US2016/061324
§ 371 (c)(1),
(2) Date: May 10, 2018

(87) PCT Pub. No.: WO2017/083514
PCT Pub. Date: May 18, 2017

(65) Prior Publication Data
US 2018/0310283 A1    Oct. 25, 2018

Related U.S. Application Data

(60) Provisional application No. 62/253,599, filed on Nov. 10, 2015.

(51) Int. Cl.
*H04L 12/801*  (2013.01)
*H04L 12/24*  (2006.01)
(Continued)

(52) U.S. Cl.
CPC ......... *H04W 72/042* (2013.01); *H04L 5/0048* (2013.01); *H04L 5/0053* (2013.01);
(Continued)

(58) Field of Classification Search
CPC .............. H04W 72/042; H04W 72/046; H04L 5/0053; H04L 5/0048
See application file for complete search history.

(56) References Cited

U.S. PATENT DOCUMENTS

2012/0078933 A1*  3/2012  Kim ..................... H04L 5/0053
                                                                            707/758
2013/0058285 A1   3/2013  Koivisto et al.
(Continued)

FOREIGN PATENT DOCUMENTS

CN    104468030 A    3/2015
TW    201434301 A    9/2014
(Continued)

OTHER PUBLICATIONS

3rd Generation Partnership Project (3GPP), TR 36.814 V9.0.0, "Technical Specification Group Radio Access Network, Evolved Universal Terrestrial Radio Access (E-UTRA), Further Advancements for E-UTRA Physical Layer Aspects (Release 9)", Mar. 2010, 104 pages.
(Continued)

*Primary Examiner* — Faruk Hamza
*Assistant Examiner* — Abusayeed M Haque
(74) *Attorney, Agent, or Firm* — Yin Shao

(57) ABSTRACT

Transmit and/or receive beamforming may be applied to the control channel transmission/reception, e.g., in mmW access link system design. Techniques to identify candidate control channel beams and/or their location in the subframe structure may provide for efficient WTRU operation. A framework for beam formed control channel design may support
(Continued)

varying capabilities of mBs and/or WTRUs, and/or may support time and/or spatial domain multiplexing of control channel beams. For a multi-beam system, modifications to reference signal design may discover, identify, measure, and/or decode a control channel beam. Techniques may mitigate inter-beam interference. WTRU monitoring may consider beam search space, perhaps in addition to time and/or frequency search space. Enhancements to downlink control channel may support scheduling narrow data beams. Scheduling techniques may achieve high resource utilization, e.g., perhaps when large bandwidths are available and/or WTRUs may be spatially distributed.

20 Claims, 28 Drawing Sheets

(51) Int. Cl.
*H04L 5/14* (2006.01)
*H04L 29/06* (2006.01)
*H04W 72/04* (2009.01)
*H04L 5/00* (2006.01)

(52) U.S. Cl.
CPC ......... *H04W 72/046* (2013.01); *H04L 5/0007* (2013.01); *H04L 5/0069* (2013.01)

(56) References Cited

U.S. PATENT DOCUMENTS

| | | | |
|---|---|---|---|
| 2013/0188577 A1* | 7/2013 | Papasakellariou | H04L 5/0023 370/329 |
| 2013/0286960 A1 | 10/2013 | Li et al. | |
| 2014/0128109 A1 | 5/2014 | Li et al. | |
| 2014/0177607 A1 | 6/2014 | Li et al. | |
| 2014/0185530 A1* | 7/2014 | Kuchibhotla | H04W 76/14 370/329 |
| 2014/0204781 A1* | 7/2014 | Horvat | H04W 24/00 370/252 |
| 2014/0204868 A1 | 7/2014 | Lin | |
| 2014/0314007 A1* | 10/2014 | Chen | H04B 7/00 370/329 |
| 2015/0131750 A1* | 5/2015 | Xue | H04B 7/0452 375/267 |
| 2016/0050004 A1* | 2/2016 | Mallik | H04L 1/0026 370/329 |
| 2017/0013565 A1* | 1/2017 | Pelletier | H04W 52/343 |
| 2017/0164363 A1 | 6/2017 | Zhang et al. | |
| 2018/0242280 A1* | 8/2018 | Axmon | H04L 41/0823 |

FOREIGN PATENT DOCUMENTS

| | | |
|---|---|---|
| WO | WO 2013/069960 A1 | 5/2013 |
| WO | WO 2014104758 A1 | 7/2014 |
| WO | WO 2015/109153 A1 | 7/2015 |
| WO | WO 2015/157565 A1 | 10/2015 |
| WO | WO 2016/086144 A1 | 6/2016 |
| WO | WO 2016/095984 A1 | 6/2016 |
| WO | WO 2017123938 A1 | 7/2017 |

OTHER PUBLICATIONS

3rd Generation Partnership Project (3GPP), TR 36.872 V12.0.0, "Technical Specification Group Radio Access Network, Small Cell Enhancements for E-UTRA and E-UTRAN Physical Layer Aspects (Release 12)", Sep. 2013, 78 pages.
3rd Generation Partnership Project (3GPP), TR 36.942 V11.0.0, "Technical Specification Group Radio Access Network, Evolved Universal Terrestrial Radio Access (E-UTRA), Radio Frequency (RF) System Scenarios (Release 11)", Sep. 2012, 109 pages.
3rd Generation Partnership Project (3GPP), TS 36.211 V11.0.0, "Technical Specification Group Radio Access Network, Evolved Universal Terrestrial Radio Access (E-UTRA), Physical Channels and Modulation (Release 11)", Sep. 2012, 106 pages.
3rd Generation Partnership Project (3GPP), TS 36.213 V11.0.0, "Technical Specification Group Radio Access Network, Evolved Universal Terrestrial Radio Access (E-UTRA), Physical Layer Procedures (Release 11)", Sep. 2012, 143 pages.
3rd Generation Partnership Project (3GPP), TS 36.321 V11.0.0, "Technical Specification Group Radio Access Network, Evolved Universal Terrestrial Radio Access (E-UTRA), Medium Access Control (MAC) Protocol Specification (Release 11)", Sep. 2012, 55 pages.
3rd Generation Partnership Project (3GPP), TS 36.331 V11.0.0, "Technical Specification Group Radio Access Network, Evolved Universal Terrestrial Radio Access (E-UTRA), Radio Resource Control (RRC), Protocol Specification (Release 11)", Jun. 2012, 302 pages.
Dahlman et al., "Scheduling, Link Adaptation, and Hybrid ARQ", 4G LTE/LTE-Advanced for Mobile Broadband, Mar. 29, 2011, pp. 79-93.
Raaf et al., "Vision for Beyond 4G Broadband Radio Systems", IEEE 22nd International Symposium on Personal, Indoor and Mobile Radio Communications, 2011, pp. 2369-2373.
Rappaport et al., "Millimeter Wave Mobile Communications for 5G Cellular: It Will Work!", IEEE Access Journal, vol. 1, No. 1, May 10, 2013, pp. 335-349.
Rappaport, Theodore S., "Wireless Communications: Principles and Practice", 2nd Edition, Prentice Hall, 2002, 332 pages.
Sesia et al., LTE-The UMTS Long Term Evolution: From Theory to Practice, John Wiley & Sons, Ltd., 1st edition, 2009, 628 pages.

* cited by examiner

DOWNLINK CONTROL CHANNEL DESIGN AND SIGNALING FOR BEAMFORMED SYSTEMS

CROSS-REFERENCE TO RELATED APPLICATIONS

This application is the National Stage Entry under 35 U.S.C. § 371 of Patent Cooperation Treaty Application PCT/US2016/061324, filed Nov. 10, 2016, which claims the benefit of U.S. Provisional Patent Application No. 62/253,599, filed on Nov. 10, 2015, the entire contents of all of which being incorporated by reference as if fully set-forth herein, for all purposes.

BACKGROUND

Small Cell mmW eNB (SCmB) deployment may be based on the 3GPP R12 small cell deployment. The mmW operation may be performed by one or more network nodes. A Small Cell mmW eNB (SCmB) may be an LTE small cell eNB capable of operating an mmW air interface, perhaps with an LTE air interface in the downlink.

An mmW WTRU (mWTRU) may be capable of operating in LTE and mmW air interface. The mWTRU may have one or more sets of antennas and/or the accompanied Radio Frequency (RF) chains, perhaps one operating in the LTE band and/or in the mmW frequency band.

SUMMARY

Initial mmW access link system design may focus on cellular system procedures that enable add-on mmW data transmission (e.g., at least downlink transmission) to an existing network such as a small cell LTE network. Transmit and/or receive beamforming may be applied to the control channel transmission/reception, e.g., to overcome high path loss at >6 Ghz frequencies. Techniques to identify candidate control channel beams and/or their location in the subframe structure may provide for efficient WTRU operation. A framework for beam formed control channel design may support varying capabilities of mBs and/or WTRUs, and/or may support time and/or spatial domain multiplexing of control channel beams. Modifications to reference signal design may discover, identify, measure, and/or decode one or more, or each, control channel beam, for example for a multi-beam system, among other scenarios. Techniques may mitigate inter-beam interference. WTRU monitoring may consider beam search space in addition to time and/or frequency search space. Techniques to downlink control channel may support scheduling narrow data beams. Scheduling mechanisms may achieve (e.g., high) resource utilization, e.g., perhaps when large bandwidths may be available and/or WTRUs may be spatially distributed.

For example, one or more beam specific control channels may be utilized. The beam specific control channels may utilize a fixed mapping in a frame structure. For example, a beam specific control channel may be mapped to a fixed symbol and/or a fixed subframe in the frame structure. For example, a flexible mapping may be used for the beam specific control channels within the frame structure.

For example, a WTRU-specific and/or beam-specific search space may be used for transmitting and/or receiving control channels. The WTRU-specific and/or beam-specific search space may be associated with serving control channel(s) assignments. The WTRU-specific and/or beam-specific search space may be utilized in a WTRU monitoring procedure. For example, the WTRU may be configured to determine a beam specific search space size (e.g., in terms of subframe and symbol location). A WTRU may be configured to determine a WTRU-specific search space within a beam and/or beam-specific search space.

A WTRU and/or based station may be configured to perform methods for resource allocation for sub-subframe scheduling. For example, sub-subframe scheduling may allow multiple allocations in a given subframe. For example, sub-subframe scheduling may be performed such that multiplexing (e.g., TDM) WTRUs with different downlink beams within a given subframe may be utilized.

A WTRU may be configured to identify the downlink data beam that an mB may use for the WTRU. For example, the WTRU may be configured to switch the receive beam used for downlink data based on one or more parameters. For example, the WTRU may be configured to switch the receive beam used for downlink data based on resource allocation information. For example, the WTRU may be configured to switch the receive beam used for downlink data independently from the received resource allocation information. For example, beam combining may be used for the DL and/or UL.

A wireless transmit/receive unit (WTRU) may be configured for wireless communication. The WTRU may comprise a memory. The WTRU may comprise a processor. The processor configured with at least one or more search spaces. The one or more search spaces may be configured to provide for at least one of: a monitor of one or more Downlink (DL) control channels, and/or a receipt of the one or more DL control channels. At least one search space of the one or more search spaces may correspond to at least one reference signal of one or more reference signals. The processor may be configured at least to monitor at least a part of a control region for at least one reference signal of the one or more reference signals. The processor may be configured to detect the at least one reference signal in the at least part of the control region. The processor may be configured to monitor the at least one search space corresponding to the at least one reference signal for at least one DL control channel upon the detection of the at least one reference signal.

BRIEF DESCRIPTION OF THE DRAWINGS

FIG. 12 is an example of Physical Downlink Control Channel (PDCCH) Type 1a.

FIG. 15 is an example of PDCCH Type 3a.

DETAILED DESCRIPTION

Figure 1:
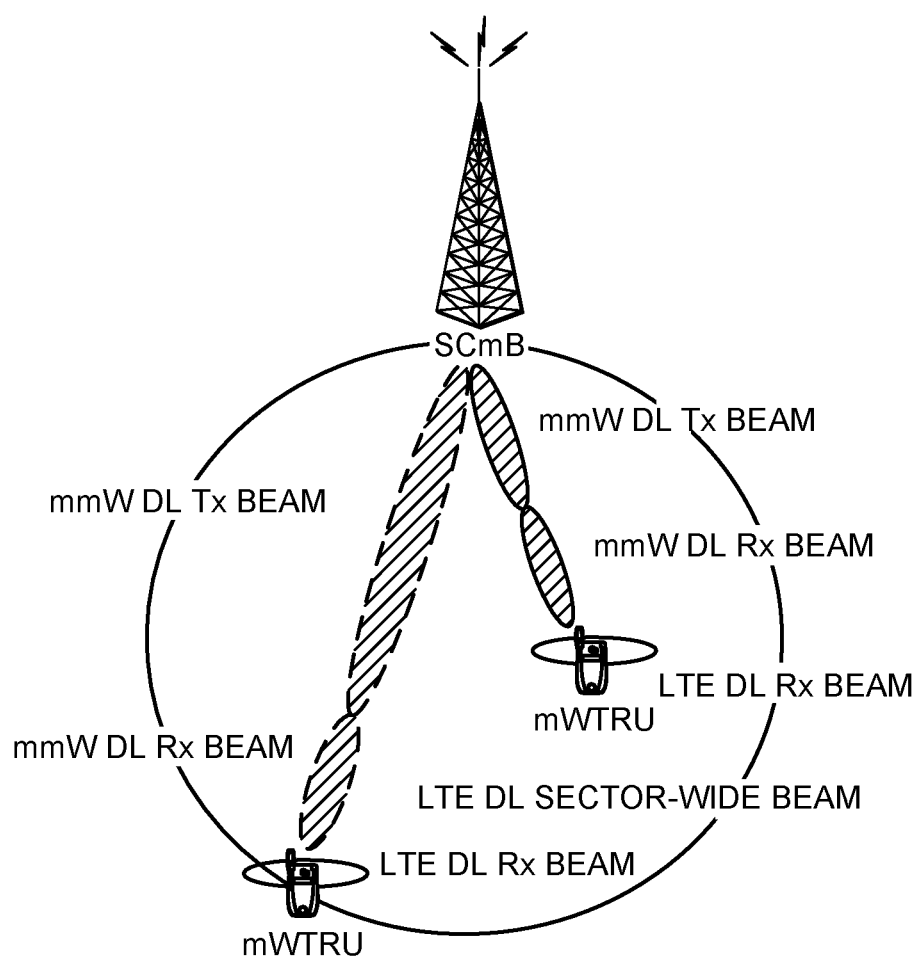
FIG. 1 is an example of mmW Small Cell Deployment.

A detailed description of illustrative embodiments will now be described with reference to the various figures. Although this description provides a detailed example of possible implementations, it should be noted that the details are intended to be examples and in no way limit the scope of the application.

An mmW deployment may be used, e.g., based on a 3GPP R12 small cell deployment perhaps with an extension of a LTE carrier aggregation scheme. An example is a Small Cell mmW eNB (SCmB) deployment. The SCmB may be based on the 3GPP R12 small cell deployment. The mmW operation may be performed by one or more of the following network nodes. A LTE small cell eNB may be capable of operating an mmW air interface, for example in parallel with a LTE air interface in the downlink. The SCmB may simultaneously transmit LTE downlink channels in a wide beam pattern and/or mmW channels in narrow beam pattern(s), e.g., when it is equipped with advanced antenna configuration and/or beamforming technique(s). The SCmB may support features and/or procedures in a LTE uplink (UL) operation, e.g., to support mmW wireless transmit/receive units (WTRUs) without mmW uplink transmission. A wireless transmit/receive unit (WTRU) that is capable of operating an mmW air interface, possibly in parallel with a non-mmW LTE system, may be referred to as an mmW wireless transmit/receive unit (mWTRU) and/or an mmW user equipment (mUE). A mWTRU and/or a mUE may be used interchangeably herein. A WTRU may be used herein to refer to an mWTRU.

For example, an mWTRU may comprise antennas (e.g., two or more sets) and/or accompanied RF chains, some operating in a LTE band and/or some for operation in an mmW frequency band. The antennas and/or accompanied RF chains may perform independent baseband processing functions, although portions of the antennas and/or RF chains may share some hardware and/or functional blocks. For example, the baseband functions may share certain hardware blocks, e.g., when the mmW air interface bears similarity with the LTE system.

For example, mmW channels may be used as an extension of a LTE carrier aggregation scheme. One or more mmW channels may be a carrier type in the mmW frequency band. One or more mmW channels may apply a different air interface and/or legacy LTE. The one or more mmW channels may be of opportunistic use for high-throughput and/or low-latency traffic data application(s).

LTE channels may carry control signaling, e.g., system information update, paging, Radio Resource Control (RRC) and/or Non-Access Stratum (NAS) signaling (signaling radio bearers), and/or multicast traffic may be carried. LTE channels may be used to carry mmW Layer 1 (L1) control signaling.

The SCmB and/or mWTRU may employ narrow beamforming, e.g., in non-line of sight (NLOS) at mmW frequency band, perhaps for example due to relatively high propagation loss associated with mmW band. Employing narrow beamforming may provide for a (e.g., sufficient) link budget for high-throughput and/or low-latency data transmission.

Transmitting and/or receiving narrow beam pairing may be used. For example, at least a consistent coverage with a cell-radius of up to 200 meters may be achieved at 28 GHz and/or 38 GHz in urban areas by using a steerable 10°-beamwidth and/or a 24.5-dBi horn antenna for transmitting and/or receiving.

To meet the high data rate required for the next generation of cellular communication systems, the wireless industry and/or academia have been exploring ways to leverage the large bandwidths available at above-6 GHz frequencies, e.g. at cmW and/or mmW frequencies. The large bandwidth available at these frequencies may provide capacity improvement for user-specific data transmission. One challenge of using these above-6 GHz frequencies may be characteristics related to their propagation which may be unfavorable for wireless communication, especially in an outdoor environment. For example, higher frequency transmissions may experience higher free space path loss. Rainfall and/or atmospheric gasses, e.g., oxygen, may add further attenuation and/or foliage may cause attenuation and/or depolarization. Narrow beam patterns which may be used to counter these losses may pose challenges for a base station (e.g., eNB), for example, in delivering cell-specific and/or broadcast information.

FIG. 1 depicts an example of a SCmB deployment. SCmB may use narrow beams for downlink transmissions. One or more mWTRUs may use receive-side narrow beams for receiving the downlink transmissions. SCmB and/or mWTRUs may apply broad beam pattern for the traditional LTE operation including cell search, random access, and/or cell selection/reselection etc.

Figure 2:
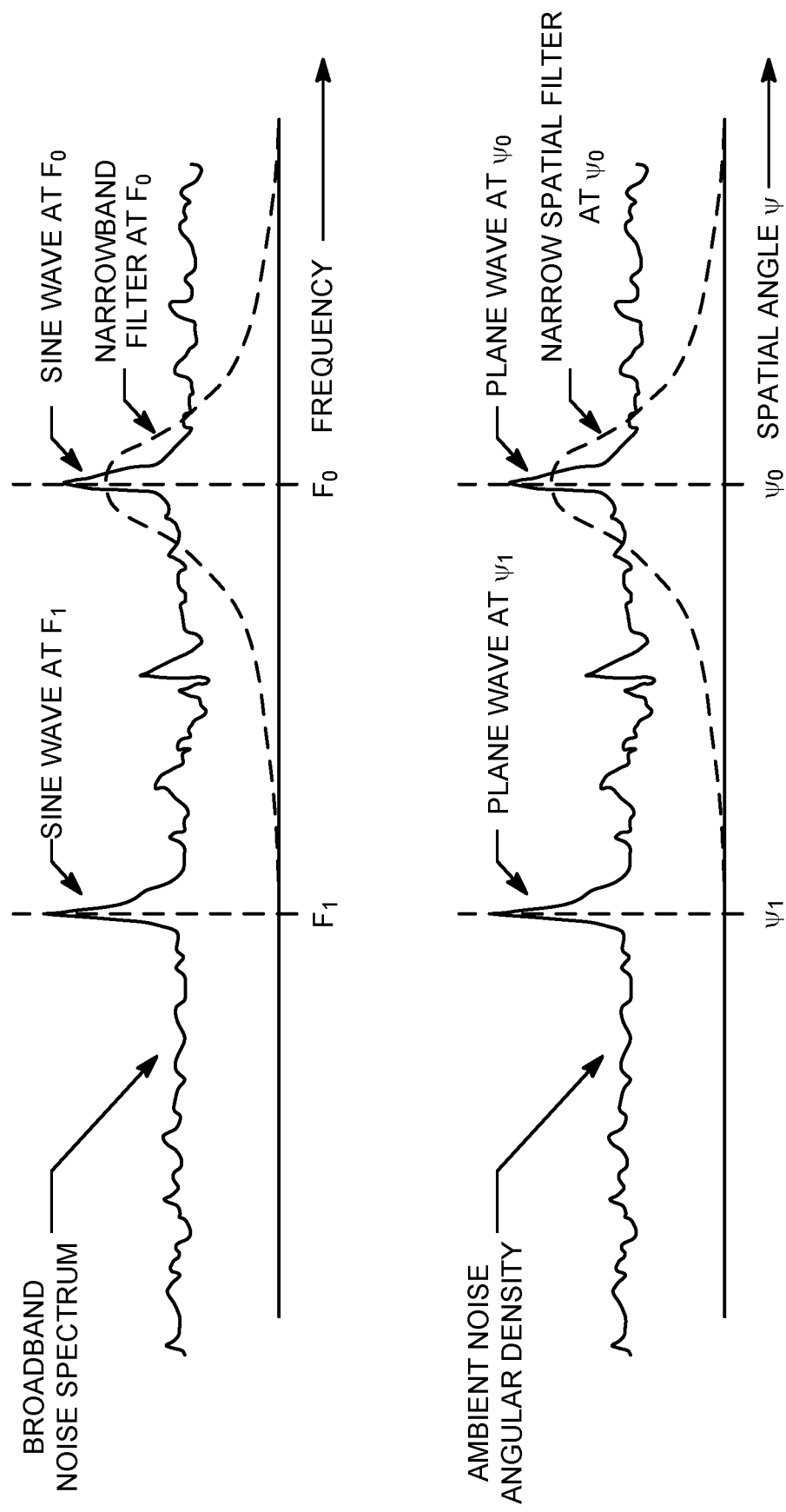
FIG. 2 is an example of Comparison of Frequency and Spatial Filtering.

FIG. 2 is an example of the mWTRU receive beamforming, for example, using narrow spatial filtering. FIG. 2 includes an example comparison with a frequency domain filtering to demonstrate the effect of a spatial and/or angular filtering.

The spatial filtering may allow an mWTRU to detect a channel impulse response at a distinct angular direction captured by the narrow receive beam, perhaps for example similar to a frequency filtering removing unwanted frequency components. This may result in a flat effective channel by excluding angular incoming paths outside of its beamwidth. An R12 LTE WTRU may be assumed to have an omni-directional receive beam pattern and/or may perceive a superimposed channel impulse response over the entire angular domain. An aligned mmW transmit and receive beam pair may provide a degree of freedom in the angular domain compared with the current LTE system.

An mmW system (e.g., a downlink system) design may focus on integrating directivity, e.g., the directivity of a narrow transmit and/or receive beam pair, into a cellular system which may include L1 control signaling, data scheduling, narrow beam pairing, beam measurement, and/or L1 control information feedback, etc.

Some examples of mmW system parameters and/or assumptions are described herein. The parameters and/or assumptions may change, for example, depending on the type of deployment. These parameters and/or assumptions are not intended to be limiting but serve to illustrate example set(s) of parameters and/or assumptions of an example mmW system. The parameters and/or assumptions may be utilized in various combinations.

For example, an example carrier frequency for mmW operation may be 28 GHz. This is an example system numerology. Similar designs may be extended to other mmW frequencies, e.g., 38 GHz, 60 GHz, 72 GHz, etc. A system bandwidth may be a variable (e.g., per carrier), for example up to a specific maximum system bandwidth. For example, 1 GHz may be used as the maximum system bandwidth with carrier aggregation perhaps being used to achieve higher overall bandwidth. An estimated RMS delay spread may be 100-200 ns with narrow beam pattern. A latency may be 1 ms. A waveform may be OFDM-based or broad-band-single-carrier-based. For example, dual connectivity may be based on LTE Small Cell eNB with mmW add-on channels and two separate antennas and/or RF chains connected to two different antenna solutions. A system design parameter may be to achieve DL data rates of 30 Mbit/s for at least 95% of mWTRUs, although other design goals may be used. A mobility may be optimized data connection at 3 km/h and/or maintain connection at 30 km/h. A coverage may meet data rate and/or mobility requirement with less than 100-m cell radius.

One or more waveforms such as broad-band Cyclic Prefixed Single Carrier (CP-SC), OFDM, SC-OFDM, MC-CDMA, Generalized OFDM, FBMC, and/or other may be used for the air interface of a system, e.g, an above-6 GHz system (e.g., cmW and/or mmW). Frame structure for the system may depend on the applied waveform. A Transmission Time Interval (TTI) length such as 100 us may be used, e.g., to achieve low latency. A system bandwidth, e.g., one in the range of 50 MHz to 2 GHz may be used, for example, to achieve high data rates.

An mmW frame structure of an OFDM-based waveform may offer flexibility in coordination between the LTE and mmW channels and/or may enable common functional block sharing in a mWTRU device. For example, an mmW sampling frequency may be selected as an integer multiple of the LTE minimum sampling frequency of 1.92 MHz, which may lead to an mmW OFDM sub-carrier spacing $\Delta f$ being an integer multiple of the LTE sub-carrier spacing of 15 kHz, e.g. $\Delta f = 15*K$ kHz. The selection of the integer multiple K and/or the resulting $\Delta f$ may take into consideration the sensitivity to the Doppler shift, different types of frequency errors, and/or the ability to remove channel time dispersion, and/or the like. The orthogonality between sub-carriers may deteriorate and/or inter-sub-carrier interference (ISI) may increase, perhaps for example when the Doppler shift increases in proportion to the sub-carrier spacing.

For example, the maximum Doppler shift at 30 km/h and 28 GHz may be approximately 778 Hz. Example 28-GHz channel time dispersion measurements in dense urban area may indicate an RMS delay spread σ that may be between 100 and 200 ns for up to 200-m cell radius. The 90% coherence bandwidth may be estimated at $1/50\sigma$ of 100 kHz and the 50% coherence bandwidth at $1/5\sigma$ of 1 MHz.

A sub-carrier spacing $\Delta f$ between 100 kHz and 1 MHz may be reasonable. A sub-carrier spacing of 300 kHz (K=20) may be robust against Doppler shift and/or other types of frequency error and/or reduce implementation complexity. The corresponding symbol length ($1/\Delta f$) may be approximately 3.33 us.

A cyclic prefix (CP) length may be configured to span over the entire length of the channel time dispersion in order to eliminate the inter-symbol-interference. For example, a CP may or might not carry useful data, and/or in some scenarios a long CP may cause excessive system overhead. One example of CP length for a $T_{symbol}$ of 3.33 us may be selected at $1/14$ of $T_{symbol}$, 0.24 us and/or the corresponding CP overhead may be 7% as calculated by $T_{CP}/(T_{CP}+T_{symbol})$.

The TTI length of the mmW transmission may be reduced compared to the 1-ms TTI length of the LTE system, perhaps for example to achieve low latency. In some scenarios, it may be beneficial to have an mmW sub-frame length of 1 ms to align with the LTE 1-ms sub-frame timing. The mmW sub-frame may contain multiple mmW TTIs whose length may be tied to other parameters, e.g., sub-carrier spacing, symbol length, CP length, and/or FFT size, etc.

Based on these and/or other considerations, an example with a conservative CP length (4× channel delay spread) is summarized in Table 1. It may be assumed that CP length selection is based on the delay spread over potential mmW frequency band of lower than 200 ns.

TABLE 1

Example mmW Downlink OFDM Numerology

| OFDM Numerology Parameters | | | | |
|---|---|---|---|---|
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |

TABLE 1-continued

Example mmW Downlink OFDM Numerology

| OFDM Numerology Parameters | | | | |
|---|---|---|---|---|
| Occupied bandwidth (MHz) | 115.2 | 230.4 | 460.8 | 921.6 |
| IDFT(Tx)/DFT(Rx) size | 512 | 1024 | 2048 | 4096 |
| OFDM symbol duration (us) | 3.333 | 3.333 | 3.333 | 3.333 |
| CP length (ratio to symbol length) | ¼ | ¼ | ¼ | ¼ |
| CP length (us) | 0.833 | 0.833 | 0.833 | 0.833 |
| Number of symbols per slot | 24 | 24 | 24 | 24 |
| Slot duration (TTI) (us) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64QAM (Mbps) | 442.368 | 884.736 | 1769.472 | 3538.944 |
| Spectral efficiency | 3.538944 | 3.538944 | 3.538944 | 3.538944 |

Figure 3:
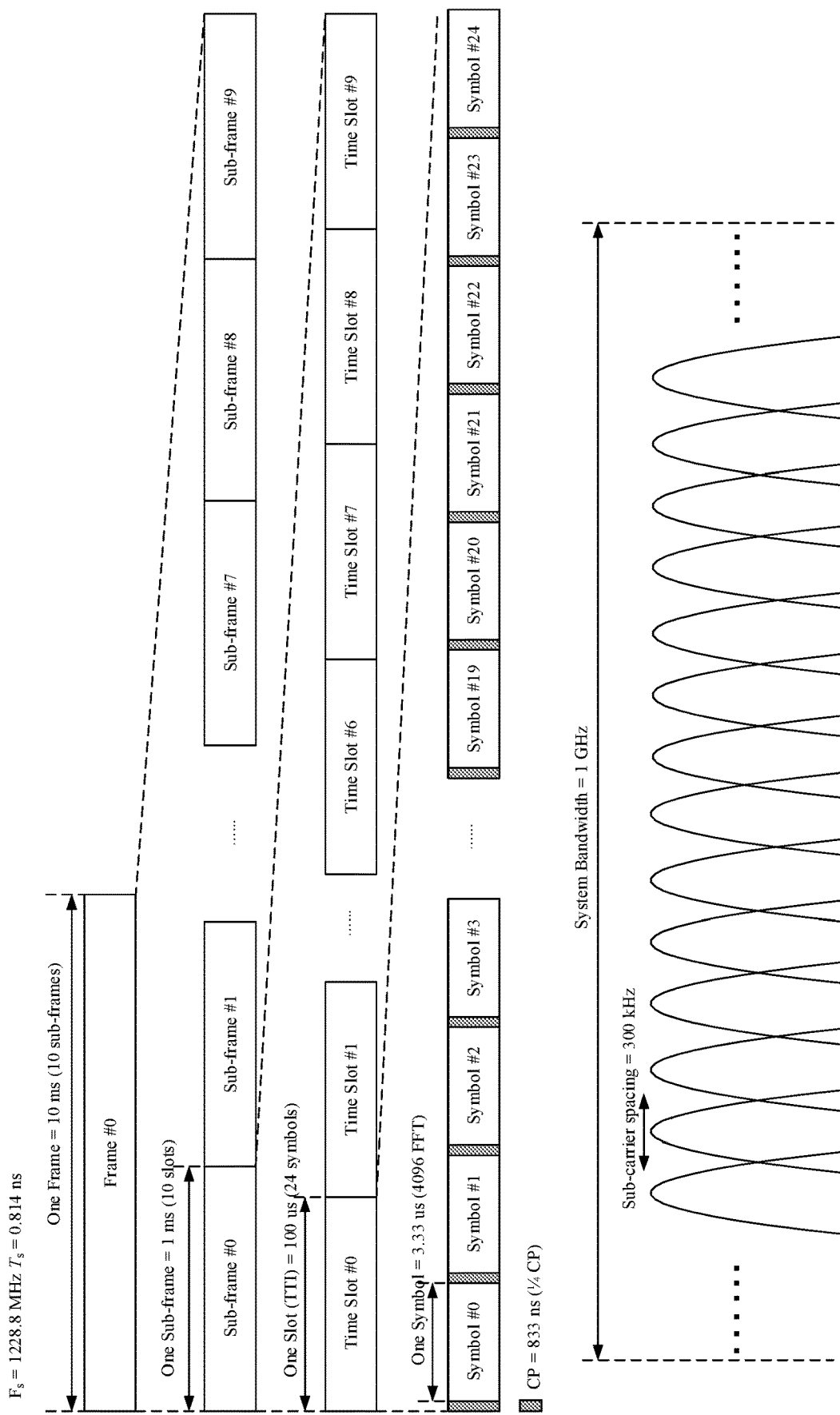
FIG. 3 is an example of an OFDM Frame Structure.

FIG. 3 depicts an example OFDM-based frame structure. In FIG. 3, the system bandwidth may be 1 GHz and/or a sub-carrier spacing of 300 kHz may be used with a corresponding symbol length of 3.33 us. An example cyclic prefix (CP) length of ¼ of $T_{symbol}$ which equals 0.833 us may be used.

Some of the frame structure examples presented herein may be based on an assumption that an OFDM-based mmW waveform, which may be incorporated into the OFDM-based LTE small cell network. The system procedures described herein may be equally applicable to numerous types of frame designs and/or should not be interpreted to be bound by this specific frame structure and/or may be applied to other waveform candidates.

The SCmB and/or mWTRU deployments may employ one or more of the following mmW physical layer channels and/or reference signals, for example, rather than and/or in addition to the LTE physical channels.

An SCmB and/or an mWTRU may employ a unique sequence transmitted per transmit beam, e.g., a Beam-Specific Reference Signal (BSRS), used for beam acquisition, timing/frequency synchronization, channel estimation for a Physical Downlink Directional Control Channel (PDDCCH), beam tracking and/or measurement, etc. The BSRS may carry implicitly beam identity information including BSRS sequence index. There may be different types of BSRSs. The BSRS resource allocation may be pre-defined.

An SCmB and/or an mWTRU may employ a unique sequence scheduled and/or transmitted dynamically for the purpose of beam pair measurement specific for a given antenna port, e.g., an Adaptive Antenna Reference Signal (AARS). The AARS may embed implicitly the beam identity information in the sequence index and/or carry a small payload including the same information.

An SCmB and/or an mWTRU may utilize a Physical Downlink Directional Control Channel (PDDCCH). The PDDCCH may carry some or all data related control information for an mWTRU to identify, demodulate and/or decode an associated Physical Downlink Directional Data Channel (PDDDCH) correctly. The PDDCCH may be carried in an mmW narrow beam and/or in a broad beam and/or may be applied for different multiple access. For example, there may be a common PDDCCH transmitted in downlink mmW broad beam covering a sector and/or cell and/or a dedicated PDDCCH transmitted (e.g., transmitted) in a narrow beam pair, for example, when mWTRU-specific data transmission is on-going. The dedicated PDDCCH may carry scheduling information for its associated PDDDCH on a per-TTI basis and/or may or might not carry beam specific information. A common PDDCCH may include cell-specific information including sector/segment identity and/or beam identity. In addition, an mWTRU may read the common PDDCCH to determine if it is scheduled for narrow beam pairing procedure in order to begin narrow beam data transmission subsequently.

An SCmB and/or an mWTRU may utilize a Physical Downlink Directional Data Channel (PDDDCH). The PDDDCH may carry payload information received in the form of MAC PDU from mmW MAC layer. The resource allocation of this channel may be determined by the downlink scheduling information carried in PDDCCH. The PDDDCH intended for a mWTRU may be transmitted in a narrow Tx beam and/or received in a properly paired narrow Rx beam, e.g., a narrow beam pair. Due to this spatial isolation, PDDDCHs for different WTRUs in different beam pairs may reuse a combination of one or more time, frequency, and/or code resource(s). Multiple PDDDCH may also operate in one beam pair using multiple access in one or more of the time, frequency, code domain, and/or the like. A common PDDDCH may be used to carry data in broad mmW antenna pattern associated with the common PDDCCH.

An SCmB and/or an mWTRU may utilize symbols embedded in a transmission for channel estimation for PDDDCH, e.g., a Demodulation Reference Signal (DMRS). For example, the DMRS may be placed in the time and/or frequency domain according to pre-defined pattern to ensure correct interpolation and/or reconstruction of the channel.

Figure 4:
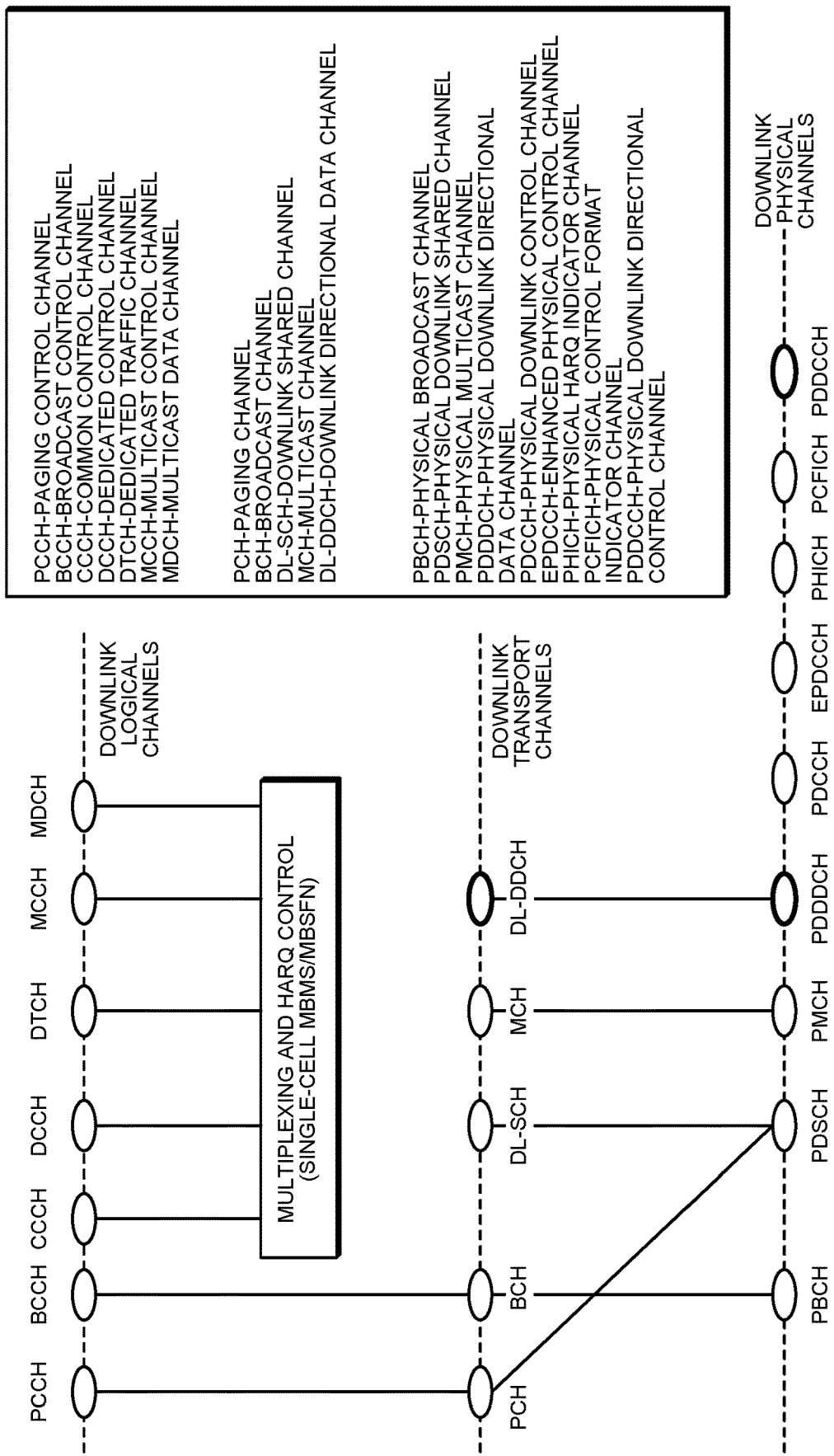
FIG. 4 is an example of an mmW Downlink Logical, Transport and Physical Channel.

Some or all channels and/or reference signals in a narrow beam pair may be beamformed identically and/or considered to be transmitted via a specific and/or single physical antenna port. Although carrying broadcast and/or multicast information on a narrow beam can be utilized, given the directivity of the transmission of these channels, carrying broadcast, multicast, and/or other cell-specific information on the narrow beam may or might not be optimal application. The SCmB deployment with mmW downlink data transmission may adopt a channel mapping as illustrated in FIG. 4 and the mmW channels are marked in bolder line color.

An mWTRU may use a phase antenna array to achieve the beamforming gain, for example, in order to compensate the high path loss at mmW frequencies. At the mmW frequencies the short wavelength may allow a compact form factor of the device design. A large spacing such as 0.7λ may be applied, for example. An element spacing of 0.5λ may be used in theoretical performance analysis.

Figure 5:
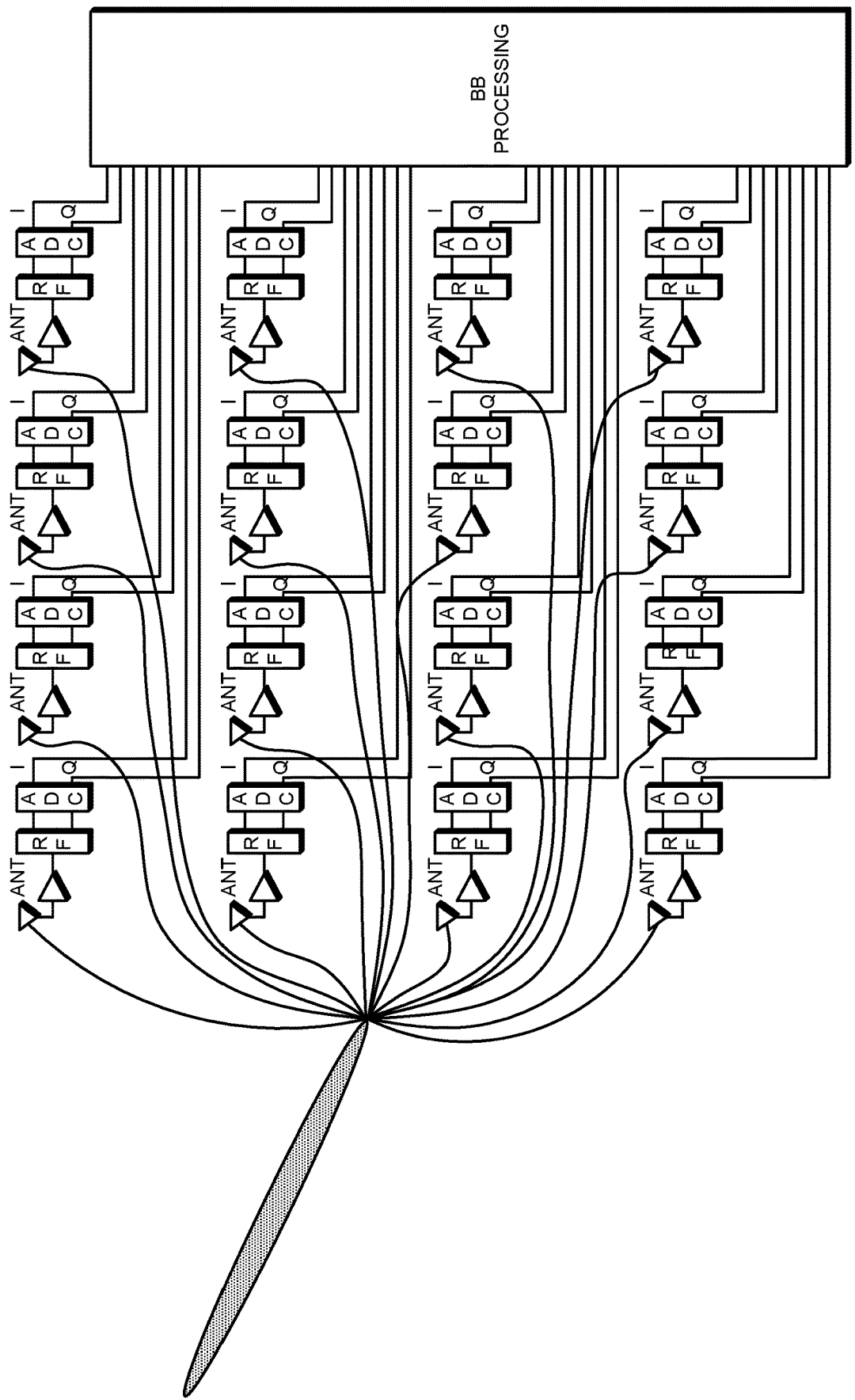
FIG. 5 is an example of an mWTRU Fully Digitized Beamforming.

The phase antenna may apply one or more different beamforming methods. For example, a fully digitized beamforming approach may have a dedicated RF chain. For example, the RF chain may include RF processing and/or analog-to-digital conversion (ADC) as depicted in FIG. 5 for an antenna element. The signal processed by an antenna element may be controlled independently in phase and/or amplitude to optimize the channel capacity.

The configuration may have the same number of RF chains and ADCs as that of antenna elements. The mWTRU antenna may offer (e.g., very) high performance. The mWTRU antenna configuration may impose costs and/or complexity in implementation. The mWTRU antenna configuration may cause high energy consumption in operation. Fully digitized beamforming may or might not be adopted in the initial 5G deployments and/or mWTRU implementations, but may be used in future releases.

Figure 6:
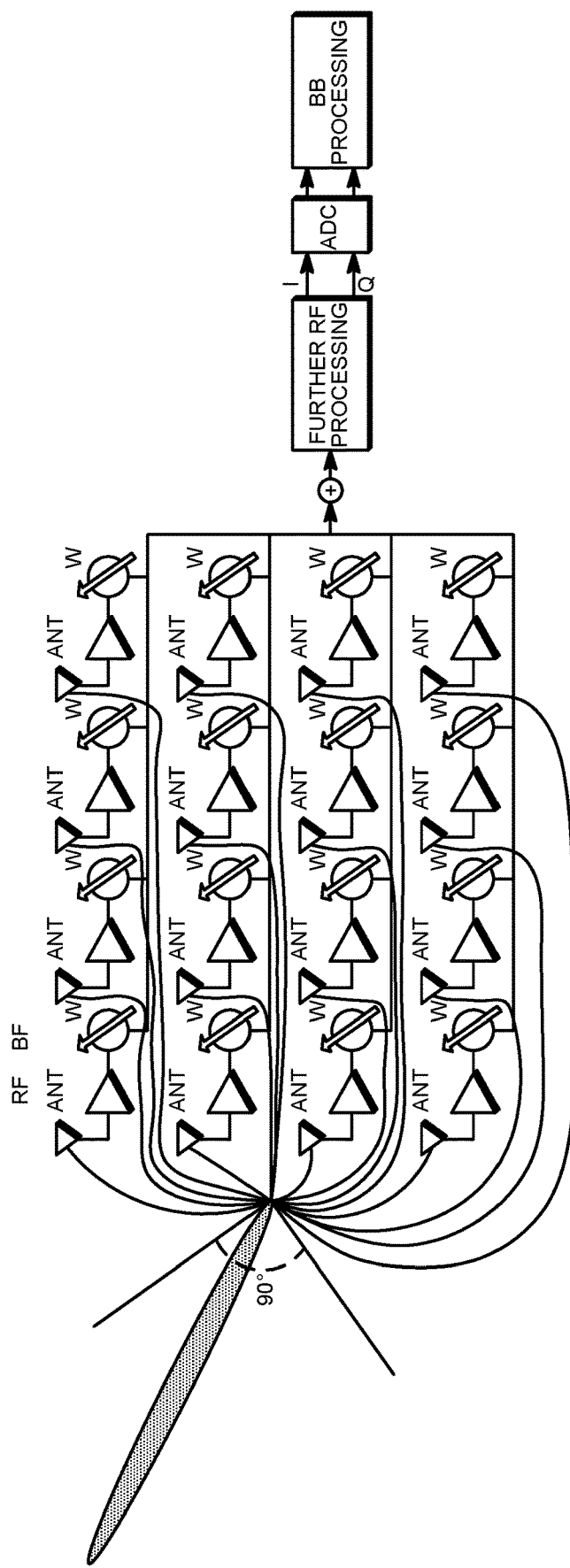
FIG. 6 is an example of an mWTRU Analogue Beamforming with at least one PAA and at least one RF Chain.

FIG. 6 may be an example of analogue beamforming. In analog beamforming, an RF chain may be applied (e.g., only one RF chain) for a given phase antenna array (PAA). For example, an antenna element may be connected to a phase shifter. The phase shifter may be used to set the weight for beam forming and/or steering. The number of RF chains may be (e.g., significantly) reduced using analog beamforming (e.g., as compared to digital beamforming). The energy consumption may be significantly reduced.

The phase of the signal (e.g, only the phase) at an antenna element may be adjusted in the beamforming. FIG. 6 shows that the phase shifting and/or combining may be implemented in different stages, e.g., in RF, base-band (BB) analogue, and/or local-oscillator (LO). One or more of the techniques described herein may be used to evaluate the effectiveness/efficiency of an approach, e.g., signal loss, phase error, and/or power consumption, and/or the like.

The mWTRU analogue beamforming methods may comprise one or more of the following. The mWTRU analogue beamforming algorithms may comprise a grid of beams having a set of fixed beams, e.g., a fixed codebook-based beamforming. A beam may be formed by the mWTRU applying a beamforming weight vector v chosen from a pre-defined codebook $v \in \{v_1, v_2, v_3 \ldots v_N\}$, where N denotes the number of fixed beams. A vector may comprise pre-calibrated phase shifts for certain (e.g., one or more, or all) phase shifters and/or may represent a unique analogue beam direction, e.g., "beam". The number of beams may depend on the Half-Power-Beam-Width (HPBW) of the beamforming and/or desired coverage. The mWTRU analogue beamforming algorithms may comprise a continuous phase shifting beamforming. For example, the desired weight of a phase shifter may be calculated based on the estimated short-term channel information and/or converted using a high resolution digital-to-analogue converter (DAC) for the phase shifter. The continuous phase shifting beamforming may provide a continuous and/or adaptive beamforming to track the channel conditions. The algorithm may perform well in one or more scenarios, e.g., with increased multipath, high angular spread, and/or low WTRU mobility.

An mWTRU may employ a hybrid approach comprising the digitized and analogue beamforming. For example, the analogue beamforming may be performed over the phase array antenna elements where an antenna element is associated with a phase shifter and/or connected to one RF chain. The digitized beamforming may comprise a digital precoding applied on the baseband signal of a RF chain, e.g., when there is more than one RF chain. MIMO schemes may be implemented using digital precoding.

Examples for the basic system parameters of the hybrid beamforming may include one or more of a Number of data stream, $N_{DATA}$; Number of RF chain (TRX), $N_{TRX}$; Number of antenna ports, $N_{AP}$; Number of antenna elements, $N_{AE}$; and/or Number of phase antenna array, $N_{PAA}$, and/or the like. The configuration of these parameters may impact the system function and/or performance.

For example, perhaps when $N_{PAA} \leq N_{AP} \leq N_{TRX} \leq N_{AE}$, one or more of the following may occur. A PAA may comprise multiple antenna elements, e.g., a PAA of size 4×4 has 16 antenna elements. An antenna port may be defined, and/or the channel over which a symbol on the antenna port is conveyed may be inferred from the channel over which another symbol on the same antenna port is conveyed. There may be certain (e.g., one or more) resource grid per antenna port. One or more cell-specific reference signals may support a configuration of one, two, and/or four antenna ports and/or may be transmitted on antenna ports p=0, p∈{0,1} and p∈{0,1,2,3}, respectively. Multicast-broadcast single-frequency network (MBSFN) reference signals may be transmitted on antenna port p=4. One or more WTRU-specific reference signals associated with PDSCH may be transmitted on antenna port(s) p=5, p=7, p=8, or one or several of p∈{7,8,9,10,11,12,13,14}.

Figure 7:
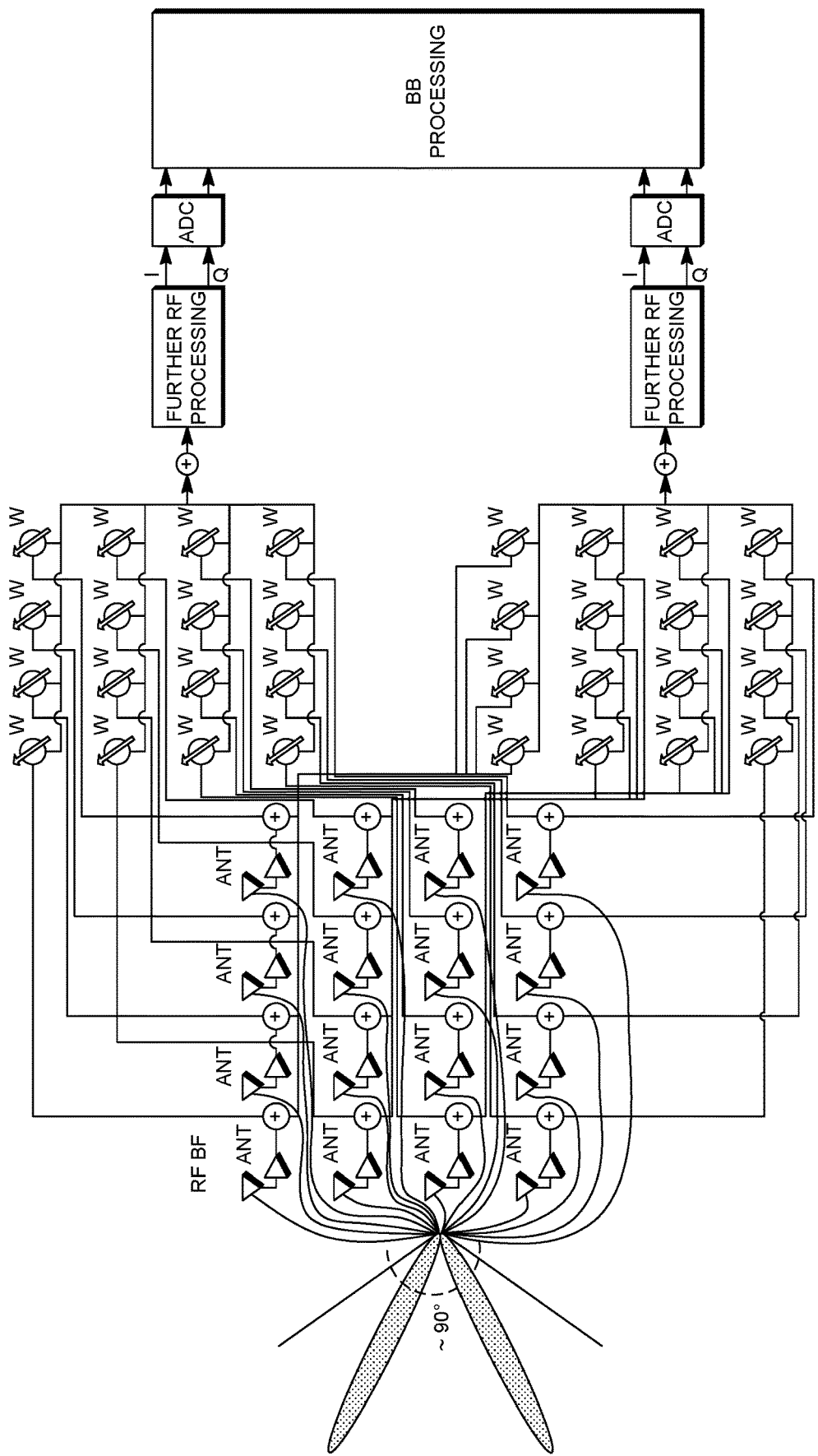
FIG. 7 is an example of an mWTRU Analog Beamforming with at least one PAA and at least two RF Chains.
Figure 8:
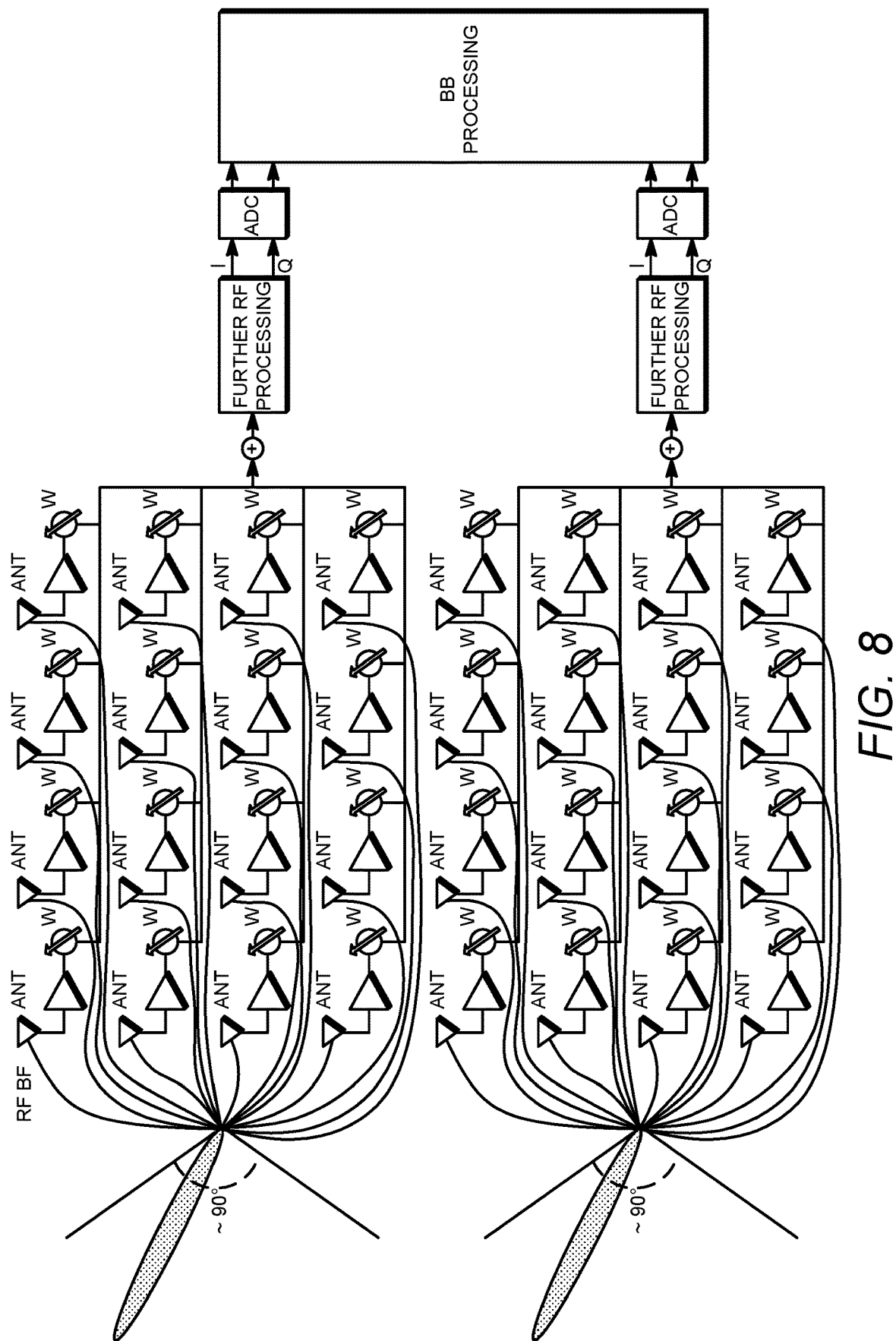
FIG. 8 is an example of an mWTRU Analog Beamforming with at least two PAAs and at least two RF Chains.

One or more demodulation reference signals associated with an enhanced Physical Downlink Control Channel (EP-DCCH) may be transmitted on one or several of p∈{107, 108,109,110}. Positioning reference signals may be transmitted on antenna port p=6. CSI reference signals may support a configuration of one, two, four or eight antenna ports and/or may be transmitted on antenna ports p=15, p∈{15,16}, p∈{15,16,17,18}, and p∈{15,16,17,18,19,20, 21,22}, respectively. An antenna port may carry beamformed reference signal(s) that may be uniquely associated with this antenna port and/or that can be used to identify the antenna port. The antenna configuration may become (e.g., fully) digitized as shown in FIG. 5, e.g., perhaps when the number of TRX equals the number of antenna elements. An example may be one RF chain per antenna element. A PAA may be connected to a RF chain (as shown in FIG. 6) and/or multiple RF chains, e.g., depending on the system configuration. In FIG. 7, $N_{PAA} < N_{AP} = N^{TRX} < N_{AE}$, one PAA of size 4×4 is connected to two RF chains and/or one or more, or each RF, chain has a set of 16 phase shifters. The PAA may form two narrow beam patterns within a +45° and −45° coverage in azimuth plane. FIG. 8 is an example of two PAAs and/or one or more, or each, PAA may have a dedicated RF chain, e.g., $N_{PAA}=N_{AP}=N_{TRX} \leq N_{AE}$. The example in FIG. 8 may allow a spatial independence between the two simultaneous beams by placing the PAAs at different orientation e.g. in azimuth plane. An aligned PAA arrangement may provide an aggregated larger coverage compared to the configuration in FIG. 7. Both configurations with two RF chains may apply MIMO with two data streams.

Figure 9:
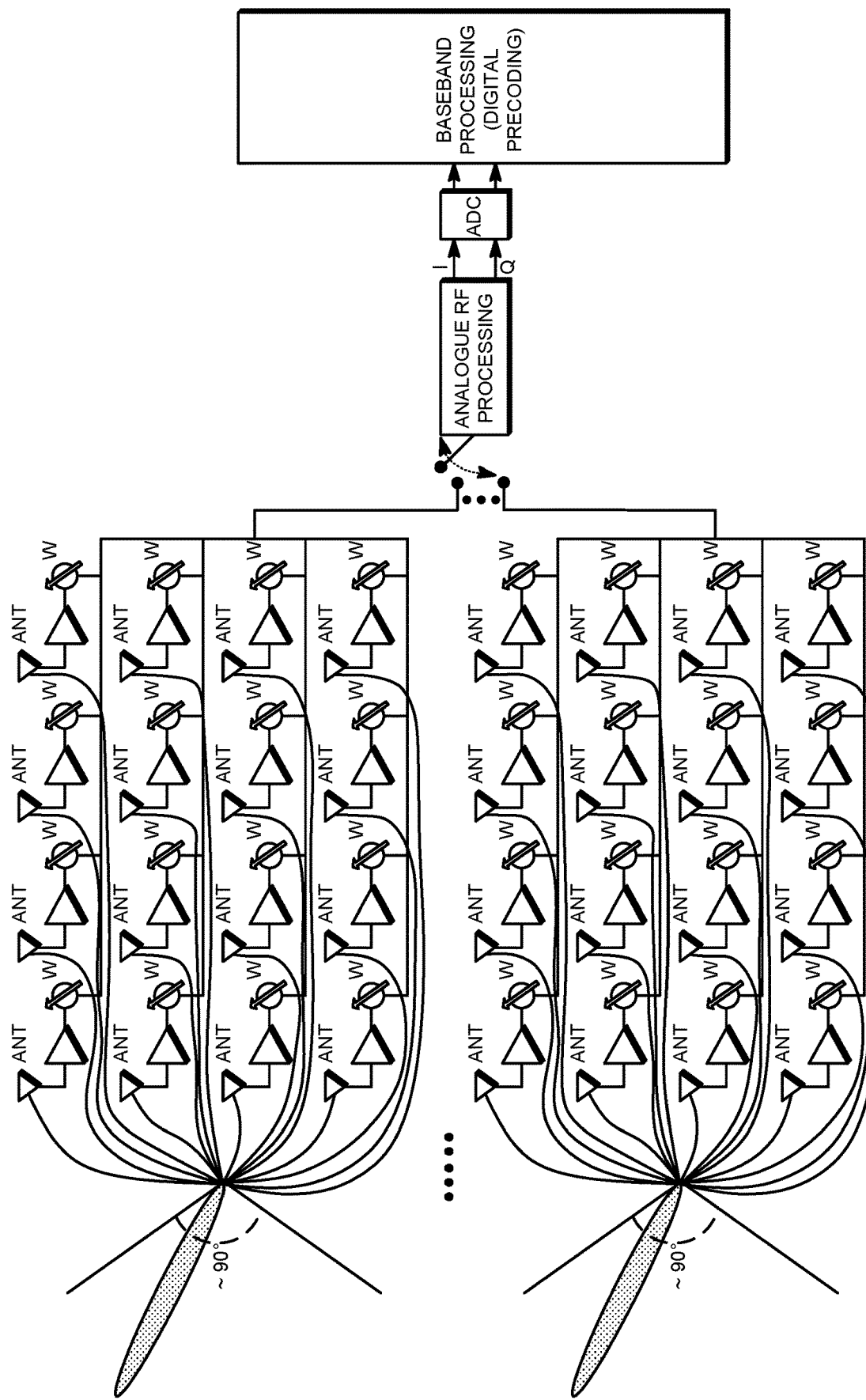
FIG. 9 is an example of an mWTRU Analogue Beamforming with at least two PAAs and at least one RF Chain.

For example, perhaps when $N_{AE} > N_{PAA} > N_{AP} = N_{TRX}$, multiple PAAs may be connected to a (e.g., single) RF chain by using a switch as depicted in FIG. 9. A PAA may form a narrow beam pattern covering from +45° to −45° in azimuth plane. They may be oriented separately. A single-beam solution may provide (e.g. a good) coverage by using a narrow beam at different direction at different time instances.

For example, when $N_{DATA} \leq N_{TRX} \leq N_{AE}$, the following may occur.

Figure 10:
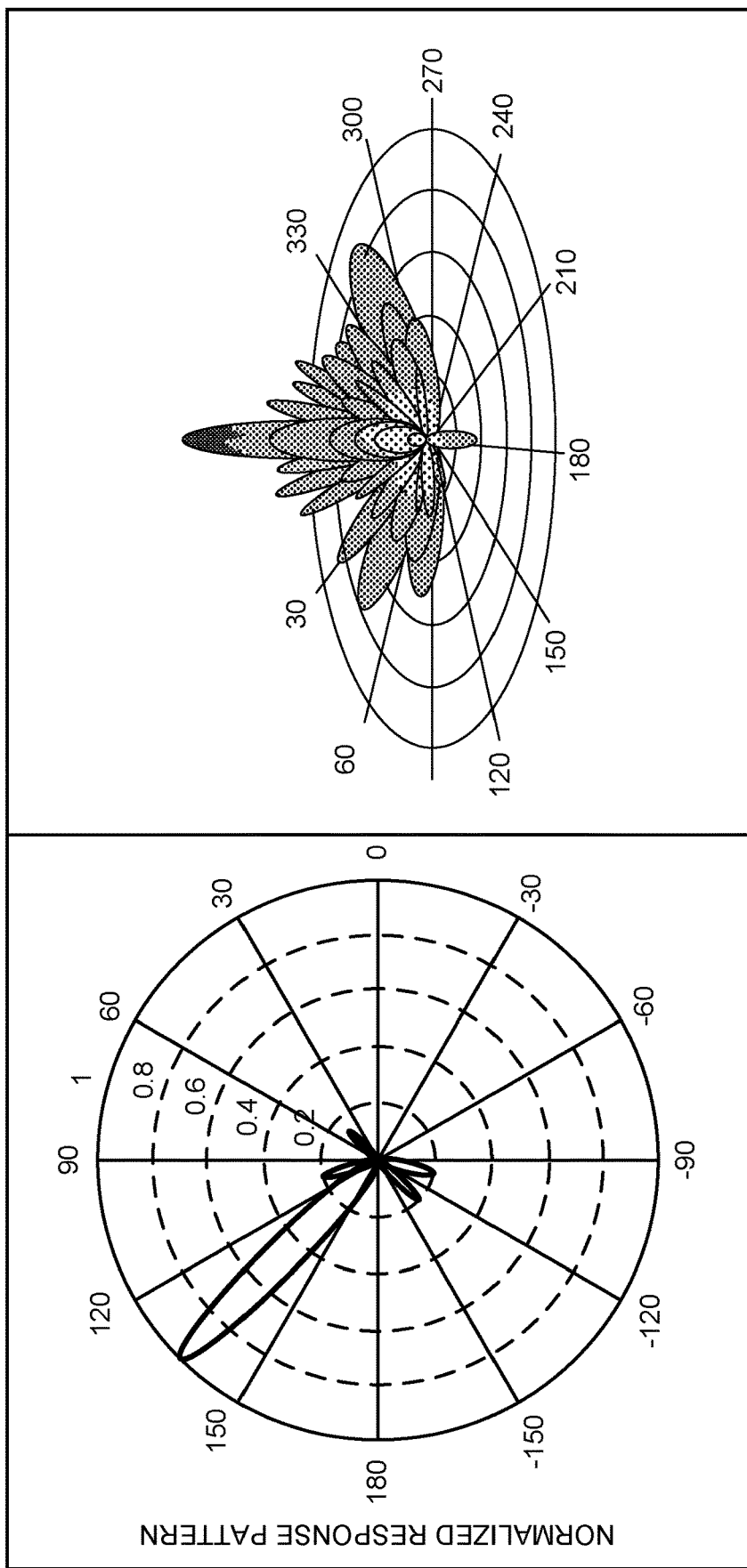
FIG. 10 is an example of an Illustrative 2D and Realistic 3D Narrow Beam Pattern.
Figure 11:
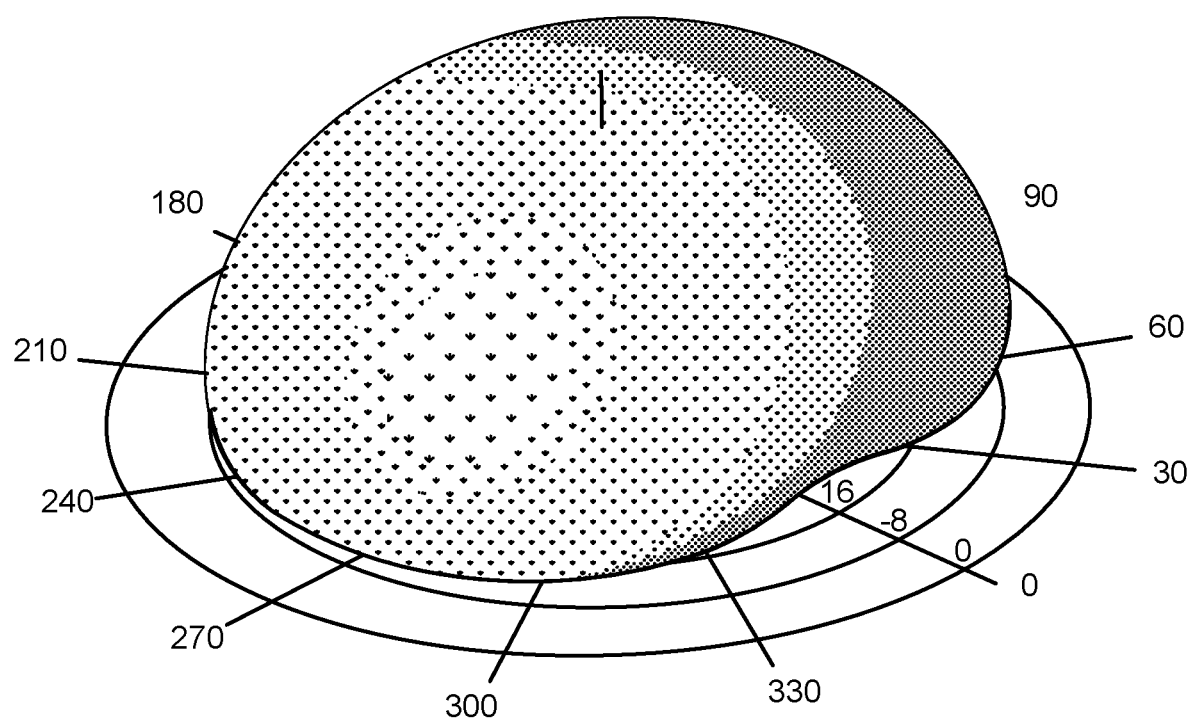
FIG. 11 is an example of a Realistic 3D Broadside Broad Beam Pattern.

For example, when $N_{DATA}=N_{TRX}=1$, a mWTRU may have a single-beam configuration and/or may operate one beam at a time. One or more of the following may occur. The mWTRU beamforming may form a narrow beam pattern. FIG. 10 is an example for a 16×16 PAA at the strongest angular direction, e.g., a line-of-sight (LOS) path obtained from beam measurement. The mWTRU may form a broad beam pattern, e.g. a wide main lobe. FIG. 11 is an example of a wide main lobe to cover a range of continuous angular directions including strong and/or weak ones in-between. The antenna gain may be reduced (e.g., considerably) with a broad beam pattern, and/or the link budget may worsen.

For example when $N_{DATA}=1<N_{TRX}$, an mWTRU may have simultaneous beam patterns. The beam patterns may be different and/or may be used for different applications. For example, when $N_{TRX}=2$, an mWTRU may have two simultaneous beam patterns that are different and/or may be used for different applications. One or more of the following may apply. The mWTRU may place two narrow beam patterns at different angular incoming directions to receive one data stream. For example, coherent beam combining may be used for spatial diversity and/or mitigate the blockage effect and/or weak LOS condition. The mWTRU may form one narrow beam and/or one broad beam for different application. For example, the narrow beam may be used for data transmission and/or the broad beam for control signaling.

For example, perhaps when $1<N_{DATA}=N_{TRX}$, the transmission may apply MIMO to increase the capacity, e.g., in high SNR channel condition. The mWTRU may place two narrow beam patterns at different angular incoming directions to receive two data streams in parallel.

One or more of the SCmB beam forming schemes may include fixed beam, adaptive beam forming (e.g., codebook-based and/or non-codebook-based), and/or classical beam forming e.g. Direction-of-Arrival (DoA) estimation. One or more schemes may use different approaches and/or may work well in certain scenarios. For example the DoA estimation may use smaller angular spread and/or a mWTRU may (e.g., need to) transmit a LTE uplink reference signal to ensure DoA accuracy. The fixed beam system may require beam cycling and/or switching.

One or more of the examples described herein may be explained in terms that assume an mWTRU antenna configuration and/or beamforming configuration. The mWTRU antenna configuration and/or beamforming configuration may be based on a single-beam mWTRU antenna configuration with analogue beamforming as illustrated in FIG. 6. The methods and/or techniques may also be applied using other beamforming methods such as digital beamforming and/or hybrid beamforming.

The LTE/LTE-A and/or E-PDCCH have evolved. In Rel-8, REs, REG, CCE and/or PDCCH may be the following. The smallest time-frequency unit for downlink transmission may be denoted a resource element (RE). A (e.g. one or more, or each) element in the resource grid for antenna port p may be called a resource element and/or may be uniquely identified by the index pair (k,l) in a slot where k and/or l may be the indices in the frequency and/or time domains, respectively. A PDCCH (Physical Downlink Control Channel) may carry scheduling assignments and/or other control information. A group of 4 consecutive resource elements may be called Resource Group Elements (REG). A physical control channel may be transmitted on an aggregation of one or several consecutive control channel elements (CCEs), where a control channel element corresponds to 9 REGs.

In Rel-11, EPDCCH WTRU-specific Search Space may be the following. The EPDCCH has been introduced in Rel-11 LTE-Advanced in order to achieve frequency domain ICIC and/or beamforming gain. Hereafter, EPDCCH, ePDCCH, and/or E-PDCCH may be used interchangeably. Also, EREG and/or ECCE may be interchangeably used as eREG and/or eCCE, respectively.

In Rel-11, PRB configuration may be the following. In Rel-11, the ePDCCH resources for WTRU-specific search space may be configured as a subset of PRBs in the PDSCH region. The ePDCCH resources may be configured in a WTRU-specific manner and/or up to two ePDCCH resource sets may be configured for a WTRU. An ePDCCH resource set may contain 2, 4, and/or 8 PRB-pairs according to the configuration and/or may be configured as a localized resource set and/or distributed resource set.

In Rel-11, eREG may be defined as the following. In a (e.g. one or more, or each) PRB-pair which is configured as ePDCCH resource, 16 eREGs may be defined regardless of normal CP and/or extended CP. The REs for eREGs may be allocated cyclically in a frequency first manner and/or may be rate-matched around for the demodulation RS such as antenna ports {107, 108, 109, 110}. Randomizing channel estimation performance across eREGS may occur as the channel estimation performance may be different according to the RE location in a PRB-pair. Since antenna port 107 and/or 108 are defined (e.g., only defined) for extended CP, the REs for eREGs may be allocated cyclically in a frequency first manner and/or may be rate-matched around for the demodulation RS such as antenna ports {107, 108}.

An eCCE may be defined as the following. An eCCE may be defined as grouping of 4 and/or 8 eREGs within an ePDCCH resource set. Therefore, the number of eCCEs ($N_{eCCE,set}$) per ePDCCH resource set may be defined as a function of the number of PRB pairs ($N_{PRB,set}$) configured for the ePDCCH resource set and/or the number of eREGs grouped to form an eCCE ($N_{eREG}$) such as $N_{eCCE,set}=16 \times N_{PRB,set}/N_{eREG}$. Two types of eCCE may be defined according to the mode of ePDCCH resource set such as localized eCCE (L-eCCE) and/or distributed eCCE (D-eCCE). To form an L-eCCE, the 4 and/or 8 eREGs located in the same PRB-pair may be grouped together. On the other hand, the eREGs in different PRB-pairs may be grouped to form a D-eCCE. Certain (e.g., one or more, or all) eREGs in an ePDCCH resource set may be used to form L-eCCE and/or D-eCCE perhaps according to the ePDCCH transmission configured for the ePDCCH resource set. For instance, if an ePDCCH resource set may be configured as localized ePDCCH, then certain (e.g., one or more, or all) eREGs in the ePDCCH resource set may be used to form L-eCCE. In other words, in an ePDCCH resource set, there may be L-eCCEs and/or D-eCCEs. For example, 4 eREGs may be grouped to form an eCCE in the case of normal subframe and/or special subframe configuration 3, 4, 8 in TDD perhaps for example since a (e.g, enough) number of REs may be available per eCCE so that a certain (e.g., required) effective coding rate may be used in one or more scenarios.

An antenna port mapping may be the following. The antenna ports {107, 108, 109, 110} and {107, 108} may be used for normal CP and/or extended CP, respectively. According to the ePDCCH transmission mode (e.g. localized ePDCCH and/or distributed ePDCCH), the antenna port mapping rules may be different as an (e.g., one or more, or each) ePDCCH transmission mode targeted for different system and/or channel environments. For instance, antenna port mapping for the distributed ePDCCH may be designed to maximize diversity gain as it has been introduced for open-loop transmission. On the other hand, antenna port mapping rules for localized ePDCCH may be defined to exploit WTRU-specific beamforming gain as well as multi-user MIMO gain.

For the distributed ePDCCH, two (e.g, only two, or more than two) antenna ports {107, 109} may be used out of {107, 108, 109, 110} in order to improve channel estimation gain while certain (e.g., one or more, or all) antenna ports may be used for localized ePDCCH. This may be due to the fact that WTRU-specific beamforming may use (e.g., require) larger number of antenna ports as one PRB-pair may be shared with up to 4 WTRUs. This may allow WTRU-specific beamforming of up to 4 WTRUs within a PRB-pair, for example.

A reference signal sequence may be the following. A predefined sequence (e.g., Pseudo-random (PN), m-sequence and/or etc.) may be multiplied with downlink RS so as to minimize inter-cell and/or intra-cell interference. This may improve channel estimation accuracy and/or increasing multi-user spatial multiplexing gain. For some (e.g., any) of the EPDCCH antenna ports {107, 108, 109, 110}, the reference signal sequence r(m) may be defined by $$r(m) = \frac{1}{\sqrt{2}}(1 - 2 \cdot c(2m)) + j\frac{1}{\sqrt{2}}(1 - 2 \cdot c(2m + 1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases},$$

where the $N_{RB}^{max,DL}$ denotes the maximum number of RBs for the downlink system bandwidth and c(i) denotes pseudo-random sequence. The pseudo-random sequence generator may be initialized with $$c_{init} = (\lfloor n_s/2 \rfloor + 1) \cdot (2n_{ID}^{EPDCCH} + 1) \cdot 2^{16} + n_{SCID}^{EPDCCH}$$

at the start of a (e.g., one or more, or each subframe). The $n_{ID}^{EPDCCH}$ may be independently configured for a (e.g., one or more, or each) EPDCCH resource set and $n_{SCID}^{EPDCCH} = 2$ may be used.

A WTRU-specific search space may be the following. In Rel-11, a WTRU-specific search space may be introduced (e.g., only introduced) for EPDCCH. Common search space may be located at the PDCCH region. The WTRU monitoring behavior for downlink control signaling reception may be defined in a downlink subframe as one of following. A WTRU may monitor WTRU-specific search space in EPDCCH and/or common search space in PDCCH, e.g., where the EPDCCH monitoring subframe may be configured via higher layer signaling. A WTRU may monitor WTRU-specific search space and/or common search space in PDCCH. The WTRU-specific search space fallback may be used, perhaps even though a subframe is configured to monitor ePDCCH subframe, e.g., when ePDCCH is not available in that subframe. Some collisions between ePDCCH REs and/or other signals may occur. A WTRU may monitor PDCCH for WTRU-specific search space.

The aggregation level may increase to keep an effective coding rate, perhaps when the available number of REs may be smaller than a threshold ($n_{EPDCCH} < 104$). For instance, the supportable ePDCCH formats for localize transmission when $n_{EPDCCH} < 104$ may be $N_{ECCE} \in \{2,4,8,16\}$ while $N_{ECCE} \in \{1,2,4,8\}$ may be used in other cases. The set of aggregation levels may be different according to the ePDCCH transmission modes.

Collision handling may be performed. The ePDCCH REs may be defined as the REs in a PRB-pair not occupied by antenna port {107,108,109,110}. FIG. 1-24 may show an example of the ePDCCH RE definition in a PRB-pair according to the CP length without collision with other signals, resulting in 144 and/or 128 available REs for normal CP and/or extended CP, respectively. The ePDCCH resources may be configured in PDSCH region. The REs for ePDCCH may collide with other signals, e.g., CSI-RS, CRS, PRS, PBCH, SCH, and/or PDCCH. The WTRU behavior when the REs collide with other signals may be defined as one or more of the following. The coded bits for ePDCCH may be rate-matched around for the REs colliding with CSI-RS, CRS, and/or PDCCH. The PRB-pair used for PBCH and SCH in a subframe may or might not be used for ePDCCH. The available REs for ePDCCH may become smaller, e.g., when other signals are transmitted in the PRB-pair configured for ePDCCH.

Transmit and/or receive beamforming may be applied to the control channel transmission/reception, e.g., to overcome high path loss at >6 Ghz frequencies. The resulting beamformed link may be considered as a spatial filtering and/or limit the WTRU to receive incoming angular paths (e.g., only incoming angular paths) within the formed beam pair.

Legacy cellular systems may rely on Omni directional and/or cell-wide beams for control channel transmissions. From a WTRU's point of view, the placement of control channel may be well defined, e.g. in the control region. At higher frequencies, a (e.g., one or more, or each) base station may have plurality of control channel beams to cover the cell. A WTRU may be able to (e.g., only be able to) receive a subset of those control channel beams. One or more techniques to identify candidate control channel beams and/or their location in the subframe structure may be defined for efficient WTRU operation.

One or more mBs and/or WTRUs in a beam formed system may have diverse set of capabilities, for example, different number of RF chains, different beam widths, and/or different number of PAAs, etc. One or more mBs with multiple RF chains may transmit control channel beam(s) in the same control symbol. One or more WTRUs with one or more, or multiple, RF chains may receive using receive beam pattern(s) same control symbol. One or more mBs with, for example, one RF chain may (e.g., need to) multiplex control channel beams in time domain (e.g. different symbols and/or different subframes). One or more mBs with RF chain(s) may multiplex control channel beams in time and/or spatial domains.

A framework for beam formed control channel design may be used to support varying capabilities of mBs and/or WTRUs and/or support time and/or spatial domain multiplexing of control channel beams.

The common reference signal design in LTE may assume cell wide transmission. For a multi-beam system, modifications to reference signal design may be used to discover, identify, measure, and/or decode a (e.g., one or more, or each) control channel beam. In a multi-beam system, interference between beams may degrade overall cell capacity, so additional mechanisms to mitigate inter-beam interference may be useful, e.g, for intra-cell and/or inter-cell scenarios.

WTRU monitoring may be defined to consider beam search space in addition to time and/or frequency search space.

Enhancements to downlink control channel may be useful to support scheduling narrow data beams. One or more mechanisms may be useful to achieve high resource utilization, e.g., perhaps when large bandwidths are available and/or WTRUs may be spatially distributed.

A mB, SCmB, mmW eNB, eNB, cell, small cell, Pcell, and/or Scell may be used interchangeably. The term operate may be used interchangeably with transmit and/or receive. Component carrier and/or mmW carrier may be used interchangeably with serving cell.

The mmW eNB may transmit and/or receive one or more mmW channels in a band (e.g., licensed band and/or unlicensed). The mmW eNB may transmit and/or receive one or more signals in a band (e.g., licensed band and/or unlicensed). One or more WTRUs may be substituted for eNB and still be consistent with the techniques described herein. An eNB may be substituted for WTRUs and still be consistent with the techniques described herein. UL may be substituted for downlink (DL) and still be consistent with the techniques described. DL may be substituted for UL and still be consistent with the techniques described herein.

A channel may refer to a frequency band which may have a center and/or carrier frequency and a bandwidth. Licensed spectrum may include one or more channels which may or might not overlap. Unlicensed spectrum may include one or more channels which may or might not overlap. Channel, frequency channel, wireless channel, and/or mmW channel may be used interchangeably. Accessing a channel may be the same as using (e.g., transmitting on and/or receiving on and/or using) the channel.

A channel may refer to an mmW channel and/or signal, e.g., an uplink physical channel and/or signal. A channel may refer to an mmW channel and/or signal, e.g., a downlink physical channel and/or signal. Downlink channels and/or signals may comprise one or more of the following: mmW synchronization signal, mmW broadcast channel, mmW cell reference signal, mmW beam reference signal, mmW beam control channel, mmW beam data channel, mmW hybrid ARQ indicator channel, mmW demodulation reference signal, PSS, SSS, DMRS, CRS, CSI-RS, PBCH, PDCCH, PHICH, EPDCCH, and/or PDSCH, and the like. Uplink channels and/or signals may include one or more of the following: mmW PRACH, mmW control channel, mmW data channel, mmW beam reference signal, mmW demodulation reference signal, PRACH, PUCCH, SRS, DMRS, and/or PUSCH, and the like. Channel and mmW channel may be used interchangeably. Channels and signals may be used interchangeably.

Data/control may mean one or more of the following: data, control signals, and/or channels, and the like. Control may comprise synchronization. The data/control may be mmW data/control. Data/control, data/control channels, and/or signals may be used interchangeably. Channels and signals may be used interchangeably. The terms control channel, control channel beam, PDCCH, mPDCCH, mmW PDCCH, mmW control channel, directional PDCCH, beamformed control channel, spatial control channel, control channel slice, and/or high frequency control channel may be used interchangeably. The terms data channel, data channel beam, PDSCH, mPDSCH, mmW PDSCH, mmW data channel, directional PDSCH, beamformed data channel, spatial data channel, data channel slice, and/or high frequency data channel may be used interchangeably.

Channel resources may be resources (e.g., 3GPP LTE and/or LTE-A resources), e.g., time, frequency, code, and/or spatial resources. Channel resources, e.g., at least sometimes, carry one or more channels and/or signals. Channel resources may be used interchangeably with channels and/or signals.

A mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and/or measurement RS may be used interchangeably. A mmW cell, mmW small cell, SCell, secondary cell, license-assisted cell, unlicensed cell, and/or LAA cell may be used interchangeably. A mmW cell, mmW small cell, PCell, primary cell, LTE cell, and/or licensed cell may be used interchangeably. Interference and interference plus noise may be used interchangeably.

A WTRU may determine the UL and/or DL directions of one or more subframes according to one or more received TDD UL/DL configurations. A WTRU may determine the UL and/or DL directions of one or more subframes according to one or more configured TDD UL/DL configurations. UL/DL and UL-DL may be used interchangeably.

The techniques described herein for beamformed control and data channels may be applicable to any system, perhaps irrespective of the frequency bands, usage (e.g. licensed, unlicensed, shared), antenna configuration (e.g. phased array and/or patch and/or horn etc.), RF configuration (e.g. single and/or multiple RF chains), beamforming methods used (e.g. digital, analog and/or hybrid, codebook based and/or otherwise), and/or deployments (e.g. macro, small cell, heterogeneous networks, dual connectivity, remote radio heads, carrier aggregation). A mmW (millimeter wave) may be substituted for cmW (centimeter wave) and/or LTE/LTE-A/LTE evolution and still be consistent with the techniques described herein.

A scheduling interval may refer to the subframe and/or slot and/or frame, and/or schedulable slice and/or control channel periodicity and/or any other pre-defined time unit. Gaps and/or guard periods and/or silence periods and/or switching periods and/or absence of transmission and/or DTX periods may be used interchangeably.

The terms channel, beam and/or channel beams may be used interchangeably. Antenna pattern, phase weights, steering vector, codebook, precoding, radiation pattern, beam pattern, beam, beam width, beam formed transmission, antenna port, virtual antenna port, transmission associated with a reference signal, directional transmission, and/or spatial channel may be used interchangeably.

The terms REGs and CCEs may refer to plurality of time, frequency, code and/or spatial resources generally and/or may or might not be limited by the LTE numerology/context (e.g., the LTE REGs and LTE CCEs may be considered types of REGs and CCEs in the context of the techniques described herein). Radiation pattern may refer to the angular distribution of the radiated electromagnetic field and/or power level in the far field region.

A beam may be one of the lobes, e.g., main/side/grating lobes of the transmit radiation pattern and receive gain pattern of an antenna array. A beam may denote a spatial direction that may be represented with a beamforming weight vector. A beam may be identified and/or associated with one or more of a reference signal, an antenna port, a beam identity (ID), a scrambling sequence number, and/or the like. A beam may be transmitted and/or received at a specific time. A beam may be transmitted and/or received at a specific frequency. A beam may be transmitted and/or received at a specific code. A beam may be transmitted and/or received at specific spatial resources. A beam may be formed digitally and/or in an analogue manner (hybrid beamforming). The analogue beamforming may be based on fixed code-book and/or continuous phase shifting. A beam may comprise Omni directional and/or Quasi-Omni directional transmission. Two beams may be differentiated by direction of highest radiated power and/or by beam width.

One or more reference signals may be associated with one or more search spaces and/or one or more antenna ports. One or more search spaces may be associated with one or more beam search spaces and/or one or more antenna port search spaces.

In some scenarios, the WTRU may be configured to receive one or more search spaces from a wireless communication system network node, perhaps dynamically. In some scenarios, a WTRU may be configured such that the one or more search spaces are predefined on the WTRU.

A data channel beam may be used to transmit one or more of the following: data channel, data channel beam, PDSCH, mPDSCH, mmW PDSCH, mmW data channel, directional PDSCH, beamformed data channel, spatial data channel, data channel slice, high frequency data channel, and the like. A data channel beam may be identified and/or associated with one or more of the following: a reference signal, an antenna port, a beam identity (ID), a scrambling sequence number and/or a data channel number, and the like. A data channel beam may be transmitted and/or received at a specific time. A data channel beam may be transmitted and/or received at a specific frequency. A data channel beam may be transmitted and/or received at a specific code. A data channel beam may be transmitted and/or received at specific spatial resources.

A control channel beam may be used to transmit one or more of the following: control channel, PDCCH, mPDCCH, mmW PDCCH, mmW control channel, directional PDCCH, beamformed control channel, spatial control channel, control channel slice, high frequency control channel, and the like. The control channel may carry DCI for one or more users. The control channel may carry PHICH and PCFICH in the downlink and PUCCH in the uplink. A control channel beam may be identified and/or associated with one or more of the following: a reference signal, an antenna port, a beam identity (ID), a scrambling sequence number, a control channel number, and the like. A control channel beam may be transmitted and/or received at a specific time. A control channel beam may be transmitted and/or received at a specific frequency. A control channel beam may be transmitted and/or received at a specific code. A control channel beam may be transmitted and/or received at specific spatial resources. A control channel beam may be cell specific and/or WTRU specific.

A common channel may be used to refer to transmission that carries information useful for plurality of WTRUs. The term common channel may be used interchangeably with shared channel.

Half Power Beam Width (HPBW) may refer to a radiation pattern cut containing the direction of the maximum of a lobe, the angle between two directions in which the radiation intensity is one-half the maximum value. The exact beam width for the beamformed control/data channel may or might not be specified and may depend on mB and/or WTRU implementation. A mB may support WTRUs with varying capabilities. WTRUs may work in an mB with varying capabilities.

A control channel beam duration may be a number of OFDM symbols in a scheduling interval occupied by a control channel beam.

A control region may be the number of OFDM symbols in a scheduling interval occupied by some or all of the control channel beams transmitted in the scheduling interval.

Fixed codebook-based analogue beamforming may refer to a grid of beams that may comprise a set of fixed beams. A beam may be formed by applying a beamforming weight vector v chosen from a pre-defined codebook $v \in \{v_1, v_2, v_3 \ldots v_N\}$ where N denotes the number of fixed beams. The number of beams may depend on the Half-Power-Beam-Width (HPBW) of the beamforming and desired coverage.

A continuous phase shifting analogue beamforming may provide a continuous and adaptive beamforming to track channel conditions. The desired weight of a phase shifter may be calculated based on the estimated channel information, e.g., angular information. The desired weight of a phase shifter may be converted using a high resolution digital-to-analogue converter (DAC) to apply to the phase shifter.

An antenna port may be defined. The channel over which a symbol on the antenna port is conveyed may be inferred from the channel over which another symbol on the same antenna port is conveyed. A time-frequency resource grid may be considered to be available per antenna port. For example, a (e.g., one or more, or each) antenna port may be considered to be orthogonal to other antenna ports such that the time-frequency resources may be used for independent transmissions on a (e.g., one or more, or each) antenna port. Code multiplexing may also be used on one or more antenna ports.

The beamforming contains building blocks. An example subframe may have the following structure. A subframe and/or scheduling interval and/or slot and/or a predefined time unit may comprise plurality of symbols. One or more symbol(s) may be used to transmit and/or carry and/or include and/or map and/or be configured to receive the one or more control signal/channel/information. One or more symbol(s) may transmit/carry/include and/or be configured to receive one or more data channels.

Beamformed control and/or data channels may be one or more of the following. Control and/or data channels may be transmitted using a specific radiation pattern and/or beam. A control channel beam may be associated with one or more of the following: a unique reference signal, a steering vector, a scrambling code, an antenna port, time, code, spatial resource, frequency resource, and/or control channel identity, and/or the like. A data channel beam may be associated with one or more of the following: a unique reference signal, a steering vector, a scrambling code, an antenna port, time, code, spatial resource, frequency resource, and/or control channel identity, and the like. An mB and/or cell may transmit plurality of beamformed control and/or data channels. Beamformed control and/or data channels may be multiplexed in time.

Data region with one or more beamformed data channel(s) may work. One or more symbols within a subframe where the data channel is transmitted may be referred to as data region. Within a subframe, the data region may comprise multiple data channel beams multiplexed in time. For example, a data channel in a particular beam may occupy one more symbol(s). The remaining symbols within the same subframe may be used to transmit data channel in other beams. A data channel beam within the data region may be of variable beam widths. The maximum data channel beam width for a WTRU may be as wide as its control channel beam width. A WTRU may receive one or more data channels transmitted. A WTRU may use one or more beams and/or beam widths within a subframe and/or across different subframes. Plurality of WTRUs may be time multiplexed within a subframe, within same data channel beam and/or across different data channel beams. Minimum schedulable time resource within a subframe may be a symbol and/or group of symbols. Scheduling granularity may be less than a subframe, e.g., a new DCI format may carry allocation information at symbol level/symbol group.

The system may comprise a control region with one or more beamformed control channel(s). One or more symbols within a subframe where the control channel is transmitted may be referred to as cell specific control region and/or an overall control region. Within a subframe, the cell specific control region may comprise multiple control channel beams multiplexed in time. One or more symbols within a subframe where the control channel for a specific beam is transmitted may be referred to as beam specific control region. The term control region may mean cell specific control region and/or beam specific control region. Control region size may be fixed and/or be flexible. Control region and data region may overlap. One or more symbols may carry control and/or data channel. Control and/or data channel may be multiplexed in frequency and/or code and/or spatial domain.

The one or more search spaces may be configured to be used to monitor one or more Downlink (DL) control channels. The one or more search spaces may be configured to be used to receive the one or more DL control channels. At least one search space of the one or more search spaces may correspond to at least one reference signal of one or more reference signals. At least a part of a control region may be monitored for at least one reference signal of the one or more reference signals. At least one reference signal in the at least part of the control region may be detected. At least one search space corresponding to the at least one reference signal may be monitored for at least one DL control channel, perhaps for example upon the detection of the at least one reference signal.

The system may comprise gaps and/or switching periods. Gaps and/or guard periods and/or silence periods and/or switching periods and/or absence of transmission and/or DTX periods may be placed between two consecutive symbols. The two consecutive symbols may carry transmissions with different beam direction and/or radiation pattern and/or steering vector. Different gap types may be identified. One or more of the following examples may be identified, depending on the placement: gaps between two control symbols and/or group of control symbols, gaps between two data symbols and/or group of data symbols, and/or gaps between control symbols and data symbols (e.g. between the last control symbol and first data symbol and/or between the first control symbol and last data symbol), and/or the like.

Different gap types may be preconfigured with a different duration. Same gap type may be preconfigured with a different duration in different subframes. Gaps may be selectively placed between two consecutive symbols. The two consecutive symbols may be transmitted with a different radiation pattern. The two consecutive symbols may be transmitted with a different beam pattern. The two consecutive symbols may be transmitted with a different direction. The two consecutive symbols may be transmitted with a different channel type. Gaps may be selectively placed between control and data symbols. Gaps within the same subframe may have different duration. Gaps may or might not be present in some or all of the subframes. Gaps may be placed between control symbols and may or might not be placed in the data symbols. Gaps may be placed between data symbols and may or might not be placed in the control symbols. Within the control and/or data region, gaps may be selectively placed between a subset of symbols.

The gaps may be defined from a WTRU point of view. A WTRU may or might not be required to receive on the DL during the gap periods (e.g., the gap between control symbols and data symbols for a WTRU). A WTRU may utilize the gap periods to decode the control channel, e.g., control channels received before the start of gap period. A WTRU may utilize the gap periods to switch its receive beam. A WTRU may utilize the gap periods to apply new steering vector to receive the downlink data channel. The downlink data channel may be different from the receive beam and/or steering vector used to receive the downlink control channel. A WTRU may utilize the gap periods (e.g. the gap between data symbols and/or group of data symbols for a WTRU) to switch its receive beam. A WTRU may utilize the gap periods (e.g. the gap between data symbols and/or group of data symbols for a WTRU) to apply new steering vector to receive the downlink data channel, which may be different from the receive beam and/or steering vector used to receive the previous downlink data channel in a subframe (e.g., same or different).

An mmW control channel may be designed, e.g., to facilitate control channel beam mapping to physical source. One or more control channels in a cell may be beamformed. One or more control channels in a cell may be placed in different control symbol and/or groups of control symbols in a subframe.

For example, an mB may utilize sweep operation to go through all or some of the control beams. An mB may transmit control channel beams in a subframe, e.g., one or more, or all, the control channel beams in every subframe. An mB may receive control channels in a subframe. For example, entire cell coverage may receive control channels in every subframe. An mB may utilize sweep operation, for example, starting from one control beam and going through some (e.g., one or more, or all) of the control beams in the cell in certain order. The sweep operation may go through selected (e.g., only specific) symbols in a subframe (e.g. only in the control region). The mB may utilize multiple subframes to transmit all or some of the control channel beams. For example, a subframe may comprise a partial sweep of control channel beams. One or more subframes may be used for a complete sweep of control channel beams to cover the entire cell. The mB may follow a certain order for the sweep operation. For example, it may transmit control channel beams in a sequence based on control channel number and/or BRS sequence number. The mB may follow a random order for the sweep. The random order may be generated from a hashing function. The hashing function may use control channel number and/or subframe number etc.

The mapping between control channel beam(s) and/or control symbol(s) may be pre-defined and/or signaled via one or more of the following: broadcast channel(s) (e.g., MIB, SIB-x), higher layer signaling (e.g. RRC/MAC), L1 signal/channels, and/or any other common channel, and/or the like. The mapping between control channel beam(s) and control symbol group(s) may be pre-defined and signaled via one or more of the following: broadcast channel(s) (e.g., MIB, SIB-x), higher layer signaling (e.g. RRC/MAC), L1 signal/channels, any other common channel, and the like. WTRUs may determine the control channel beam to control symbol mapping by blind decoding. For example, WTRUs may search for pre-defined BRS sequence in the control region, and WTRUs may determine the control channel beam to symbol mapping, e.g., based on the received BRS signal quality (e.g. RSRP, SNR etc.).

An mB may select a subset of beams. The mB may transmit a subset of control channel beams in a subframe. The subset may be determined by one or more of the following criterias: distribution of WTRUs in a cell and/or beam, activity level of WTRUs in the cell and/or beam (e.g., buffer status of WTRUs, traffic pattern for WTRUs), WTRU grouping, WTRU service requirements, number of control channels with or without beamforming, scheduling algorithm, intra and inter cell interference, and/or type of control channel (e.g. common control and/or WTRU specific control), and the like. The mB may transmit a (e.g., only one) control channel beam in a subframe. The data region in the subframe may comprise transmissions using the same control channel beam and/or any other data channel beam related to the control channel beam, e.g, narrow data channel beam related to the control channel beam.

The mapping between a control channel beam and a symbol and/or a symbol group associated with a subframe (e.g., within a subframe and/or across subframes) may be fixed and/or flexible. The following may be applicable irrespective of control channel beam selection mode (e.g. subset transmission and/or full sweep transmission).

The mapping between a control channel beam and a symbol and/or a symbol group associated with a subframe, e.g., within a subframe and/or across subframes, may be fixed. In a fixed mapping, a control channel beam, e.g, every control channel beam, may be placed and/or transmitted in a pre-defined symbol and/or symbol group within a subframe. The mapping between the control channel beam and the symbol number may be same in certain (e.g., one or more, or all) subframes. For example, control channel beam 1 may be transmitted during symbol number 1 in a (e.g., every) subframe. Symbol hopping may be used for control channel beams according to a pre-defined hashing function. For example, a function may use control channel number, cell ID, BRS sequence ID, subframe number, symbol number etc. WTRUs may determine the mapping between the control channel beam and the symbol/symbol group, e.g., implicitly based on the PBCH beam mapping. WTRUs may determine the mapping between control channel beam and the symbol/symbol group based on explicit configuration using one or more of the following: broadcast channel(s) (e.g., MIB, SIB-x), higher layer signaling (e.g. RRC/MAC), L1 signal/channels, and the like. WTRUs may determine the mapping between control channel beam and the symbol/symbol group based on a pre-defined function of cell-ID and/or beam-ID. Many to one mapping between control channel beams and control symbol/symbol group may be defined.

With a fixed mapping structure, control channel beams with no active WTRUs may have blank and/or empty control symbols. The blank and/or empty control symbols may be reclaimed and/or reused to map data channel beams, e.g., to improve resource utilization. The data channel beams may be scheduled by control channel beams occurring before the original blank and/or empty symbol. The data channel beams may be scheduled by control channel beams occurring after the original blank and/or empty symbol. WTRUs may buffer the complete subframe before the control channel decoding is complete. PDSCH may be mapped to the unused (e.g., empty and/or blank) control symbols. The unused control symbols may precede the associated PDCCH.

The mapping between a control channel beam and a symbol and/or a symbol group associated with a subframe, e.g., within a subframe and/or across subframes, may be flexible. In a flexible mapping, a control channel beam may be placed and/or transmitted in a (e.g., any) symbol and/or symbol group in a subframe. Multiple control channel beams in a subframe may be transmitted using different symbols, e.g., time multiplexed. The mapping between control channel beams and the symbol/symbol group may vary for different subframe. An mB may selectively transmit a subset of control channel beams in a subframe. The number of control channel beams transmitted may vary for different subframes. The number of control symbols occupied by a control channel beam may vary for different subframes. The number of control symbols occupied by different control channel beams in a subframe may vary.

The mapping between a control channel beam and a symbol and/or a symbol group associated with a subframe, e.g., within a subframe and/or across subframes, in a frame structure may be a hybrid of fixed and flexible mapping. The mB may use a fixed mapping for some beam types (e.g., common control beams and/or Omni beams, and/or WTRU specific control beams). The mB may use a flexible mapping for other beam types (e.g., WTRU specific control beams, and/or common control beams and/or Omni beams). The mB may use a fixed mapping for some subframes and a flexible mapping for other subframes. The mapping format for different subframes may be explicitly signaled using one or more of the following: broadcast channel(s) (e.g., MIB, SIB-x), higher layer signaling (e.g., RRC/MAC), and/or L1 signal/channels, and the like. The mapping format for different subframes may be implicitly known by the presence of certain channels. For example, subframes with PBCH may use fixed mapping. A flexible mapping may be the default mode, and a fixed mapping may be applied in some (e.g., specific) subframes at a pre-defined periodicity.

For example, a fixed mapping between control channel beam RS and/or the control symbols may assist WTRU measurement at specific subframes. An mB may use a fixed mapping for a subset of beams for WTRUs in idle mode and a flexible mapping for WTRUs in connected mode. An mB may use a fixed mapping for WTRUs in connected mode and a subset of beams for WTRUs in idle mode. An mB may use a fixed mapping when the cell is lightly loaded (e.g. when the number of active WTRUs are small) switch to a flexible mapping when the cell is highly loaded. WTRUs may determine the mapping format for control channel beams from the configuration received in one or more of the following: broadcast channel(s) (e.g., MIB, SIB-x), higher layer signaling (e.g. RRC/MAC), L1 signal/channels, any other common channel, and/or the like. One or more WTRUs may determine the change/switch in control channel beam mapping from configuration received in one or more of the following: broadcast channel(s) (e.g., MIB, SIB-x), higher layer signaling (e.g. RRC/MAC), and/or L1 signal/channels, any other common channel, and/or the like.

An mmW control channel beam may have various control channel beams. The mmW control channel beam may carry plurality of control channels addressed to one or more WTRUs. The control channel beam may carry one of more of the following: the Downlink Control Information (DCI) [e.g., the DCI may include scheduling grant (UL and DL)], UL control channel assignment, beam switch command, power control commands and/or any other control information, higher layer messages (MAC, RRC), small payload (e.g. broadcast messages like SIB/Paging), cell and/or beam specific reference signals for demodulation, measurement for one or more WTRUs, and/or the like. The minimum time domain resource occupied by the control channel beam may be one symbol. The maximum time domain resource occupied by the control channel beam may be pre-configured (e.g., in MIB/SIB-x) and/or dynamically signaled using beam specific PCFICH. The dwell time of the control channel beam may be pre-configured (e.g. in MIB/SIB-x) and/or dynamically signaled using beam specific PCFICH. The time domain resources (e.g. number of symbols) occupied by common control channel beam may be fixed (e.g., in MIB/SIB-x). The WTRU specific control channel beam may be dynamic (e.g., beam specific PCFICH).

The mmW control beam may carry one or more PDCCHs. The PDCCHs may be addressed for/to one or more WTRUs. A PDCCH may be transmitted on an aggregation of one or several CCEs (Control Channel Elements), e.g., where a control channel element may correspond to two or more REGs (Resource Element Groups). Different PDCCH formats may be defined, e.g., based on aggregation levels of CCEs. PDCCH may be transmitted, e.g., using a hierarchy of different groups of resource elements. The allocation of number of basic resource units for a level of resource group may be associated with PDCCH link adaptation scheme and/or other considerations. One or more characteristics/property of REs may be a function of beam ID and/or beam type. One or more characteristics/property of CCEs may be a function of beam ID and/or beam type.

Common control channel beams and/or WTRU specific control channel beams may use different PDCCH formats and/or aggregation levels. There may be a fixed aggregation level on the WTRU specific control channel beam. The number of REGs per CCE may vary for different beam type. For example, common control channel beam may have higher number of REGs per CCE. The resource block structure and/or subcarrier spacing may vary for different beam types. For example, symbols carrying common control channel beams and/or symbols carrying WTRU specific control beams may use different subcarrier spacings. Common control channel beams may be scrambled by a cell specific (e.g. cell ID) and/or beam specific (e.g. beam ID) identity. WTRU specific control channel beams may be scrambled by one or more of the following: a cell specific (e.g. cell ID), a beam specific (e.g. beam ID), a WTRU specific identity (e.g. C-RNTI), and/or the like. One or more modulation schemes and/or coding rates used for the control channel beam may be specific to beam type. For example, common control channel may use a fixed and/or preconfigured modulation scheme and/or coding rate. The WTRU specific control channel beam may use a dynamic MCS adaptation. The dynamic MCS adaptation may be signaled using beam PCFICH. Beam types may be WTRU specific. For example, a WTRU may use a common control channel beam. A WTRU may use a WTRU specific control channel beam. A WTRU may use a beam carrying common control channel scheduling and/or WTRU specific scheduling information. The part of the subframe where common control channel beams are transmitted may be referred as common control region. The part of the subframe where WTRU specific control channel beams are transmitted may be referred as dedicated control region.

The following examples are subframe configurations showing control channel beam placement and/or resource structure. The example figures for different control channel placement shown are not exhaustive and/or other control channel placements may be used. The figures are not meant to be exhaustive, e.g., all channels are not captured in the figure. For purposes of clarity and/or explanation, examples may be described in term of DL subframes and/or (e.g., only DL subframes are shown) UL subframes may be ignored.

One or more techniques described in terms of DL operation may be equally applicable to uplink operation. The wide transmit beams at the mB may be referred here as B1, B2, B3, B4 etc. The narrow transmit beams may be referred to as B11, B12 (e.g., within B1), B21, B22 (e.g., within B2) etc.

Figure 12:
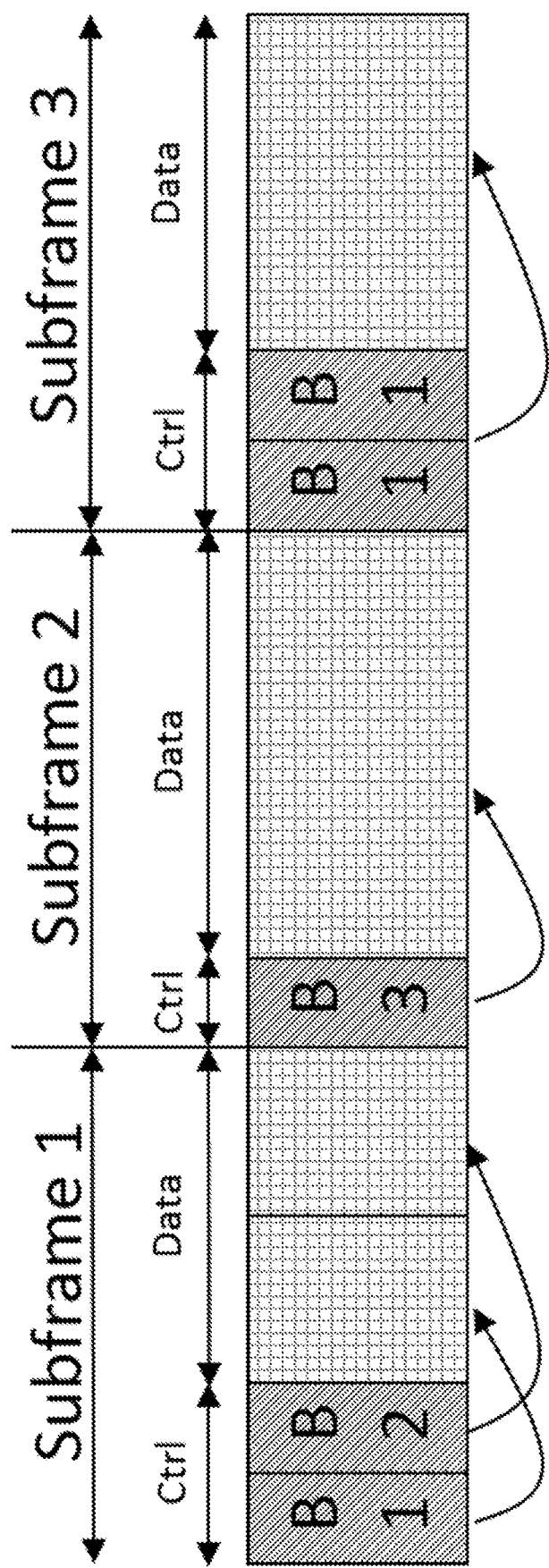

In FIG. 12, the mB may transmit one or more wide beam control channels per subframe. For example, subframe 1 may carry the control channel beams B1 and/or B2, subframe 2 may control channel beams B3, etc. A (e.g., one or more, or each) control channel beam may carry DCI for one or more WTRUs. A (e.g., one or more, or each) control channel beam within a subframe may carry some unique content. For example, a DCI for a WTRU (e.g., a particular DCI for a WTRU) may be carried in a (e.g., only one) control channel beam. A control channel beam within the subframe may carry the same DCI content. The number of control channel beams per TTI may vary. For example, it may range from one control channel beam per TTI to the maximum available number of control channel beams in the cell. Length/duration of a (e.g., one or more, or each) control channel beam may vary (e.g. from one to more symbols). The data region within a subframe may carry PDSCH for one or more WTRUs, e.g., the PDSCH transmission for different WTRUs may be multiplexed in time, frequency, and/or spatial domain. For example, multiple PDSCH beams may be transmitted within the data region. The beam width of a data beam may be adjusted based on one or more of the following: WTRU location, throughput requirements, and/or interference consideration, and/or the like. The mapping between the control channel beam and the symbol number within the control region may be flexible. WTRUs may receive assistance information about the control channel configuration, e.g., from PBCH and/or from Omni PCFICH channel.

Figure 13:
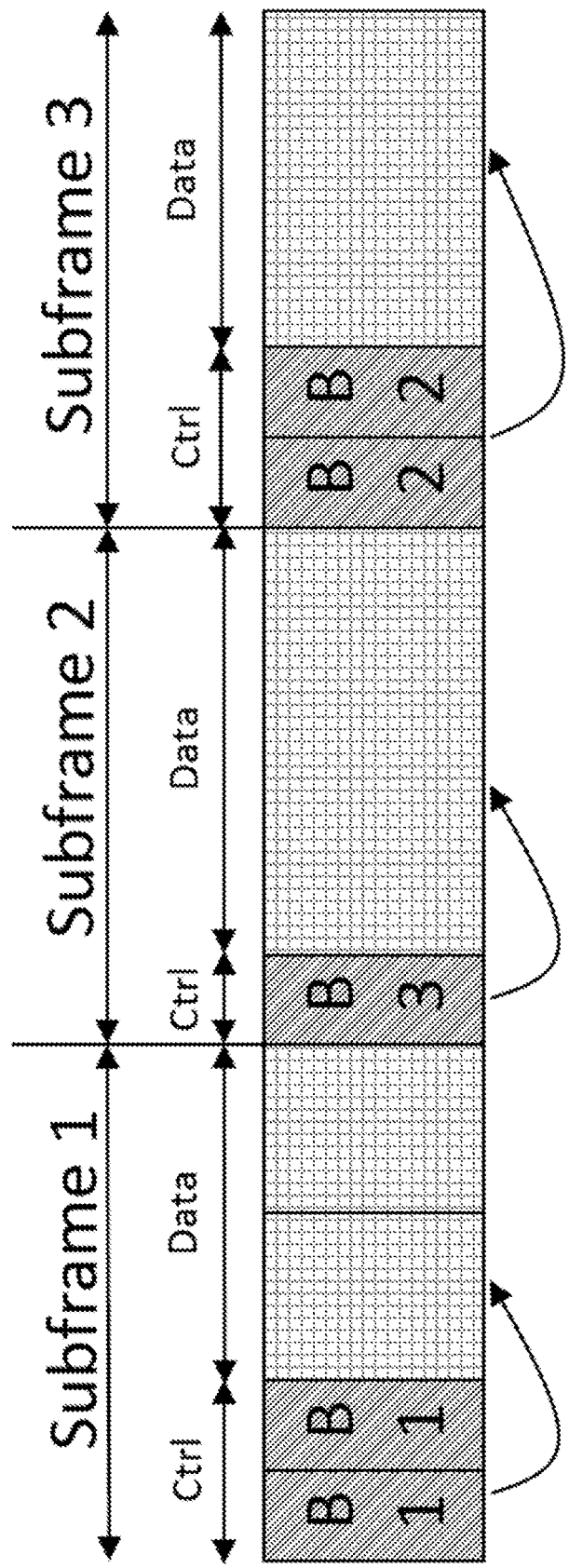
FIG. 13 is an example of PDCCH Type 1b.

In FIG. 13, mB may transmit one (e.g., exactly one) wide beam control channel per subframe. For example subframe 1 may carry the control channel beam B1 and/or B2, subframe 2 may carry control channel beams B3 etc. WTRUs may be configured to monitor certain (e.g., only certain) subframes for a possible occurrence of the pre-selected control channel beam.

Figure 14:
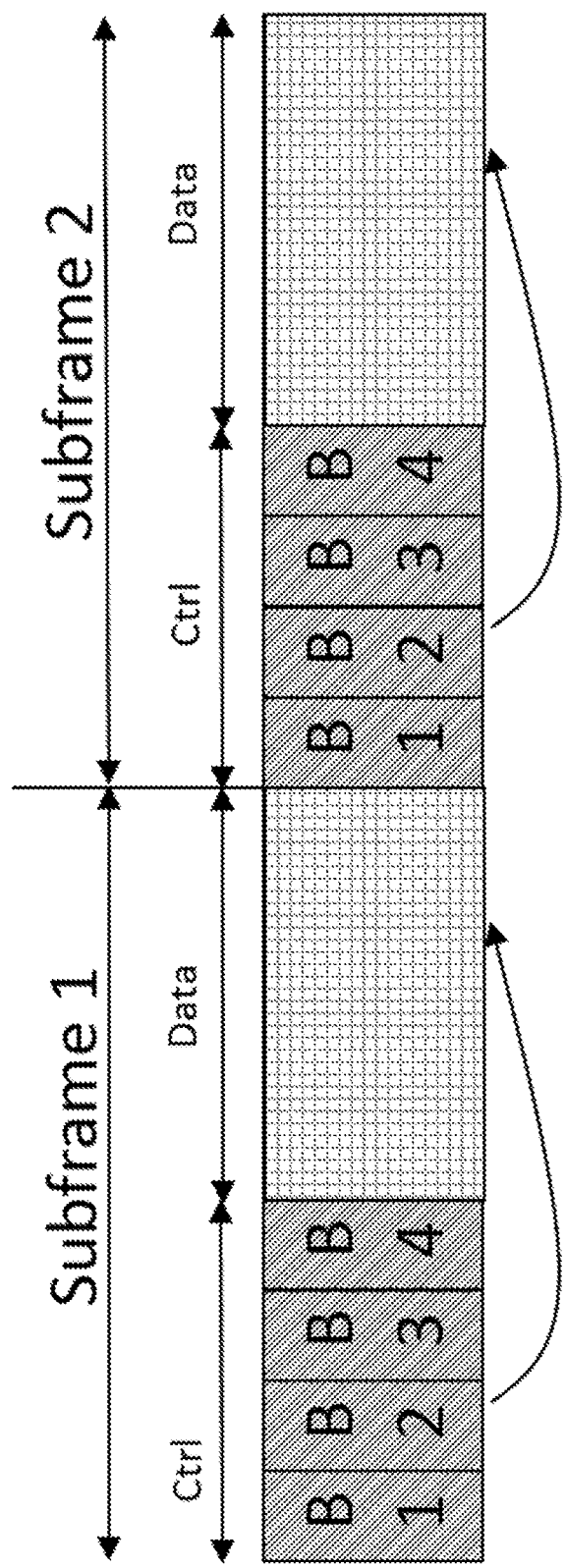
FIG. 14 is an example of PDCCH Type 2.

In FIG. 14, mB may sweep some or all the control channel beams in a subframe. For example a (e.g., one or more, or each) subframe may carry the control channel beam B1, B2, B3, and/or B4. A (e.g., one or more, or each) control channel beam may carry DCI for one or more WTRUs. WTRUs with lower SNR may have their DCIs repeated in certain (e.g., all) control channel beams. WTRUs with higher SNR may have their DCIs transmitted in a subset of control channel beams. The mapping between the control channel beam and the control symbol may be fixed. BRS for a control channel beam (e.g., rather than and/or in addition to control channels) may be swept.

Figure 15:
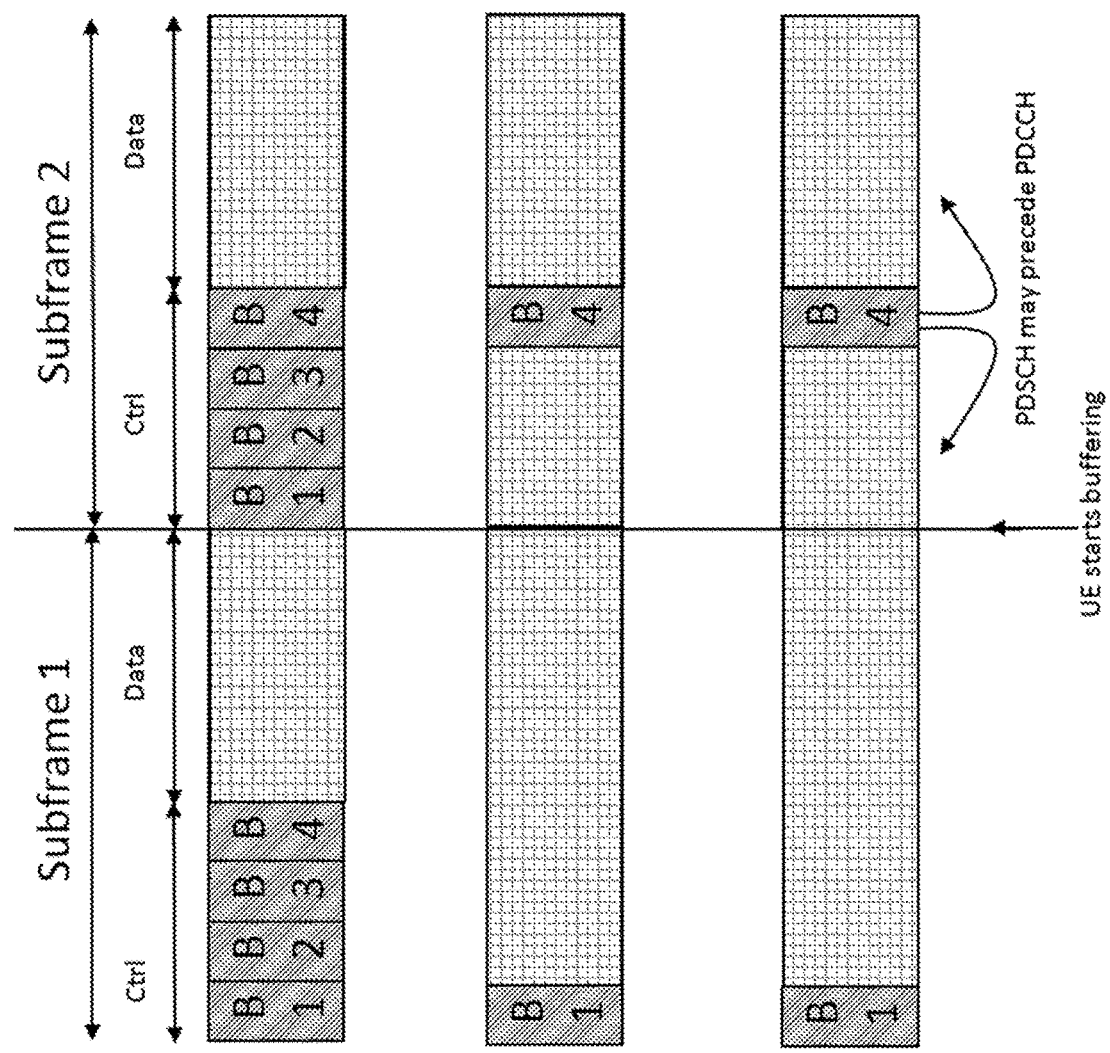

In FIG. 15, the control channel beam may be predefined to symbol mapping, e.g., to reduce the blind decoding attempts for the WTRUs. The WTRUs may attempt to decode the symbols (e.g., only the symbols) carrying pre-selected control channel beams. mB may map/place/transmit data channel beams in some control channel symbols, e.g., control channel symbols that may or might not be occupied by control channel beams. The WTRUs may start to buffer the symbols, e.g., for a possible data channel until it decodes the pre-selected control channel beam at the appropriate control symbol.

Figure 16:
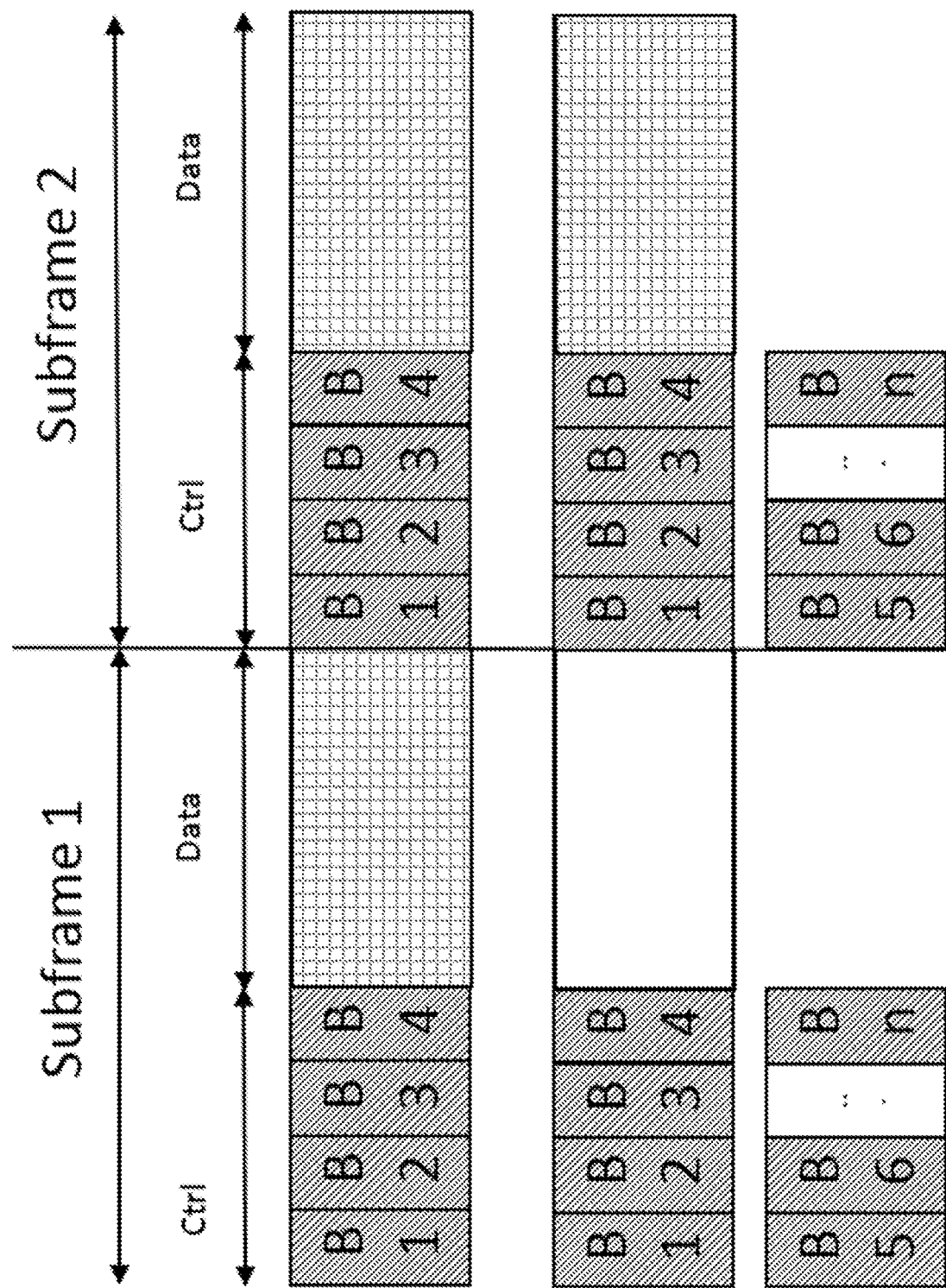
FIG. 16 is an example of PDCCH Type 3b.

In FIG. 16, many to one mapping may be utilized for control channel beam to control symbol mapping to reduce control overhead, e.g., when the number of control channel beams are high in a cell. In FIG. 16, B1 and/or B5 may be mapped to symbol 1. B1 and/or B5 may be transmitted in control symbol 1, e.g., when the assumption is that one RF chain may be for the mB. WTRUs having B1 control channel beam may be used (e.g., required) to decode control symbol 1. A hashing function may be used, e.g., to reduce blocking probability for control channel beams. The hashing function may avoid mapping the same set of control channel beams to the same control symbol. The hashing may be a function of one or more of the following: subframe number, system frame number, control channel beam ID, cell ID, the control symbol number, and/or the like.

Figure 17:
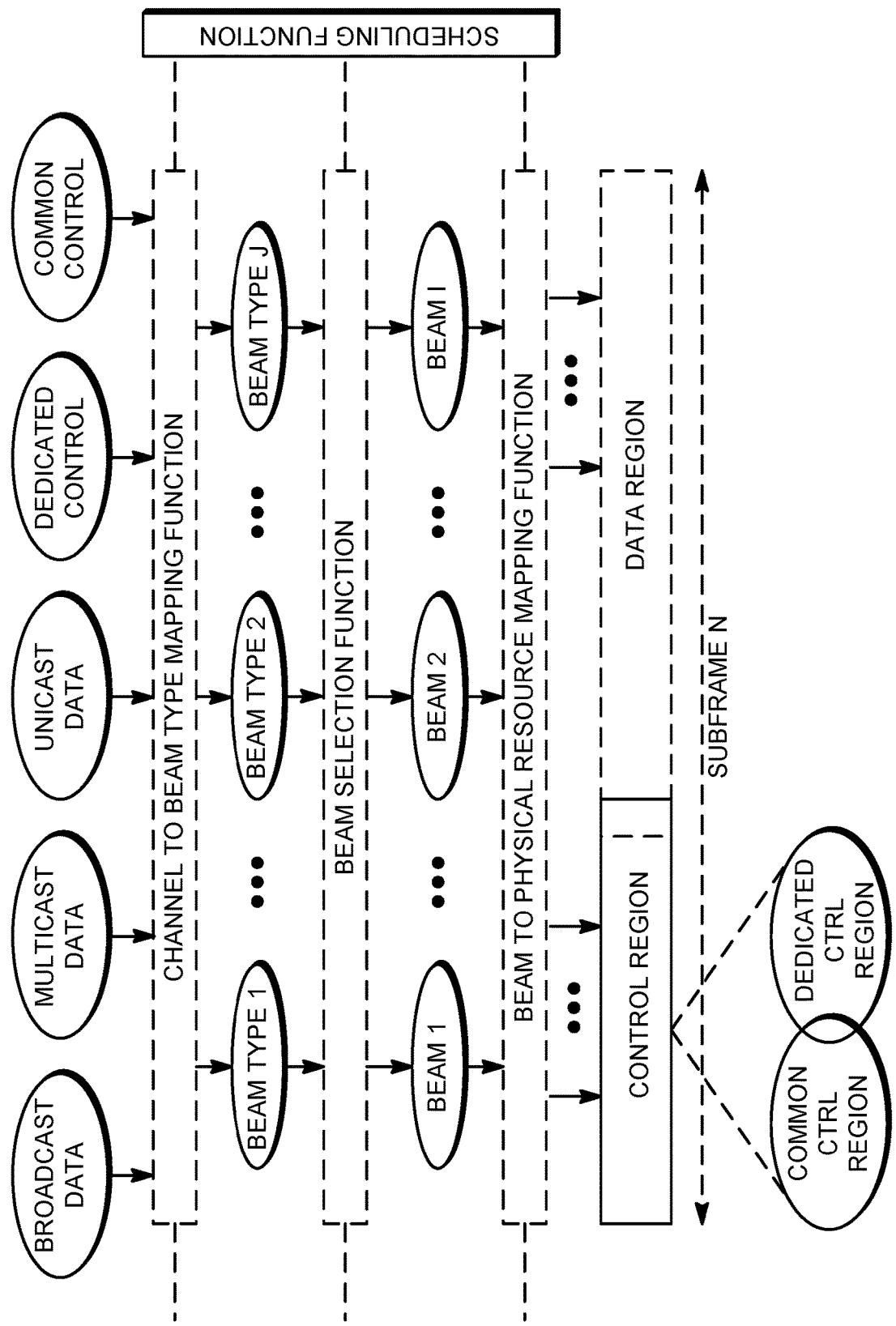
FIG. 17 is an example of a Logical Architecture for Control Channel Beam Generation.

FIG. 17 is an example of a logical architecture for control channel beam generation. FIG. 17 illustrates an example of the relation between the different mapping/selection functions.

A mmW PDCCH may use heterogeneous beam types. For WTRU specific control channel, wide beams may be configured and/or assigned for a group of users and/or one or more, or all, the users' control channels, e.g., PDCCHs that may carry user specific DL control information (DCI). One or more narrow beams may be configured and/or assigned for individual WTRU for WTRU-specific control channels. One or more wide beams may be configured, e.g., such that wide beam(s) may be used to cover a cluster of WTRUs and/or narrow beam(s) may be used for individual WTRUs. Table 2 is an example of some assignments and/or configurations for heterogeneous beam types. For common control channel, wide beam may be used for individual WTRU and/or a WTRU group. Narrow beam may be used for individual WTRU (e.g., individual WTRU only). Narrow beam may be used as WTRU-specific beam for common control, e.g., depending on the beam configurations. Wide beams (e.g., only wide beams) may be used for a group of WTRUs for common control. For WTRU-specific control channel, narrow beam may be used as WTRU-specific beam for WTRU-specific control. Wide beam (e.g., only wide beams) may be used for a group of WTRUs for WTRU-specific control.

A wide beam may be configured and/or used as a WTRU-specific beam for control channels, e.g., to enable easy tracking of WTRUs. The control channels may be common control channels. The control channels may be WTRU-specific control channels, e.g., common DCI carried by PDCCH, and/or ePDCCH, and/or the like. This may enable easy tracking of WTRUs. This may sometimes lower beamforming gain. Easy tracking of WTRUs may be useful. Easy tracking of WTRUs may be useful where beamforming gain may be less of a concern. Beamforming gain may be less of a concern when WTRUs are near the eNB and/or AP. Narrow beam(s) may be configured and/or used (e.g., only used) as WTRU-specific beam(s) for control channels, e.g., to enable high beamforming gain. High beamperforming gain may be useful, e.g., when WTRUs are far away from eNB and/or AP. High beamperforming gain may be useful, e.g., when WTRUs are around the cell edge. The control channels may be common and/or WTRU-specific control channels. The WTRU-specific control channels may be WTRU-specific DCI carried by PDCCH, and/or ePDCCH, and/or the like.

Beams with different beam widths may be used to cover different WTRU densities (e.g., the number of WTRUs in a given direction/area relative to the mB). The pairing for which beam with certain width to cover which WTRU density may depend on the density distribution of WTRUs in geography. For example, for high density area, beams with narrower beam width may be configured and/or used. For low density area, beams with medium and/or larger beamwidth may be configured and/or used.

Beams may be allocated to WTRUs, e.g., such that WTRU density per beam (e.g., number of WTRUs in a beam) may be uniform and/or constant. This may facilitate the use of digital beamforming within analog beam, e.g., to support a given number of active WTRUs. The number of analog beams may be reduced. The control overhead may be mitigated, e.g., when multiple control channels may be sent simultaneously in the same beam and/or frequency resource. Trade-off may occur between the number of OFDM symbols (e.g., for beam sweeping) for control and/or the number of OFDM symbols for data. Different compromises between overhead and throughput may be considered based on the specific deployment scenario.

Heterogeneous beam types with different beam widths may be configured and/or used, e.g., to improve network operation flexibility and/or to reduce the control overhead.

Heterogeneous beam types may support one or more of the following: heterogeneous beam types with different beam widths for common and/or WTRU specific channel, heterogeneous beam types with different beam widths for the same WTRU at different time instance, heterogeneous beam types with different beam widths for different WTRUs, and/or heterogeneous beam types with different beam widths for group of WTRUs depending on WTRU's locations, and/or the like. The heterogeneous beam types with different

TABLE 2

Examples for Assignments and/or Configurations for Heterogeneous Beam Types

| | | Wide beam | Narrow beam |
|---|---|---|---|
| Common Control | Individual WTRU | May use wide beam for easy tracking of WTRUs, etc. WTRU-specific wide beam for common control. | May use narrow beam for high beamforming gain. WTRU-specific narrow beam for common control. |
| | WTRU group | May use wide beam for WTRU group | May or might not use narrow beam |
| WTRU-specific Control | Individual WTRU | May use wide beam for easy tracking of WTRUs, etc. WTRU-specific wide beam for WTRU-specific control. | May or might not use narrow beam for high beamforming gain. WTRU-specific narrow beam for WTRU-specific control. |
| | WTRU group | May use wide beam for WTRU group | May or might not use narrow beam | beam widths may be configured and/or used for common control and/or WTRU-specific control channel. Heterogeneous beam types with different beam widths may be configured and/or used for the same WTRUs at different time instance. Heterogeneous beam types with different beam widths may be configured and/or used for different WTRUs at the same and/or different time instances. Heterogeneous beam types with different beam widths may be configured and/or used for a group of WTRUs, e.g., a group of WTRUs with various WTRU's locations. The control overhead, e.g, the number of OFDM symbols for control with respect to the number of OFDM symbols for data and/or the number of beams needed for beam sweeping with respect to number of OFDM symbols for data, may be reduced.

One or more of the following beam configurations may be considered, e.g., when one RF chain and/or a (e.g., one) beam are formed at a (e.g., any) given time.

A beam sweeping may use homogeneous beam type (e.g., homogeneous wide beam). A (e.g., one or more, or each) beam may have the same beam width covering 360/N degrees where N is the number of OFDM symbols for control channel. For example, one or more, or each, beam will cover 120 degrees at a time for N=3. A beam sweeping cycle may cover 360 degrees. Homogeneous beam type may be for uniform angular distribution of WTRUs. Homogeneous beam type may become less efficient, e.g, for non-uniform angular distribution of WTRUs, Heterogeneous beam type may be efficient, e.g., for non-uniform angular distribution of WTRUs. A beam sweeping may use heterogeneous beam type (e.g., heterogeneous wide beam). One or more, or each beam may have different beam width but still covering 360/N degrees where N is the number of OFDM symbols for control channel. One or more, or each beam may cover more or less than 120 degrees at a time and/or full beam sweeping cycle will cover 360 degrees. For example, for N=3 beams may have beam widths 60, 120 and/or 180 degrees. An eNB may keep the number of WTRUs per beam uniform and/or constant when it transmits control channel to a (e.g., one or more, or each) WTRU. Uniform search space for control channel may be maintained. Search space may avoid being over-utilized for some beams and/or under-utilized for other beams.

The number of WTRUs per beam may be kept constant and/or near constant, e.g., when two or more RF chains are utilized for hybrid beamforming. Within a beam (e.g., one or more, or each beam) the number of ranks for spatial multiplexing may be limited. Keeping number of WTRUs under such rank per beam may be performed to enable spatial multiplexing for future evolution.

Beam sweeping may use narrow beams. A beam may have narrow beam width but cover WTRUs within N OFDM symbols for control channel. For example, one or more, or each beam may have narrow beam width but cover one or more, or all WTRUs within N OFDM symbols for control channel. One or more, or each beam may cover a WTRU at a time and/or a full beam sweeping cycle may cover N WTRUs. For K WTRUs, if N>=K, one beam sweeping cycle may deliver control channel to K WTRUs within a TTI. If N<K, one beam sweeping cycle may or might not deliver one or more, or all control channels to one or more, or all K WTRUs within a TTI. Another TTI and/or TTIs may be used (e.g., required) to deliver control channel to remaining K−N WTRUs. How many TTIs may be used (e.g., required) for beam sweeping may depend on N and/or K. K/N beam sweeping cycles and/or TTIs may be required to deliver one or more, or all control channel to all K WTRUs. This example may work for N>=K. This example may become less efficient when N<K. Overhead may increase, e.g., when the number of OFDM symbols for control increases. The number of WTRUs that may be supported may be limited, e.g., when the number of users and/or K decreases. Beam sweeping may be performed across multiple TTI, introducing latency (e.g., additional latency).

Beam sweeping may use heterogeneous beam type (e.g., heterogeneous wide/narrow beams). A beam may have a wide and/or narrow beam width but cover WTRUs within N OFDM symbols for control channel. For example, one or more, or each beam may have one or more, or each wide and/or narrow beam width but cover one or more, or all WTRUs within N OFDM symbols for control channel. One or more, or each beam may cover one or more WTRUs at a time and/or full beam sweeping cycle will cover N WTRUs. For K WTRUs, if N>=K, one beam sweeping cycle may deliver control channel to K WTRUs within a TTI. If N<K, one beam sweeping cycle may deliver one or more, or all control channels to one or more, or all K WTRUs within a TTI. For example, N−1 narrow beams may deliver control to N−1 WTRUs, and/or the last beam (wide beam) may deliver control to the remaining K−N+1 WTRUs. Another TTI and/or TTIs may or might not be used (e.g., required) to deliver control channel to remaining K−N WTRUs. How many narrow beams and/or wide beams may be used (e.g., required) may depend on design considerations and/or N and/or K. Using heterogeneous beam type may lower control overhead, lower latency, and/or increase the number of WTRUs that may be supported.

Heterogeneous beams may be considered. Heterogeneous beams may be s plurality of beams associated with one or more different characteristics and/or properties, e.g., beam width, transmit power, number of lobes, and/or number of active antenna elements, and/or the like. Beams with different beam widths and/or narrow beam may be used for the same cell and/or eNB. A narrow beam carrying control information and/or PDCCH may be used for individual WTRUs. Wide beams may be used for a group of control channels and/or PDCCHs. Heterogeneous beam types, e.g., wide and/or narrow beams, may be used. Heterogeneous beam widths for wide beam may be used. Different beam types and/or beam widths may be used, e.g., when beam sweeping is needed. For example, for three beams, beams 1, 2 and/or 3 may have beam width x, y and/or z respectively. For uniform settings beams 1, 2 and/or 3 may have beamwidth, x=y=z. For non-uniform settings x, y and/or z may or might not equal to each other. Depending on the settings of x, y and/or z, wide beam with different beam widths and/or narrow beam may be configured and/or formed.

To support beamforming reference signal (BRS), antenna ports may be designed to transmit BRS. Beam-specific antenna ports may be designed and/or allocated. Antenna port may be designed for beams that may be used for sending either common control and/or WTRU-specific control information. An antenna port may be associated with a reference signal called BRS. A BRS may be used to demodulate control channels. Antenna ports may be orthogonal to each other in time, frequency, code and/or any combination of them, e.g., to avoid mutual interferences among BRS. A design may use even/odd pattern for BRS. Even and/or odd BRS may be allocated in different frequency and/or time grid(s). Even BRS (E-BRS) may be placed in the same frequency and/or time grid(s). Odd BRS (O-BRS) may be placed in the same frequency and/or time grid(s). E-BRS and/or O-BRS may be allocated in different resources, e.g, resources that are orthogonal to each other. For control channel, control beam RS (CBRS) may be used. Even CBRS (E-CBRS) may be placed in the same frequency and/or time grid(s). Odd CBRS (O-CBRS) may be placed in the same frequency and/or time grid(s). E-CBRS and/or O-CBRS may be allocated in different resources, e.g., resources that are orthogonal to each other. For data channel, data BRS may be used.

In even beam, EAP may send E-CBRS for control channel. In odd beam OAP may send O-CBRS for control. EAP and/or OAP may be in orthogonal resources. E-CBRS and/or O-CBRS may be in orthogonal resources. Mutual interference between EAP and/or OAP or between E-CBRS and/or O-CBRS may be avoided.

One or more (e.g., only one) BRS (e.g., rather than and/or in addition to two BRS (E-CBRS, O-CBRS)) may be used. A (e.g., perfect) spatial separation may be achieved, e.g., to make one BRS more efficient than other designs. A BRS in even beam and/or E-CBRS may be active for control channel. BRS in odd beam and/or O-CBRS may or might not be active for control channel. BRS in odd beam and/or O-CBRS may be reused for data. O-CBRS may be active for control and/or E-CBRS may or might not be active for control. E-CBRS may be reused for data. CBRS in even and/or odd beam may or might not be reused for data, e.g, when perfect spatial separation may or might not be achieved. Side lobes of beams may be related to spatial separation. For example, side lobes of beams may prevent perfect spatial separation. Antenna patterns may be considered when designing antenna ports for BRS and/or CBRS. Side lobes may be considered when designing antenna ports for BRS and/or CBRS. Antenna ports and/or BRS design for data beam may be similar.

Spatial separation and/or resource reuse factor may be related to the efficiency of the channel design. For example, E-CBRS and/or O-CBRS may avoid mutual interferences between them, when resource reuse factor of two is considered. Resource reuse factor of two may be considered efficient. Resource reuse factor Q=1 may be considered, e.g., when perfect spatial separation is achievable. Reuse factor Q may be set to two or higher, e.g. when perfect spatial separation may or might not be achieved. Reuse factor may be set to one, e.g., for sequential beam sweeping for control channel. Resource reuse factor may be set to two or higher, e.g., for parallel beam sweeping and/or transmission. Parallel beam sweeping and/or transmission may occur, e.g., when two or more beams transmitted in parallel simultaneously sweep through K WTRUs via N OFDM symbols for control. During parallel beam transmission, potential mutual interferences between beams may occur, e.g., when spatial separation is not perfect. Resource reuse factor may be set to two or higher.

For multi-layer beamforming, e.g., when wide beam and/or narrow beam may coexist, some offset in frequency/ time grids may be applied to enable orthogonality between BRS for wide and/or narrow beams. Narrow beam may serve one WTRU among a WTRU group while a wide beam may serve the remaining WTRUs in the WTRU group, e.g., when they may (e.g., must) be served simultaneously, two (e.g., only two) beams are available, and/or the two beams may comprise a wide beam and/or a narrow beam. The narrow beam and/or wide beam may overlap. Narrow beam and/or wide beam may use FDM to enable coexistence, e.g., when spatial separation between them does not occur. BRS using FDM may be applied for narrow beam and/or wide beam.

One or more techniques associated with BRS may be applied to data BRS and/or control BRS. Control channel may be decoded. For example, channel estimation may be performed via CBRS to decode control channel.

Energy detection may be used for channel estimation and/or control channel demodulation, e.g., in even beam. For example, in even beam, E-CBRS may be on and/or O-CBRS may be off. No beam index may be decoded beforehand. Energy detection may be used to decide which antenna port to be used for channel estimation to decode control channel.

Channel estimation may be performed to decode data channel, e.g, when even/odd BRS is used. Beam index may already be decoded in control channel. Even/odd beam index may be obtained by one or more of the following. In even beam, even DBRS may be on, odd DBRS may be off, e.g., to avoid mutual interference between BRS at beam edge. Energy detection may be used to decide which antenna port may be used for channel estimation. It is similar for odd beam. In even beam, even DBRS may be on, odd DBRS may be on but may be used for data, redundant data may be for control and/or carry some short control message. Mutual interference between RS and/or data/else at beam edge may occur. It is similar for odd beam.

The WTRU may or might not be dependent on blind energy detection. The WTRU may decide between even/odd DBRS, perhaps for example even if a WTRU may or might not detect correct energy level. There may be an assumption that data demodulation may be performed after control channel decoding. One or more beam index may be (e.g., already) obtained in the control channel decoding.

A (e.g., one or more, or each) cell may have plurality of PDCCH regions, e.g. one for one or more, or each wide beam. A (e.g., one or more, or each) PDCCH may carry beam specific BRS sequence. The BRS REs mapping in the control channel symbols may be a function of PCI. The BRS REs mapping in the control channel symbols may be a function of beam index. The sequence carried in the BRS may be provided by the linked PBCH.

WTRUs may monitor PDCCH. WTRUs may detect BRS associated with the serving beam at control symbol location. The control symbol location may be fixed. WTRUs may perform BRS detection operation in certain (e.g., one or more, or all) control symbols defined by cell PCFICH, e.g., when the control symbol locations are not fixed and/or variable. WTRUs may perform BRS detection operation in the control symbols (e.g., only the control symbols) defined by beam-specific PCFICH. e.g., perhaps when the control symbol locations might not be fixed and/or variable. WTRUs may compare the measured BRSRP with an implementation dependent threshold. WTRUs may perform PDCCH decoding, e.g., when BRSRP is greater than the threshold. WTRUs may assume no DL/UL grant received in the current TTI, e.g., perhaps unless a semi-static grant is configured.

Figure 18:
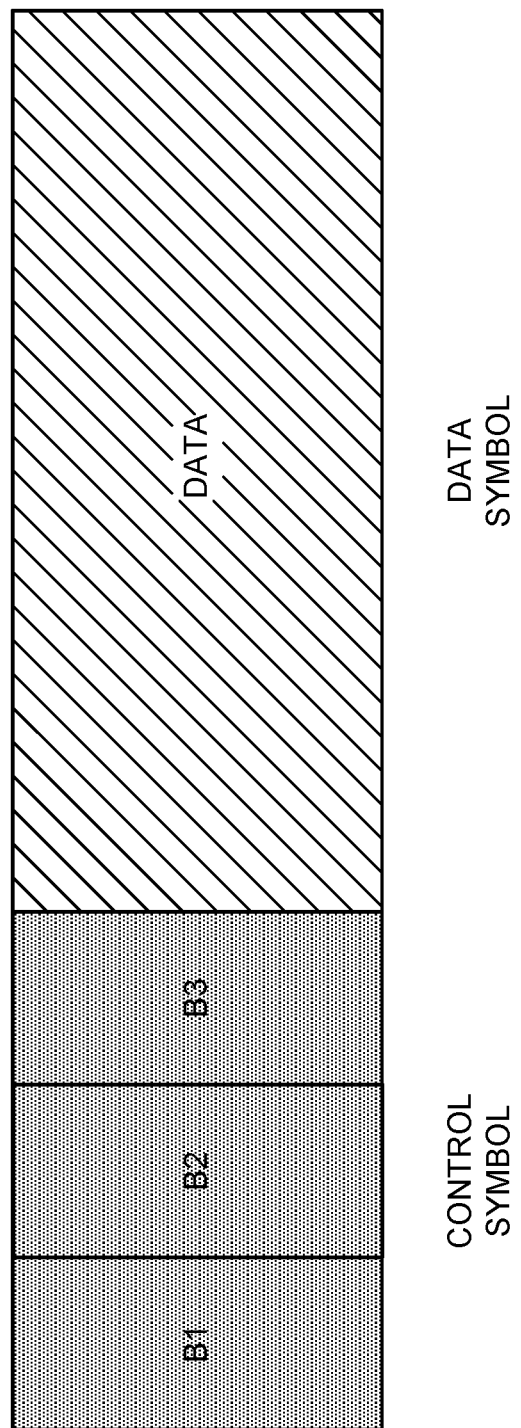
FIG. 18 is an example of a Subframe Structure and Placement for Control BRS.

Subframe structure and/or placement for PDCCH BRS may be designed. For sequential beam sweeping, FIG. 18 may be an example subframe structure and/or placement for control BRS. The resources may be indicated in the FIG. 18. Example subframe in FIG. 18 shows three control symbols followed by some data symbols. Beams may be swept through three control symbols sequentially by the order of beams 1, 2 and/or 3 (e.g., B1, B2 and/or B3).

Figure 19:
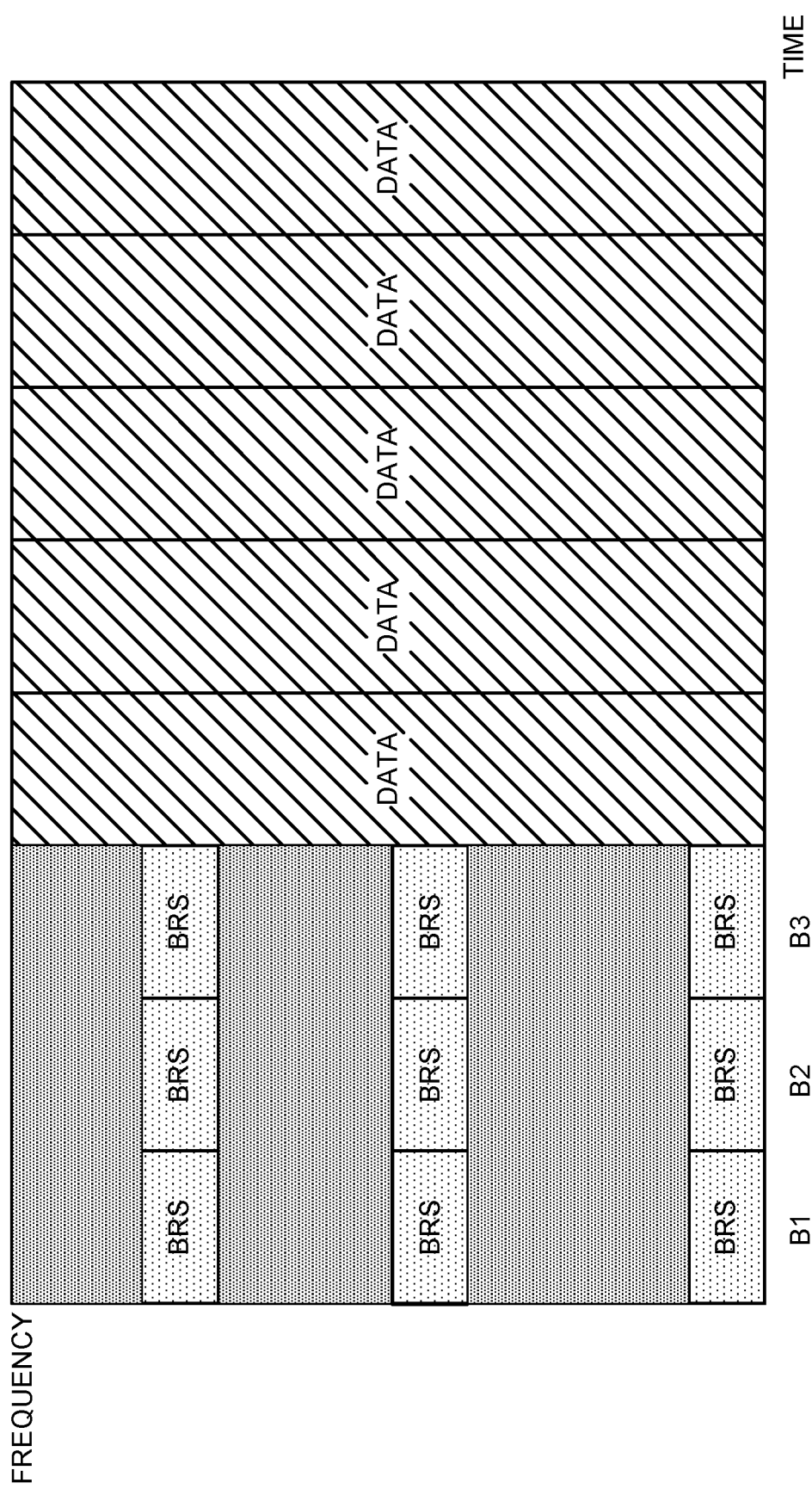
FIG. 19 is an example of Resource Allocation in Two Dimension of Frequency and Time.

FIG. 19 may be an example resource allocation in two dimension of frequency and/or time. BRS may be used in a (e.g., one or more, or each) control symbol and/or may be placed uniformly (and/or non-uniformly) across frequency. FIG. 19 shows that BRS may have the same location in frequency across one or more, or all control symbols. Other allocations may be used, e.g., BRS may be in different locations in frequency across different control symbols. BRS may be in staggered patterns and/or designs.

Figure 20:
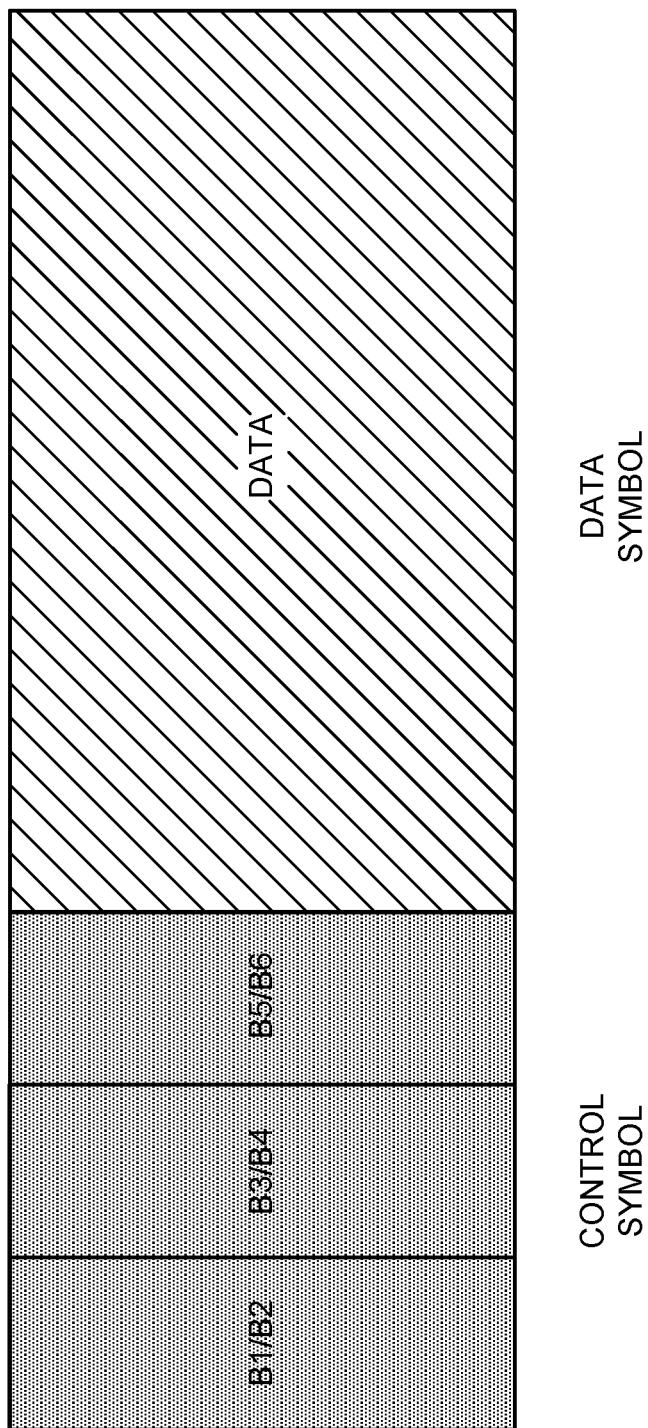
FIG. 20 is an example of a Subframe Structure and Placement for Control BRS for Parallel Beam Sweeping.

FIG. 20 may be an example control BRS subframe structure and/or placement for parallel beam sweeping. The resources are also indicated in the block diagram. Example subframe in FIG. 20 shows three control symbols followed by some data symbols. One or more beams may be swept through three control symbols sequentially by the order of beams 1&2, 3&4 and/or 5&6 (e.g., B1/B2, B3/B4 and/or B5/B6). Parallel beams may be used in a control symbol. Two parallel beams may be used simultaneously in a control symbol. For example, total six beams may be swept through three control symbols. The number of users to be covered by the control channel may increase by using parallel beam transmission and/or sweeping. The capacity of system may increase.

Figure 21:
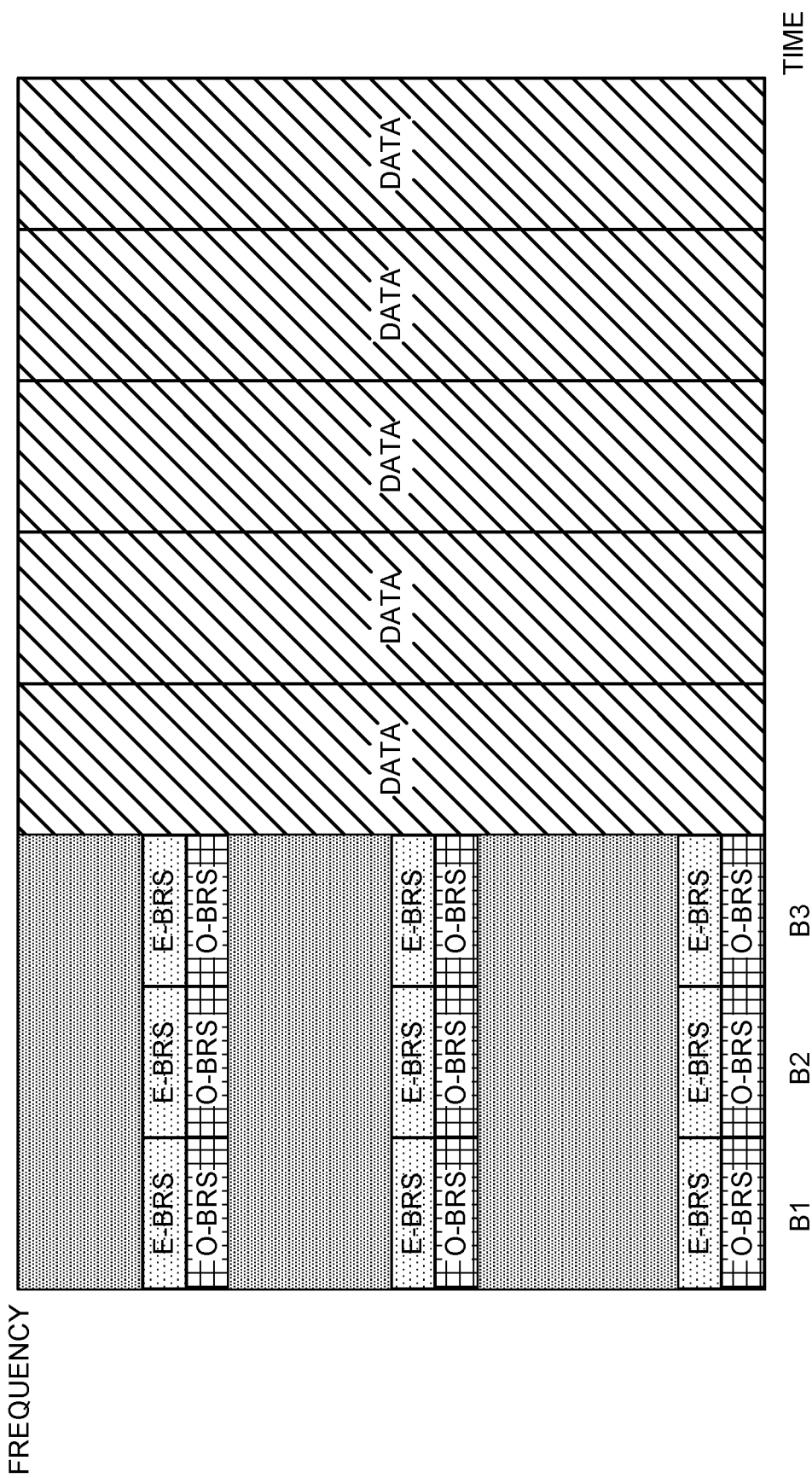
FIG. 21 is an example of Resource Allocation in Two Dimension of Frequency and Time.

FIG. 21 may be an example resource allocation in two dimension of frequency and/or time. BRS may be used in a control symbol and/or may be placed uniformly (and/or non-uniformly) across frequency. BRS may also be placed contiguously and/or non-contiguously. For example, O-BRS and/or E-BRS may be placed contiguously within a pair of O-BRS/E-BRS. Pairs of O-BRS/E-BRS may be placed uniformly and/or non-uniformly across frequency. O-BRS and/or E-BRS may be placed non-contiguously within a pair of O-BRS/E-BRS. Pairs of O-BRS/E-BRS may be placed uniformly and/or non-uniformly across frequency. Example may show that O-BRS/E-BRS pairs have the same location in frequency across one or more, or all control symbols. Other allocations may also be used, e.g. when BRS may be in different locations in frequency across different control symbols. A BRS may be in staggered patterns and/or designs.

Designs of mmW PCFICH may comprise, e.g., cell specific control region and/or beam specific control region. In a subframe, one or more beamformed control channel(s) may be transmitted during one or more control symbol(s) time multiplexed within a control region. The overall control region size/length/duration may be a function of one or more of the following: the number of control channel beams selected for transmission, the number of control symbols occupied by a (e.g., one or more, or each) control channel beam, a pre-defined max size/length/duration of beam specific control region, and/or a pre-defined max size/length/duration of cell specific control region, and/or the like.

The number of control channel beams and/or maximum number of control channel beams in a subframe may be fixed. The number of control channel beams may be less than or equal to the total number of control channel beams in the cell coverage. The number of control symbols may be a function of the number of control channel beams and/or the number of symbols per control channel beam. The number of control symbols and/or the maximum number of control symbols in a subframe may be fixed. The partial sweep function and/or a control channel beam subset selection function may select control channel beams based on one or more of the following: the number of control symbols in a subframe, and/or the number of control symbols per control channel beam, and the like. The ratio of control symbols to data symbols may be configured to be less than or equal to a pre-defined value (e.g. control overhead percentage). The number of control symbols per control channel beam may be a function of number of WTRUs within the control channel beam and/or type of the control channel beam (e.g. common control beam and/or WTRU specific control beam).

At least a part of the control region may be one part of a number of parts of the control region. The number of parts of the control region may be a function of a number of symbols configured for the control region. The number of parts of the control region may be a function of a number of symbols used for the control region.

Cell specific control region configuration may be indicated. WTRUs may receive indication and/or configuration of cell specific control region from broadcast channel(s) (e.g., MIB, SIB-x) and/or any other common channel. The configuration may be WTRU specific. The configuration may be signaled using dedicated signaling (e.g. MAC and/or RRC message). A physical channel/signal (e.g., cell PCFICH) may be defined. A physical channel/signal may carry the configuration, e.g., for cell specific control region. A new physical channel/signal may be placed in one or more pre-defined symbol(s) in a subframe. Cell PCFICH may be transmitted with an Omni-beam and/or wide beam. Cell PCFICH may be transmitted with a narrow beam. Cell PCFICH may comprise two or more repetitions in wide beams. Cell PCFICH may comprise two or more repetitions in narrow beams. WTRUs may accumulate the energy from cell PCFICH repetitions to increase SNR. Cell PCFICH may be repeated in different directions, e.g., when transmitted using wide and/or narrow beam to provide coverage. Cell PCFICH may be repeated in different beam widths, e.g., when transmitted using wide and/or narrow beam to provide coverage. The beam used for cell PCFICH may be same as the beam used for one or more of synchronization channels (PSS and/or SSS and/or any other signal). The beam used for cell PCFICH may be the same as the beam used for PBCH. One or more WTRUs may determine the location of the cell PCFICH symbol by applying a pre-defined offset from symbol carrying PSS in the same beam.

At least one DL control channel may be communicated via one or more Orthogonal Frequency Division Multiplexing (OFDM) symbols. The one or more OFDM symbols on which the at least one DL control channel may be communicated may be located in the control region. A WTRU may obtain a number of the one or more OFDM symbols in the control region via a Physical Control Format Indicator Channel (PCFICH). In some scenarios the PCFICH may be obtained via a beam of a synchronization channel and/or via a beam of a Physical Broadcast Channel (PBCH).

WTRUs may determine the location of the cell PCFICH symbol by applying a pre-defined offset from symbol carrying SSS in the same beam. One or more WTRUs may determine the location of the cell PCFICH symbol by applying a pre-defined offset from symbol carrying PBCH in the same beam. The linkage (e.g., a pre-defined offset between two channel/beams) may be used to determine time and/or frequency location of a channel/beam when the time and/or frequency location of another channel/beam Cell PCFICH may be included in a subframe (e.g., every subframe). The linkage (e.g., a pre-defined offset between two channel/beams) may be used to determine time and/or frequency location of a channel/beam when the time and/or frequency location of another channel/beam Cell PCFICH may be included in n subframes and/or subframe (e.g., every n subframes and/or every subframe). Cell PCFICH may be transmitted in pre-defined locations within a subframe, e.g., first few symbols of a subframe.

At least one search space corresponding to at least one reference signal may be monitored for at least one data channel, perhaps for example upon the detection of the at least one reference signal. The at least one search space may have a duration. A time location of the at least one data channel may be determined, perhaps for example based on the at least one reference signal, or the duration.

The cell specific control region size may be fixed. The cell specific control region size may indicate the maximum size/length/duration of the cell specific control region. The cell specific control region size may be semi-static. The cell specific control region size may indicate the size/length/duration of the cell specific control region for n subframes. n may be greater than or equal to the periodicity of corresponding MIB/SIB-x and/or other common channels (e.g., any other common channel). The cell specific control region size may be a greater than or equal to the sum of beam specific control region size of certain (e.g., one or more, or all) control channel beams transmitted in that subframe. Cell specific control region size may be equal to the product of max beam specific control region size and/or max number of control channel beams in a subframe. The max beam specific control region size and/or max number of control channel beams in a subframe may be pre-defined in the standard. The max beam specific control region size and/or max number of control channel beams in a subframe may be configured in common/broadcast channels. One or more symbols within the control region may carry data channels, e.g., when the cell specific control region size is greater than the sum of beam specific control region size of certain (e.g., one or more, or all) of the control channel beams transmitted in that subframe. WTRUs may receive more than one configuration for cell specific control region. For example one configuration may apply for subframes with flexible mapping. One configuration may apply for subframes with fixed mapping.

One or more WTRUs may receive configuration for flexible mapping (e.g., only for flexible mapping), and/or WTRUs may apply a pre-defined configuration (e.g. fixed and/or max length for cell specific control region) for fixed mapping. A configuration may apply for common control channels, and/or a configuration for WTRU specific control channel. The cell specific control region configuration, for example cell PCFICH, may be dynamic. The cell specific control region configuration, for example cell PCFICH, may vary for a (e.g., every) subframe. Cell PCIFCH may indicate presence of common control region within a subframe. Cell PCFICH may indicate the end and/or start of common control region within a subframe. WTRUs may assume that the rest of the control region not occupied by common control region may be dedicated control region.

Cell specific control region configuration may have contents. The configuration may include and/or identify the length of the cell specific control region size/duration/period. The length may be expressed in one or more of the following: a number of subframes, timeslots, and/or OFDM symbols, and/or the like. One or more WTRUs may assume the start of a cell specific control region as the first symbol in a subframe. WTRUs may receive explicit indication of the first and/or last symbol of the cell specific control region. The value transmitted in the cell specific control region configuration may be a logical value. The value transmitted in the cell specific control region configuration may have a pre-defined mapping to the actual duration/length/period of the cell specific control region. A WTRU may use the indications of a cell specific control region configuration to calculate and/or determine the end of the cell specific control region. A WTRU may use the indications of a cell specific control region configuration to calculate and/or determine start of the data region. The configuration may include/identify number of control channel beams transmitted in a subframe (e.g., in the current subframe and/or in n subsequent subframes and/or in some or all subframes). The configuration may include/identify the type of mapping applied for control channel beams (e.g., fixed and/or flexible mapping). The configuration may include beam identification (e.g., RS sequence ID, antenna port number, and/or control channel number) of certain (e.g., one or more, or all) control channel beams transmitted in a subframe. The subframe may be the current subframe, n subsequent subframes, and/or certain (e.g., one or more, or all) subframes.

Beam specific control region configuration may be indicated. One or more WTRUs may receive indication and/or configuration for beam specific control region size from broadcast channel(s) (e.g., MIB, SIB-x). WTRUs may receive indication and/or configuration for beam specific control region size from any other common channel/signal. Beam specific control region size/length/duration may be pre-defined as a constant value. The constant value may be treated as a max value. Different beams in a cell may have different beam specific control region configurations. Beam specific control region size/length/duration may be semi-static. Beam specific control region configuration may vary for different beams in the cell. For example, common control channel beams may have a configuration different from the configuration for the WTRU specific control channel beams. Beam specific control region configuration for common control channel may be fixed and/or semi-static. Beam specific control region configuration for WTRU specific control channel beams may be dynamic.

The configuration may be WTRU specific and/or beam specific. The configuration may be signaled using dedicated signaling (e.g. MAC and/or RRC message). In the absence of dedicated signaling, WTRUs may apply the configuration in MIB/SIB-x and/or a pre-defined value. A physical channel/signal (for example beam PCFICH) may be defined. The physical channel/signal may carry the configuration for beam specific control region. A cell and/or mB may transmit multiple beam PCFICH in the same subframe. A beam PCIFCH may be transmitted with a specific beam pattern and/or beam width. A beam PCIFCH may carry the corresponding beam specific control region configuration. Beam specific control region configuration for a particular beam may vary across subframes. Beam PCFICH for a beam in a subframe may be transmitted conditionally based on the presence of corresponding (e.g., beam with similar properties and/or characteristics) control channel beam in that subframe. Beam PCFICH transmission may be coupled with control channel beam transmission. The control channel and/or the beam PCFICH, e.g., within a beam dwell time, may be transmitted. The beam used for beam PCFICH may be same as the corresponding control channel for which the configuration may be provided/signaled. Beam PCFICH may be time multiplexed (e.g., different symbol and/or first few symbols in a PDCCH). Beam PCFICH may be frequency multiplexed (e.g. CCEs, REs, and/or RBs) with the control channel transmission.

The mB may transmit certain (e.g., one or more, or all) the beam PCFICHs and/or transmit the control channel beams in certain order. The mB may multiplex beam PCFICH and/or cell PCFICH and/or control channel, e.g., when the cell PCFICH is transmitted with a wide and/or narrow beam. The mB may multiplex beam PCFICH and/or cell PCFICH and/or control channel, e.g., when the cell PCFICH is transmitted with a wide and/or narrow beam. The beam PCFICH may carry cell specific configuration and/or beam specific control region configuration. Beam PCFICHs may be transmitted with a different beam pattern from the beam pattern used by the control channel beams. A (e.g., one) beam PCFICH may carry the configurations for multiple control channel beams. WTRUs may determine the presence of beam PCFICH. For example, WTRUs may determine the presence of beam PCFICH indicated by a bit and/or bitmap in cell PCFICH. WTRUs may determine the presence of beam PCFICH indicated by a bit and/or bitmap for a (e.g., one or more, or each) control beam in cell PCFICH.

Beam specific control region configuration may have contents. WTRUs may determine beam specific search space from the beam specific control region configuration. Beam specific control region configuration may include one or more of the following: a (e.g., single) beam specific control region size common for certain (e.g. one or more, or all) beams, a beam specific control region size for a (e.g., one or more, or each) beam separately, and/or a beam specific control region size as a group of beams with similar control region size, and/or the like. The configuration may include and/or identify the length of the beam specific control region size/duration/period. The size may be expressed in one or more of the following: a number of subframes, timeslots, and/or OFDM symbols, and/or the like. One or more WTRUs may receive explicit indication of the first and/or last symbol of the beam specific control region. The value transmitted in the beam specific control region configuration may be a logical value. The value transmitted in the beam specific control region configuration may have a pre-defined mapping to the actual duration/length/period of the beam specific control region. A WTRU may use the indications of a beam specific control region configuration, e.g., to calculate and/or determine the end of the beam specific control region. A WTRU may use the indications of a beam specific control region configuration, e.g., to calculate and/or determine start of the data region.

The configuration may include/identify the number of control symbols carrying the corresponding control channel beam in a subframe (e.g., in the current subframe and/or in n subsequent subframes and/or in certain (e.g., one or more, or all subframes)). The configuration may include/identify the type of mapping applied for a control channel beam (for example fixed and/or flexible). The configuration may also include beam identification (e.g., RS sequence ID and/or antenna port number and/or control channel number) of the corresponding control channel beam transmitted in a subframe (for example in the current subframe and/or in n subsequent subframes and/or in all subframes).

WTRU monitoring may be performed in idle mode. The monitoring may select a common control channel beam. WTRUs may or might not be involved in active data transfer (e.g. in idle mode). WTRUs may be in idle mode, e.g. when selecting one or more common control channel beam(s) to perform monitoring. WTRUs may monitor one or more common control channel beams. WTRUs may monitor one or more common control channel beams to receive system information. WTRUs may monitor one or more common control channel beams to page messages. WTRUs may monitor one or more common control channel beams to perform coarse beam tracking/beam forming. WTRUs may monitor one or more common control channel beams to receive beam training. WTRUs may select one or more common control channel beam(s) for monitoring. WTRUs may perform measurements on beamformed RS. The RS may or might not be multiplexed with common control channel beams for beam evaluation purposes. Common control channel beams may be detected/measured/identified by reference signals that are different from WTRU specific beams. Certain (e.g., one or more, or all) common control channel beams may be associated with the same reference signal that may be cell specific.

A (e.g., one more, or each) common control channel beam may be associated with a different reference signal sequence. WTRU may select certain (e.g., one or more, or all) common control channel beams. WTRU may select certain common control channel beams whose measured signal quality (e.g. RSRP, SNR, SINR, RSRQ, etc.) may be above a threshold. WTRUs may select a beam (e.g. the best) based on measured signal quality for monitoring purposes. WTRUs may perform signal quality measurements on a restricted set of subframes, e.g., subframes where PBCH and/or Sync channels may be transmitted. WTRUs may perform signal quality measurements on the subframes, e.g., where there is fixed and/or pre-defined mapping between control channel beams and/or control symbols.

WTRUs may receive an explicit and/or implicit linkage between Sync beams and/or control channel beams, using heterogeneous control channel beams. One or more WTRUS may receive an explicit and/or implicit linkage between PBCH beams and/or control channel beams, using heterogeneous control channel beams. WTRU's cell selection and/or reselection may be based on the PBCH beams. One or more WTRUs' cell selection and/or reselection may be based on the sync beams. WTRUs may select control channel beams of certain type based on the linked serving PBCH to perform monitoring herein. WTRUs may select control channel beams of certain type based on the linked serving Sync beam type to perform monitoring herein. For example, a pre-configured offset may be defined between the PBCH/Sync beams and/or the corresponding control channel on the same beam. The offset may be in terms of time (e.g., subframe, symbols) and/or frequency.

One or more WTRUs may determine the presence of control channel beam by searching for PBCH on the same beam, e.g., at preconfigured locations in the frame structure. WTRUs may detect the presence of a beam type using the beam specific reference signals. Beam specific reference signals may be defined as a function of cell ID. One or more WTRUs may determine the cell ID from the discovery signal and/or the number of beams in the cell via PBCH. WTRUs may determine the cell ID from the set of beam reference signals associated to the cell. The beam reference signals may be associated to the cell by a predefined function of cell ID and/or number of beams. Beam specific reference signals may identify beam types and/or beams. WTRUs may monitor the control channel beams associated with (e.g., belonging to) beams narrower than the current serving and/or detected PBCH beam type.

Common control channel beam may have a search space. Control region in a (e.g., one or more, or each) serving cell and/or mB may comprise one or more control symbols carrying one or more control channel beams. Control region of a (e.g., one or more, or each) control channel beam may comprise one or more symbols, where the number of symbols may be either fixed and/or variable. Control region of a (e.g., one or more, or each) control channel beam may comprise one or more symbols, where the symbols and/or symbol group (e.g., exact symbols and/or symbol group) may depend on the mapping function. Common search space may be a function of one or more of the following: number of common control channel beams transmitted by the mB, number of common control channels selected by the WTRU, beam specific control region size/duration, overall control region duration, bandwidth of the cell, and/or aggregation level, and/or the like. Within the symbols used for common control channel beam, frequency domain mapping may be explicitly provided for control channel, e.g., PDCCH candidates mapped to n number of carriers around the center frequency, even/odd RBs, hashing function, and/or any other pattern. The common search space with beamformed control channels may be defined as a set of PDCCH candidates on one or more common control channel beams, e.g., determined by control channel beam selection function. On a control channel beam, one or more WTRUs may monitor the corresponding beam specific control region for a set of PDCCH candidates defined by one or more aggregation levels.

FIG. 21 is an example of common control channel beam and/or associated search space. WTRUs may perform monitoring. WTRUs may monitor their common search space in idle mode. WTRUs may perform the monitoring on a set of pre-defined subframes, e.g., where the mapping between the common control channel beams may be known and/or configured in terms of control channel beam IDs and/or symbol mapping. WTRUs may search certain subframes (e.g., all subframes and/or preconfigured subframe(s)) for presence of common control channel beams at symbol locations within the control region. WTRUs may search the subframes by correlating a known reference signal sequence (e.g., signal sequences which may be cell specific and/or beam specific). Different reference signal sequences may be defined for common control channel beams and/or WTRU specific control channel beams. A (e.g., one or more, or each) beam may have its own reference signal sequence, perhaps within the common control channel beams. Within the common control channel beams, one or more beams (e.g., all beams) may use the cell specific sequence. The WTRU may monitor the common search space within the beam specific control region, e.g., when the received reference signal power may be above a threshold. The reference signal sequence may be cell specific. Some or all of the common control channel beams in the cell may carry the same information. A WTRU may accumulate the energy received from some or all the common control channels to increase the SNR.

WTRUs may perform monitoring in connected mode. WTRU may perform monitoring in connected mode by assigning control channel beams. WTRUS may monitor one or more control channel beams to receive control information in connected mode. The control channel beams may be WTRU specific control channel beams and/or cell specific common control channel beams. The set of control channel beams that the WTRU may monitor may be referred to as serving control channel beams. One or more WTRUs may be assigned one or more serving control channel beam(s). WTRUs may consider some or all the control channel beams from the mB as serving control channels. WTRUs may consider the control channel beams selected during idle mode operation, e.g., as WTRU specific control channel beams for connected mode operation. WTRUs may receive the serving control channel beam(s) configuration using dedicated signaling (e.g. L1 and/or MAC and/or RRC message). One or more WTRUs may monitor one or more serving control channels in the connected mode for one or more of the following: UL and/or DL grants, Beam switch commands, handover commands, higher layer messages, and/or small payloads, and/or any other control information. One or more WTRUs may distinguish common control channel beams from the WTRU specific control channel beams by the presence of pre-defined beam reference signals.

WTRUs may monitor cell specific common control channel beams to receive common channels (e.g., Paging and/or SIB) while in connected mode. WTRUs may select common control channel beams autonomously. WTRUs may select common control channel beams based on dedicated signaling (e.g. L1 and/or MAC and/or RRC message) received in the serving control channel. WTRUs may monitor serving control channel beam for common channels (e.g. Paging and/or SIB). One or more WTRUs may select common control channel beam(s) that are implicitly and/or explicitly linked to current serving control channel beam(s).

WTRUs may have beam specific search space. Control region in a serving cell and/or mB may comprise one or more control symbols. Control symbols may carry one or more control channel beams. Control region of a (e.g., one or more, or each) control channel beam may comprise one or more symbols. For example, the number of symbols may be either fixed and/or variable. The exact symbols and/or symbol group may depend on the mapping function.

WTRU specific search space may be a function of one or more of the following: the number of control channel beams transmitted by the mB, number of control channels selected by and/or assigned to the WTRUs, beam specific control region size/duration, overall control region duration, bandwidth of the cell, aggregation levels, WTRU ID, subframe number, and/or subframe, and/or the like. WTRU specific search space may be defined as the union of beam specific search space of certain serving control channel beams selected by/assigned to the WTRU. Beam specific search space may be defined as a set of PDCCH candidates in beam specific control region. Beam specific control region may be defined as one or more control symbols and/or symbol groups used to transmit and/or mapped to the corresponding beam. Number of symbols per control channel beam may be static, semi-static and/or dynamic. On a (e.g., one or more, or each) serving control channel beam, a WTRU may monitor the corresponding beam specific control region for set of PDCCH candidates defined by one or more aggregation levels. Within the symbols used for control channel beam, frequency domain mapping and/or restriction may be explicitly and/or implicitly defined for PDCCH candidates (e.g. mapped to n number of carriers around the center frequency and/or even/odd RBs and/or a hashing function and/or any other pattern). WTRUs may be configured with different set of aggregation levels for different control channel beams. WTRU specific search space within a beam may be a function of beam ID, WTRU ID, symbol number, subframe number etc.

Figure 22:
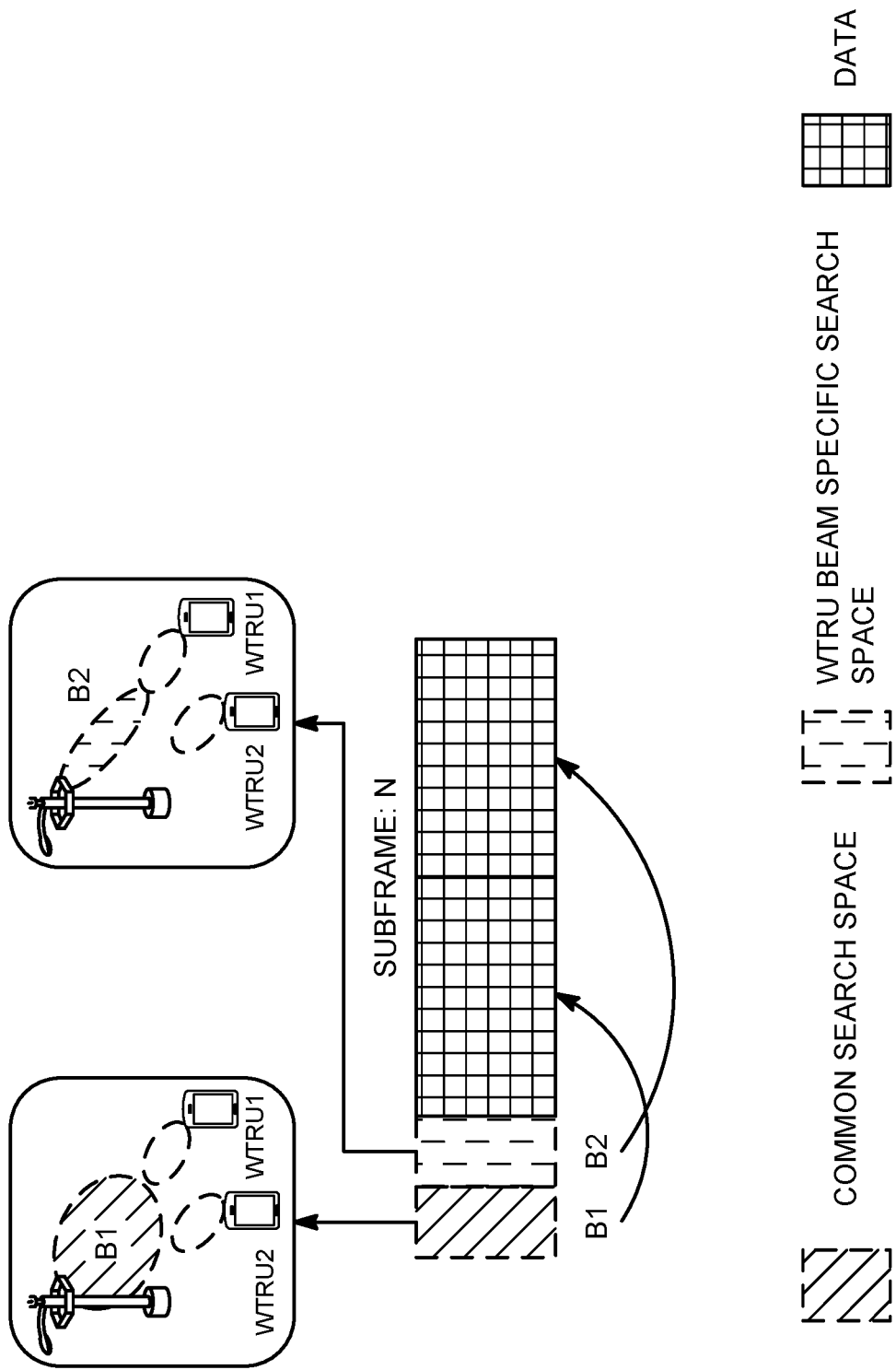
FIG. 22 is an example of Common Control Channel Beam and Search Space.
Figure 23:
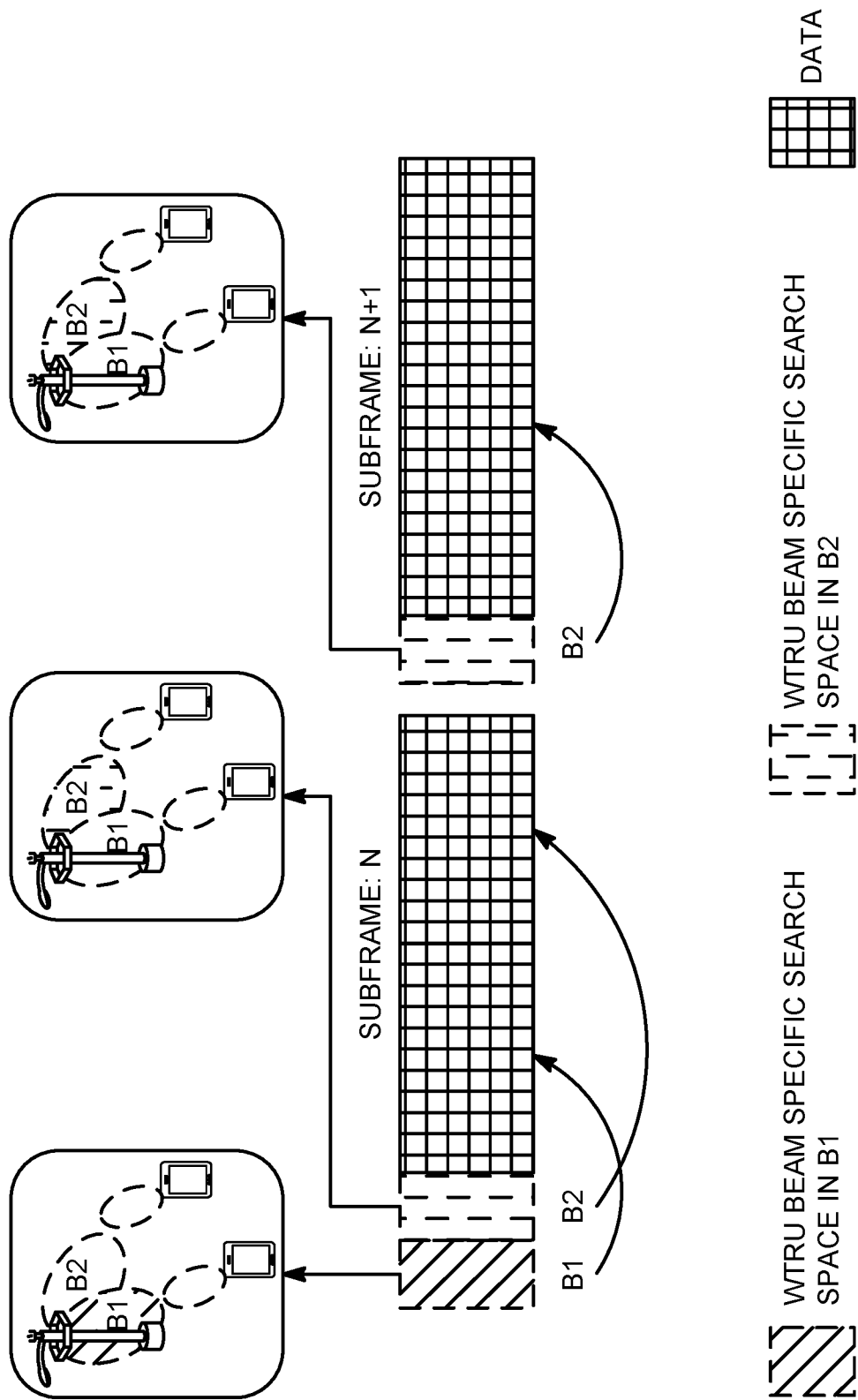
FIG. 23 is an example of WTRU Beam Specific Search Space.

FIG. 22 is an example for WTRU beam specific search space. WTRUs may perform monitoring. WTRUs may monitor their WTRU specific search space in connected mode. WTRUs may monitor common search space in connected mode. WTRUs may perform conditional monitoring, e.g., based on the presence of one or more serving control channel beams. One or more WTRUs may search certain subframes and/or one or more preconfigured subframes for the presence of WTRU specific control channel beam, by correlating one or more of the following: pre-configured beam specific reference signal sequence, cell specific reference signal sequence, and/or beam type specific reference signal sequence in the control region, and/or the like. One or more WTRUs may be configured with mapping between control channel beam and control symbol location. WTRUs may search for (e.g., only for) the configured control channel beams in a (e.g., one or more, or each) symbol location. The WTRUs may monitor PDCCH candidates within the detected beam specific search space, e.g., when the received reference signal power is above a threshold.

WTRUs may monitor beam specific search space in some or all the subframes and/or in the configured subframes where one or more serving control channel beams may be transmitted. WTRUS may monitor common search space in all or some of the subframes or in the configured subframes where one or more common control channel beams may be transmitted. For example, the control region in pre-configured subframes may comprise one more (e.g. two) parts, one for common control channel beams and/or the other for WTRU specific control channel beams, for example. One or more WTRUs may monitor common search space in the common control region and/or WTRU specific and/or beam specific search space in the dedicated control region.

WTRUs may perform monitoring using one or more techniques as described herein. WTRUs may determine WTRU specific control channel beam and/or common control channel beam by doing one or more of the following. WTRU specific control channel beam may be configured by the mB. WTRU specific control channel beam may be selected during the cell selection. WTRU specific control channel beam may be selected autonomously by the WTRU and/or indicated to the mB during the random access procedure. Common control channel beam may be selected by the WTRUs autonomously (e.g. linkage to PBCH/Sync beams). Common control channel beam may be selected by the WTRUs implicitly linked to current serving control channel beams (e.g., many to one mapping between WTRU specific beams and common control channel beams). An mB may override the common control channel beam for a WTRU in connected mode.

WTRUs may determine subframes to monitor, based on beam mapping function through one or more of the following. WTRUs may be preconfigured (in MIB/SIB-x and/or dedicated signaling) with the beam to subframe mapping. WTRUS may monitor those (e.g., only those) subframes, e.g, where one or more serving control channel beam and/or common control channel beams may be transmitted. WTRUs upon wake up from DRX mode may monitor those (e.g., only those) subframes, e.g., where the fixed mapping to the serving control beams may be pre-configured. WTRUs may assume and/or be configured a flexible mapping, e.g., any to any mapping between beams and subframes, with a (e.g., one or more, or each) subframe containing multiple control channel beams. One or more WTRUs may monitor certain (e.g. one or more, or all) the DL subframes for the serving control channel beams and/or common control channel beams. Upon wake up from DRX mode and/or receiving a valid allocation, WTRUs may continue monitoring certain (e.g., one or more, or all) subframes for the serving control channel beams. WTRUs may monitor specific subframes for common control channel beam and/or certain (e.g., one or more, or all) subframes for WTRU specific control channel beams.

WTRUs may determine overall control region in a subframe. WTRUs may determine the overall control region size/duration in a subframe from MIB/SIB-x. WTRUs may determine the overall control region size/duration in a subframe from a fixed parameter. WTRUs may determine the overall control region size/duration in a subframe dynamically signaled via a cell PCFICH.

WTRUs may determine beam specific search space by one or more of the following. Within the overall control region, WTRUs may assume one or more beam specific control region. For a (e.g., one or more, or each) monitored control channel beam, WTRUs may determine (e.g., first determine) the presence of those control beams and/or starting symbol for the control channel beams by explicit signaling in cell PCIFCH. For monitored control channel beams, WTRUs may determine the presence of those control beams and/or starting symbol for the control channel beams by detecting beam specific BRS above a threshold. For monitored control channel beams, WTRUs may perform blind decoding, e.g., when a cell specific BRS is used. WTRUs may assume no DCI received in that subframe, e.g, when BRS for certain (e.g., one or more, or all) serving control channel beams are below the threshold. WTRUs may identify the beams based on beam specific preambles added to a (e.g., one or more, or each) control symbol carrying the beam. The preambles may be a function of one or more of the following: beam ID, cell ID, and/or WTRU ID, and/or the like.

One or more WTRUs may utilize the measurements based on BRS to determine the characteristics/property of the control channel beam, e.g., the presence of a specific control channel type and/or beam, length of the control channel beam etc. For certain (e.g., one or more, or all) detected control channel beams, WTRUs may determine the beam specific control region size/duration and/or last symbol in the beam specific control region from MIB/SIB-x. For certain (e.g., one or more, or all) detected control channel beams, WTRUs may determine the beam specific control region size/duration and/or last symbol in the beam specific control region from a fixed parameter. For certain (e.g., one or more, or all) detected control channel beams, WTRUs may determine the beam specific control region size/duration and/or last symbol in the beam specific control region may be dynamically signaled via beam PCFICH. One or more WTRUs may be (e.g., explicitly) provided with a fixed mapping between the control channel beam and the symbol location of the beam specific control region. One or more WTRUs may be (e.g., explicitly) provided with a fixed mapping between the control channel beam and the size/duration of the beam specific control region. An overall control region may be split into common control region and/or a dedicated control region.

Within a (e.g., one or more, or each) detected beam specific control region, one or more WTRUs may do one or more of the following. A WTRU may apply the frequency and/or time domain restriction (e.g. central n carriers and/or specific RBs and/or any other pattern and/or remove non-PDCCH channels (e.g. PHICH, beam PCIFICH, sync/PBCH if present). Within the beam specific search space, some (e.g., additional), WTRU specific search space may be configured. For example, starting CCEs may be different for different WTRUs (e.g. based on WTRU ID, beam type, beam ID, subframe number, symbol number etc.). WTRUs may group the REGs within a (e.g., one or more, or each) beam specific control region into one set of CCEs. Within a (e.g., one or more, or each) set of CCEs, WTRUs may monitor one or more PDCCH candidates based on aggregation levels configured for a (e.g., one or more, or each) beam type and/or beam. DCI CRC may be scrambled with beam ID in addition to the WTRU ID (e.g. CRNTI) and/or common ID (e.g. SI_RNTI and/or Paging RNTI). When WTRU specific control channel beams, WTRU specific search space may be simplified (e.g., further simplified) by pre-configuring fixed starting CCEs, explicit indication of aggregation level used etc.

DL data may perform scheduling. WTRUs may, upon detection of PDCCH in some (e.g., at least one) of the serving control channel beams, indicate DL grant for data and/or some (e.g., any) other higher layer information intended for the WTRUs. WTRUs may attempt to decode the corresponding data channel beam in the resources indicated by the DCI. WTRUs may assume that the serving control channel beam may be used for data transmission, e.g., when no data beam specific identity is included in the DCI message. WTRUs may assume the last indicated data channel beam, e.g, if no data beam specific identity is included in the DCI message. WTRUs may assume the data channel indicated by the higher layer configuration, e.g., if no data beam specific identity is included in the DCI message. The scrambling initialization of the PDSCH may be a function of one or more of the following: control channel beam ID that carries the allocation, beam ID of the DL data channel beam, WTRU specific RNTI (e.g. C-RNTI and/or SPS-RNTI), a fixed RNTI (e.g. SI-RNTI and/or Paging RNTI), and/or beam type, and/or the like.

Sub-subframe scheduling may perform resource allocation by allowing multiple allocation in a subframe. Beamforming may be used (e.g., required) to compensate additional path loss at higher frequencies. Given the large bandwidths at higher frequencies and/or analog beamforming, one or more WTRUs may be multiplexed with different beams within a subframe and/or scheduling interval. One or more control channels may be transmitted with wide beams. A (e.g., one or more, or each) control channel beam may schedule one or more narrow data beams for one or more WTRUs within the same subframe.

Minimum schedulable time resource within a subframe may be symbol and/or group of symbols. Scheduling granularity may be less than a subframe and/or a scheduling interval. For example, a new (e.g., fresh and/or heretofore unused) DCI format may be defined to carry allocation information at symbol level/symbol group, to indicate a start offset (e.g., a symbol offset), repetition information (e.g. more than one data channel per WTRU per subframe), and/or spatial information (e.g. transmit beam ID), and/or the like.

Within a subframe, the data region may comprise multiple data channel beams multiplexed in time. For example, a data channel may occupy several symbols and/or the remaining symbols within the same subframe may be used by other data channel beams addressed to the same and/or different WTRUs. WTRUs may be allocated multiple data channel resources within the same subframe. A (e.g., one or more, or each) set of data channel resources may be associated with a different data beam.

Downlink data beam that an mB may use for the WTRU may be identified. WTRUs may use a receive beam pattern for downlink data channel reception. WTRUs may use different receive beam pattern for downlink control channel beam reception compared to the receiving beam pattern used for downlink data channel beam reception. An mB may comprise the transmit beam ID corresponding to the data channel beam to enable WTRU to switch receive beam accordingly. One or more WTRUs may use (e.g., require) gap and/or decoding period between the PDCCH carrying the grant and/or the actual data channel resource. Transmit beam ID may be implicitly determined by the WTRU, e.g., when WTRU specific control channel beam is used, as the data beam may be same as the WTRU specific control channel beam.

The data channel beam information may be coupled with resource allocation information. For example the DCI may include transmit beam identification in PDCCH that carries resource allocation in terms of time (e.g. symbol, symbol group) and/or frequency (e.g. RBs). An mB may explicitly provide a gap and/or guard period between the last symbol of PDCCH and the first symbol of PDSCH within the same subframe. The guard period may be defined from WTRU point of view. mB may use the symbols in the guard period to schedule other WTRUs. WTRUs may assume (e.g., always assume) an offset between PDCCH and PDSCH. For example PDCCH in subframe n may allocate PDSCH in subframe n+k. The value of k may be dynamic and/or may be configured by higher layer signaling (MAC and/or RRC) and/or may be included in DCI message and/or may be a pre-defined constant. WTRUs may assume k=0 for buffering the data in the current subframe. Depending on the value of k in the DCI, WTRUs may determine the PDSCH location in the current subframe (if k=0 and/or not included in DCI) and/or in subframe n+k (if k is included in the DCI).

At least one search space may include downlink control information (DCI). At least one data channel may be monitored, perhaps for example based at least in part on the DCI. At least one beam for receipt of the at least one data channel may be identified, perhaps for example based at least in part on the DCI.

The data channel beam information and/or spatial information may be separate from resource allocation (e.g. time, frequency, code) information. The spatial information (e.g., data channel transmit beam identification) may be derived from beam specific reference signal for the corresponding DL beam. The spatial information may be derived from beam specific reference signal for the corresponding antenna port. The spatial information may be derived from beam specific reference signal for the corresponding steering vector and/or codebook index. The spatial information may be signaled using RRC configuration/MAC CE/DCI, decoupled from the time and/or frequency resource allocation information. The spatial information may be acknowledged by the WRTU to prevent mismatch between an mB and the WRTU, before actual data transmission on the indicated data channel beam. The spatial information and/or resource allocation information (e.g. time and/or frequency) may have a pre-defined and/or configured offset to the allocated resources. The spatial information may be associated with a validity period and/or upon expiry of the validity period. WRTUs may perform (e.g., be required to perform) one or more of beam measurement and/or beam tracking and/or beam reporting (e.g. CSI).

The common channels may be scheduled using separate spatial information. The WTRU specific channels may be scheduled using the coupled spatial information. The common channels may be scheduled using coupled spatial information. The WTRU specific channels may be scheduled using the separate spatial information. Different WTRUs in the same cell may receive the scheduling information using different configuration (e.g. coupled and/or separate).

DCI may have format and/or contents. Downlink control information for a DL data channel grant may be include one or more of the following: spatial information, time, and/or frequency resource information, and/or the like. Spatial information may comprise one or more of the following: implicit data channel beam identity (e.g. associated Data channel RS sequence number, associated control channel RS sequence number and/or an index in the WTRU measurement report) and/or an explicit data channel ID which may map to a specific data channel beam, UL control channel beam configuration associated with a DL transmission, and/or set of control symbols to monitor for serving control channel beam(s), and/or the like. Time and/or frequency resource information may comprise one or more of the following: the resource allocation information corresponding to downlink data channel beam indicated in the spatial information, Starting symbol location for PDSCH within the subframe, Duration (in terms of number of symbols), Frequency/Resource Block information, an index to a pre-configured symbol groups/resource groups in time and/or frequency, and/or the like.

Spatial information may be signaled using L23 signaling (e.g. RRC and/or MAC CE) and/or L1 signaling (e.g. in a DCI). WTRUs may consider the spatial information to be valid after transmitting an ACK corresponding to the DL PDSCH carrying the spatial information. WTRUs may assume that the spatial information valid until they receive RRC/MAC CE/DCI with a different spatial information. Time and/or frequency resource information may be signaled using L1 signaling (e.g. in a DCI). The scheduling information in the time and/or frequency resource information may be valid for (e.g., only for) the subframe where the resource information is received. Different DCI formats may be defined. For example, two different DCI formats may be defined, one with the time and/or frequency resource information and/or the other with time and/or frequency resource information and/or spatial information. A DCI format may contain the time and/or frequency resource information and/or the other(s) DCI format may contain the spatial information.

Beams may be combined for DL. Plurality of spatial information may be signaled to the WTRU using L23 signaling (e.g. RRC and/or MAC CE) and/or L1 signaling (e.g. in a DCI) for the downlink data transmission. The DCI and/or the L23 message may carry per spatial information, one or more of the following: symbol location, duration, resource block configuration, WTRU specific reference signal ID and/or beam ID, antenna port number, and/or HARQ information (e.g. redundancy version), and/or the like. Spatial information (e.g., one or more, or each spatial information) may identify the transmission direction and/or data channel beam to the WTRUs. WTRUs may receive a single transport block within a subframe and/or sequence of subframes multiplexed in time domain, using plurality of spatial configuration (e.g. multiple data channel beams). WTRUs may soft-combine the spatial repetitions of the transport block to improve the effective SNR. WTRUs may use same and/or different receive antenna configuration and/or receive beam pattern corresponding to the downlink spatial information signaled for beam combining.

UL data may be scheduled. WTRU upon detection of PDCCH in some (e.g., at least one) of the serving control channel beams in subframe/subframe n, indicating UL grant intended for the WTRU, may transmit PUSCH in subframe/subframe n+k, using the UL data channel beam indicated in the PDCCH, WTRUs may assume that the current UL control channel beam may be used for UL data transmission, e.g., when no data channel beam identity is included in the DCI message. One or more WTRUs may assume the last indicated UL data channel beam and/or the data channel indicated by higher layer configuration for UL data transmission, e.g. when no data channel beam identity is included in the DCI message. The scrambling initialization of the PUSCH may be a function of control channel beam ID that carries the allocation and/or beam ID of the UL data channel beam and/or WTRU specific RNTI (e.g. C-RNTI and/or SPS-RNTI) and/or beam type.

Within a UL subframe, the data region may comprise multiple UL data channel beams from one or more WTRUs multiplexed in time. For example, a data channel may occupy one or more symbols and/or the remaining symbols within the same subframe may be used by other UL data channel beams addressed to the same and/or different WTRUs. WTRUs may be allocated multiple UL data channel resources within the same subframe. A (e.g., one or more, or each) set of UL data channel resources may be associated with a different UL data beam.

Uplink transmissions from multiple WTRUs within the same subframe and/or scheduling interval, may be multiplexed in time domain and/or frequency domain. Scheduling granularity may be less than subframe and/or scheduling interval. A new DCI format may carry UL allocation information at symbol level/symbol group, start offset, repetition information (e.g. more than one UL data channel per WTRU per subframe), spatial information (e.g. UL transmit beam ID).

One or more WTRUs may identify and/or signal the uplink data beam. One or more WTRUs may use a specific beam pattern for UL data channel transmission. One or more WTRUs may use different transmit beam pattern for uplink control channel compared to the transmit beam pattern used for uplink data channel beam. An mB may include the transmit beam ID corresponding to the UL data channel beam to enable WTRUs to switch transmit beam accordingly. One or more WTRUs may use (e.g., require) gap and/or decoding period between the PDCCH carrying the UL grant and/or the actual UL data channel resource.

The UL data channel beam information may be coupled with resource allocation information. For example the DCI may include transmit beam identification in PDCCH that carries resource allocation in terms of time (e.g. symbol and/or symbol group) and/or frequency (e.g. RBs). An mB may (e.g., explicitly) provide a gap and/or guard period between the last symbol of PDCCH and the first symbol of PUSCH. The guard period may be defined from WTRU point of view. An mB may use the symbols in the guard period to schedule other WTRUs. WTRUs may assume (e.g. always assume) an offset between PDCCH and PUSCH. For example PDCCH in subframe n may allocates PUSCH in subframe n+k. The value of k may be dynamic and/or may either be configured by higher layer signaling (MAC and/or RRC) and/or may be included in DCI message.

The UL data channel beam information and/or spatial information may be separate from resource allocation (e.g., time, frequency, code) information. The spatial information, e.g. UL data channel transmit beam identification, may be derived from SRS (e.g. SRS sequence ID and/or SRS configuration ID etc.), decoupled from the time and/or frequency resource allocation information. The spatial information may be derived random access procedure (preamble ID and/or subframe), decoupled from the time and/or frequency resource allocation information. The spatial information may be signaled using RRC configuration/MAC CE/DCI, decoupled from the time and/or frequency resource allocation information. The spatial information may be acknowledged by the WTRU to prevent mismatch between mB and the WTRU, e.g., before actual data transmission on the indicated data channel beam. The spatial information and resource allocation information (e.g. time and/or frequency) may have a pre-defined and/or configured offset to the allocated resources. The spatial information may be associated with a validity period. For example, upon expiry of the validity period, a WTRU may (e.g., be required to) perform one or more of sounding procedure and/or RACH etc.

The UL control channel beam may be scheduled using separate spatial information. The UL data channel beam may be scheduled using the coupled spatial information. One or more WTRUs in the same cell may receive the scheduling information using different configuration (e.g., coupled and/or or separate).

DCI may have formats and/or contents. Downlink control information for a UL data channel grant may include one or more of the following: spatial information, time resource information, and/or frequency resource information, and/or the like. Spatial information may comprise one or more of the following: implicit data channel beam identity, and/or DL PHICH beam configuration, and/or the like. Implicit data channel beam identity may comprise one or more of the following: SRS sequence ID and/or SRS configuration ID etc., preamble ID, subframe and/or an explicit data channel ID which may map to a specific data channel beam, and/or explicit ID negotiated with the WTRU, and/or the like. Time and/or frequency resource information may comprise one or more of the following: information that may indicate the resource allocation information corresponding to downlink data channel beam indicated in the most recent spatial information, starting symbol location for PUSCH within the subframe, duration (e.g., in terms of number of symbols), frequency/resource block information, and/or an index to a pre-configured symbol groups/resource groups in time and/or frequency, and/or the like.

Spatial information may be signaled using Layer 2 and/or 3 (L23) signaling (e.g. RRC and/or MAC CE) and/or L1 signaling (e.g. in a DCI). A WTRU may consider the scheduling information received in the spatial information to be valid after transmitting an ACK corresponding to the DL PDSCH carrying the spatial information. The WTRU may assume that the spatial information valid perhaps until it receives RRC/MAC CE/DCI with a different spatial information, for example. Time and/or frequency resource information may be signaled using L1 signaling (e.g. in a DCI). The scheduling information in the time and/or frequency resource information may be valid for the subframe (e.g., only for the subframe) where the resource information is received.

Different DCI formats may be defined. One or more (e.g. two) different DCI formats may be defined, perhaps one with the time and/or frequency resource information and/or another other with time and/or frequency resource information and/or spatial information. A DCI format may contain the time and/or frequency resource information and/or the other DCI format may contain the spatial information.

One or more beams may be combined for UL. A plurality of spatial information may be signaled to the WTRU using L23 signaling (e.g. RRC and/or MAC CE) and/or L1 signaling (e.g. in a DCI) for the uplink data transmission. The DCI and/or the L23 message may carry per spatial information, one or more of the following: symbol location, duration, resource block configuration, WTRU specific reference signal ID and/or beam ID and/or SRS configuration ID, antenna port number, and/or HARQ information (e.g. redundancy version) and/or the like.

A (e.g., one or more, or each) spatial information may identify (e.g., uniquely identify) the transmission direction and/or data channel beam from the WTRU. A WTRU may transmit a single transport block within a subframe and/or sequence of subframes multiplexed in time domain, perhaps for example using a plurality of spatial configuration (e.g. multiple data channel beams). An mB may soft-combine the spatial repetitions of the transport block, e.g., to improve the effective SNR. An mB may use a same receiving antenna configuration and/or receiving beam pattern corresponding to the uplink spatial information signaled for beam combining. An mB may use different receiving antenna configuration and/or receiving beam pattern corresponding to the uplink spatial information signaled for beam combining.

UL control channel information may be part of UL data scheduling. DCI may carry UL control channel information and/or the DL grant for data channels. The UL control channel information may include the resources used for feedback (e.g. ACK/NACK and/or CSI etc.). An mB may dynamically signal the WTRU UL control beam for feedback using the DCI carrying the corresponding DL resource allocation. One or more WTRUs may associate the UL control channel resources allocated in a DCI to the DL data channel allocation present in the same DCI. The UL control channel information may include time (e.g. subframe offset or symbol offset from the current subframe) and/or frequency resources (e.g. Resource blocks). The UL control channel information may include the spatial information for the UL control channel. For example, the UL control beam for the WTRU may be identified by SRS configuration ID and/or SRS sequence and/or RACH identifier (RA-RNTI and/or preamble sequence number) used by the WTRU for the periodic/aperiodic transmission of the corresponding UL control channel beam.

A mB may pre-configure the mapping between DL control beam carrying the DL data allocation and the WTRU UL control beam carrying the feedback. The configuration may be WTRU specific. A mB may pre-configure the mapping between DL transmit control beam carrying the DL data allocation and the mB UL Rx control beam resources to receive the feedback. The configuration may provide WTRU specific resources within the mB UL Rx beam (e.g. frequency/time/code). A mB may schedule the uplink control beam semi-statically using higher layer signaling. A mB may schedule different uplink control beam for different feedback types (e.g. ACK/NACK vs CSI). In some or all the schemes discussed herein, a mB may configure more than one UL WTRU control beam for feedback (e.g. repetition and/or implicit HARQ retransmission).

Figure 24A:
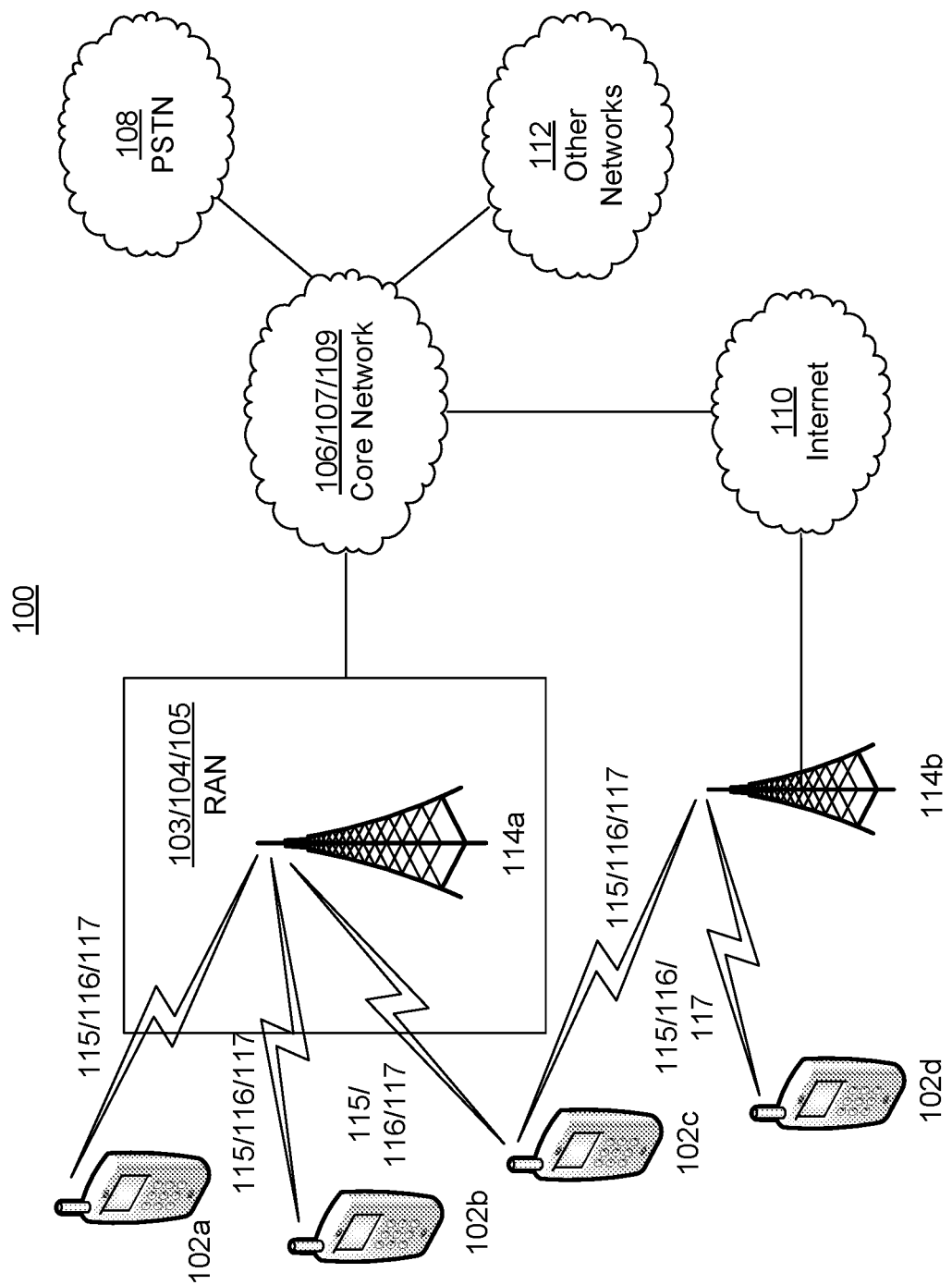
FIG. 24A is a System Diagram of an example Communications System.

FIG. 24A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 24A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 24A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 24A, the base station 114b may have a direct connection to the Internet 110. Thus, the base station 114b may or might not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 24A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 24A may be configured to communicate with the base station 114a, which may employ a cellular-based radio technology, and with the base station 114b, which may employ an IEEE 802 radio technology.

Figure 24B:
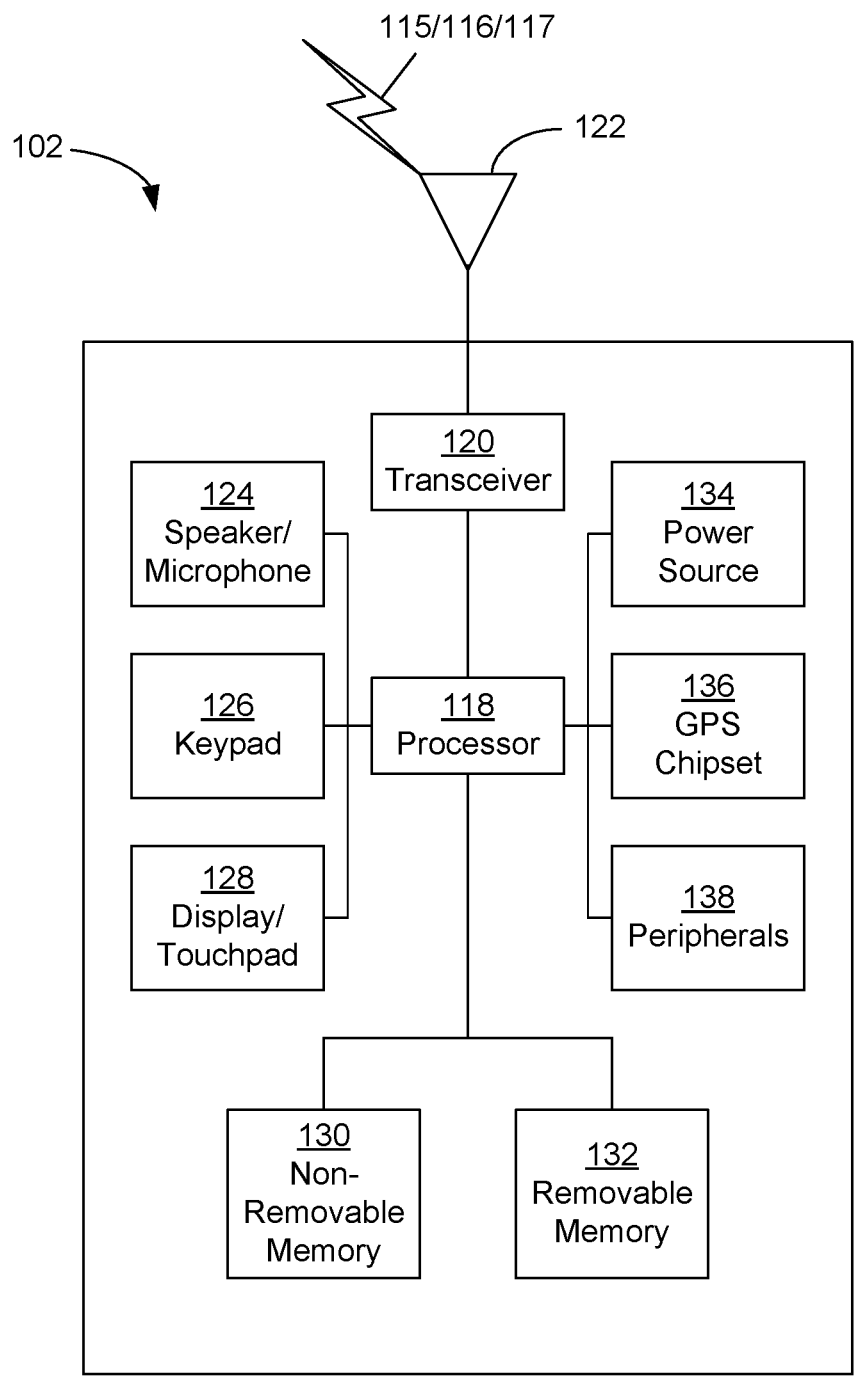
FIG. 24B is a System Diagram of an example Wireless Transmit/Receive Unit (WTRU) that May be Used within the Communications System Illustrated in FIG. 24A.

FIG. 24B is a system diagram of an example WTRU 102. As shown in FIG. 24B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 24B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 24C:
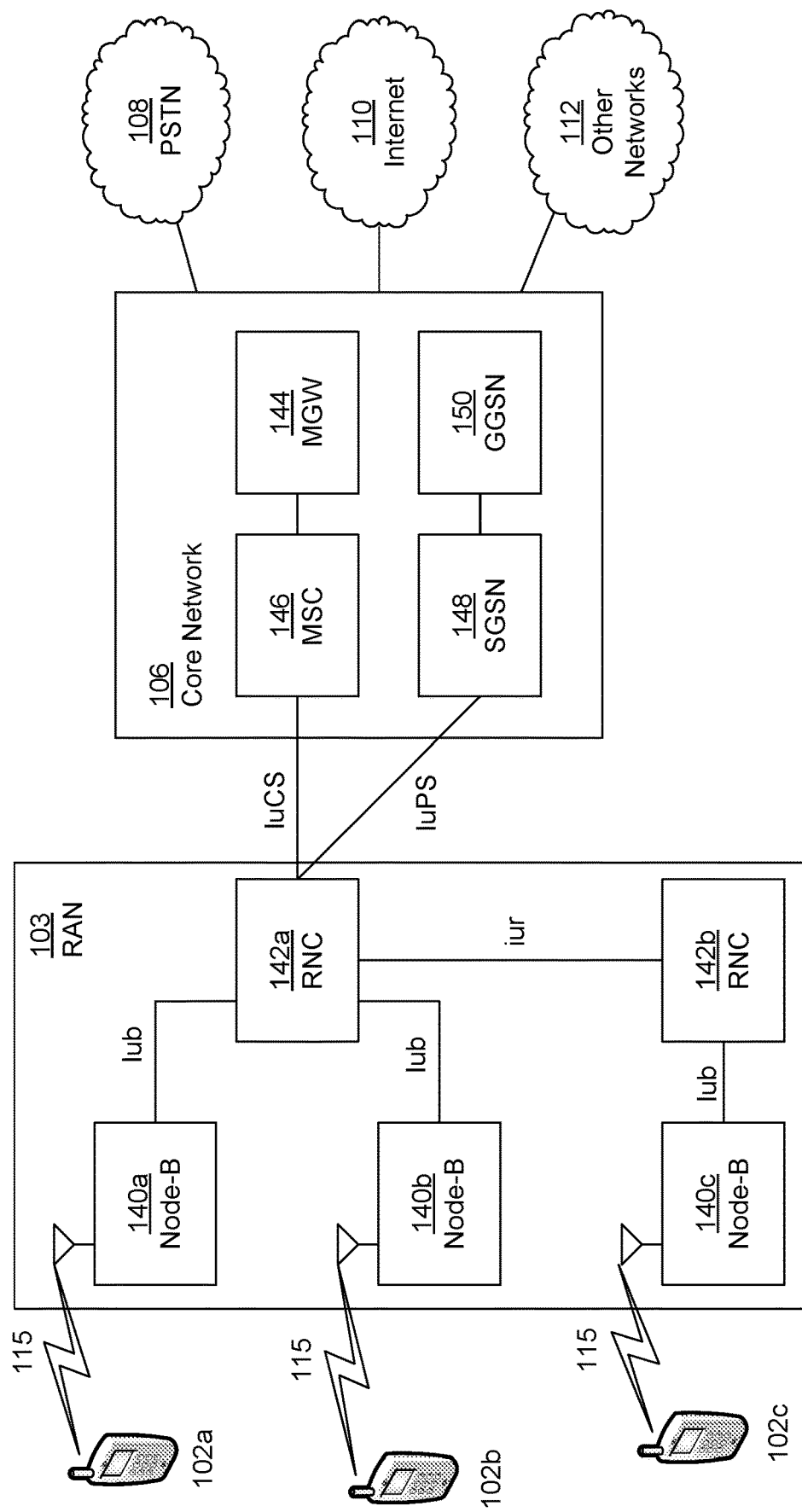
FIG. 24C is a System Diagram of an example Radio Access Network and an Example Core Network that may be Used within the Communications System Illustrated in FIG. 24A.

FIG. 24C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 24C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 24C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 24C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 24D:
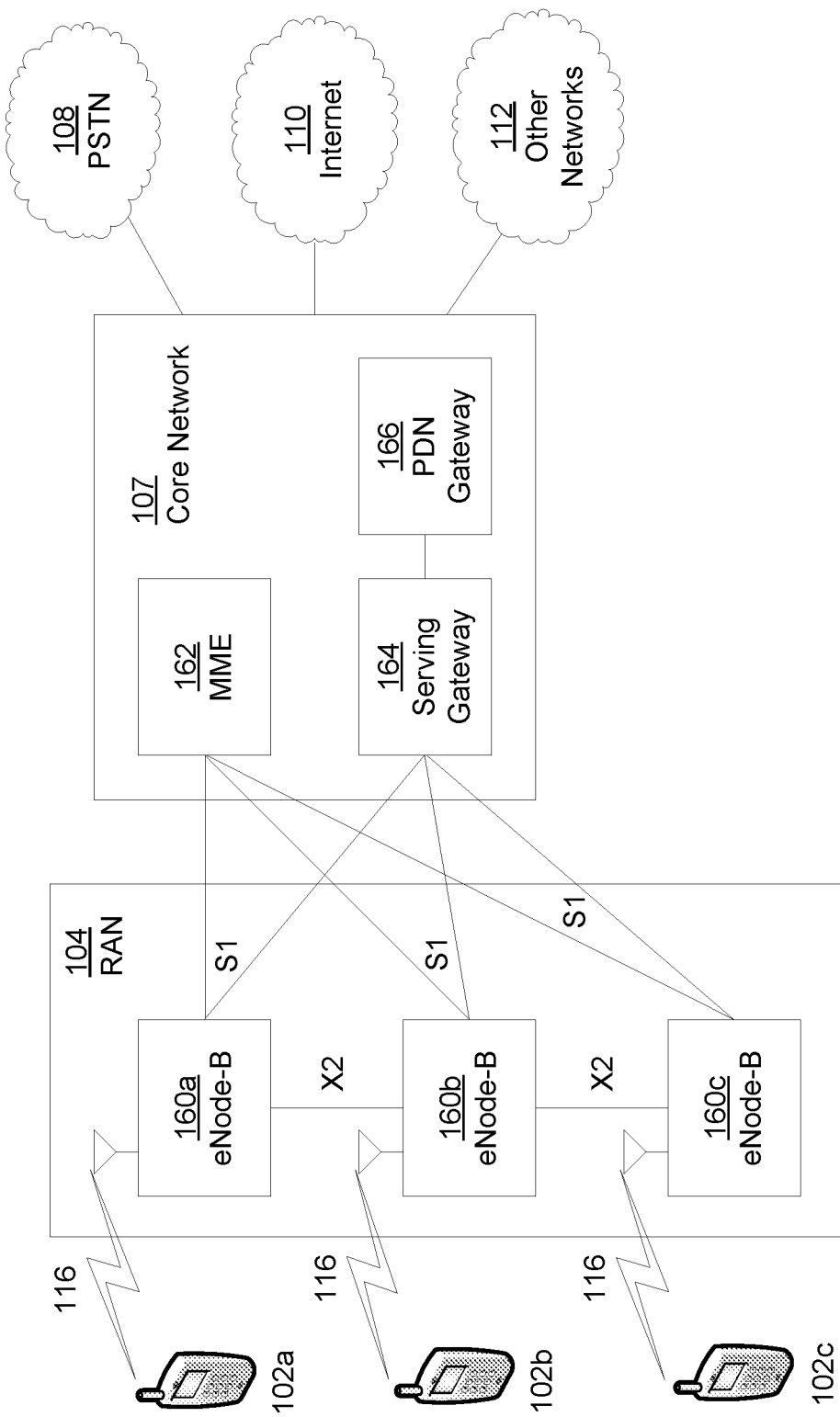
FIG. 24D is a System Diagram of another example Radio Access Network and an Example Core Network that may be Used within the Communications System Illustrated in FIG. 24A.

FIG. 24D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 24D, the eNode-Bs 160a, 160b, 160c may communicate with one another over an X2 interface.

The core network 107 shown in FIG. 24D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 24E:
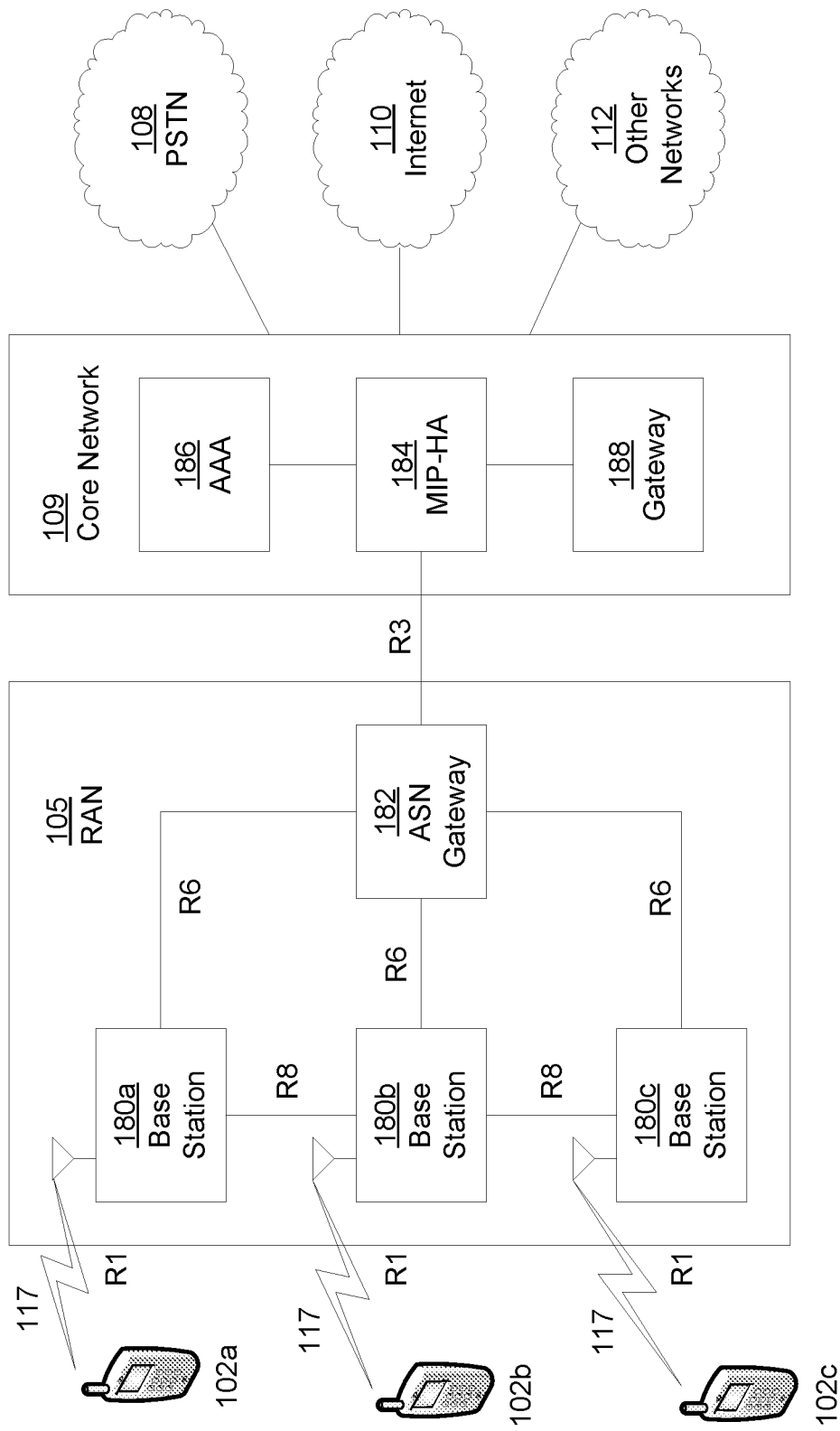
FIG. 24E is a System Diagram of another example Radio Access Network and an Example Core Network that may be Used within the Communications System Illustrated in FIG. 24A.

FIG. 24E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 24E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 24E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 24E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured for wireless communication, the WTRU comprising: a memory; and
a processor, the processor configured at least to:
receive a Physical Downlink Control Channel (PDCCH) in at least a first beam of one or more beams;
interpret downlink control information (DCI) included in the PDCCH;
determine when spatial information for a downlink (DL) data channel is indicated in the DCI;
determine a receive beam from the spatial information for the DL data channel upon condition that the DCI indicates the spatial information for the DL data channel;
determine that the receive beam is the first beam upon condition that the DCI does not indicate the spatial information for the DL data channel; and
monitor for the DL data channel on the determined receive beam.

2. The WTRU of claim 1, wherein the spatial information includes at least one of: a grant for the DL data channel; an implicit DL data channel beam identity; or a DL data channel reference signal (RS) sequence number.

3. The WTRU of claim 1, wherein the indication of the spatial information for the DL data channel is based on a DL reference signal (RS).

4. The WTRU of claim 1, wherein the processor is further configured to: monitor one or more search spaces, the one or more search spaces configured to provide for at least one of: a monitor of one or more Downlink (DL) control channels, or a receipt of the one or more DL control channels, at least one search space of the one or more search spaces corresponding to at least one reference signal (RS) of one or more reference signals; monitor at least a part of a control region for at least one RS of the one or more reference signals; detect the at least one RS in the at least part of the control region; and monitor the at least one search space corresponding to the at least one RS for at least one DL control channel upon the detection of the at least one RS.

5. The WTRU of claim 4, wherein the at least one search space includes the DCI, and the processor is further configured to monitor the at least one DL control channel based at least in part on the DCI.

6. The WTRU of claim 4, wherein the processor is further configured such that the at least part of the control region is one part of a number of parts of the control region.

7. The WTRU of claim 6, wherein the processor is further configured such that the number of parts of the control region is a function of a number of symbols configured for the control region.

8. The WTRU of claim 4, further comprising a transceiver, the transceiver being configured to receive the one or more search spaces from a wireless communication system network.

9. The WTRU of claim 4, wherein the processor is further configured such that the one or more search spaces are predefined.

10. The WTRU of claim 4, wherein the processor is further configured such that the at least one reference signal of the one or more reference signals is at least one of: a beam reference signal, or an antenna port reference signal.

11. The WTRU of claim 4, wherein the processor is further configured such that the at least one search space of the one or more search spaces is at least one of: a beam search space, or an antenna port search space.

12. The WTRU of claim 4, wherein the processor is further configured such that the at least one reference signal in the at least part of the control region is detected upon a strength of the at least one reference signal crossing a predetermined threshold.

13. A method performed by a wireless transmit/receive unit (WTRU) configured for wireless communication, the method comprising:
   receiving a Physical Downlink Control Channel (PDCCH) in at least a first beam of one or more beams;
   interpreting downlink control information (DCI) included in the PDCCH;
   determining when spatial information for a downlink (DL) data channel is indicated in the DCI;
   determining a receive beam from the spatial information for the DL data channel upon condition that the DCI indicates the spatial information for the DL data channel;
   determining that the receive beam is the first beam upon condition that the DCI does not indicate the spatial information for the DL data channel; and
   monitoring for the DL data channel on the determined receive beam.

14. The method of claim 13, wherein the spatial information includes at least one of: a grant for the DL data channel; an implicit DL data channel beam identity; or a DL data channel reference signal (RS) sequence number.

15. The method of claim 13, wherein the indication of the spatial information for the DL data channel is based on a DL reference signal (RS).

16. The method of claim 13, further comprising: monitoring one or more search spaces, the one or more search spaces configured to provide for at least one of: a monitor of one or more Downlink (DL) control channels, or a receipt of the one or more DL control channels, at least one search space of the one or more search spaces corresponding to at least one reference signal (RS) of one or more reference signals; monitoring at least a part of a control region for at least one RS of the one or more reference signals; detecting the at least one RS in the at least part of the control region; and monitoring the at least one search space corresponding to the at least one RS for at least one DL control channel upon the detection of the at least one RS.

17. The method of claim 16, wherein the at least one search space includes the DCI, and the processor is further configured to monitor the at least one DL control channel based at least in part on the DCI.

18. The method of claim 16, wherein the processor is further configured such that the at least part of the control region is one part of a number of parts of the control region.

19. The method of claim 18, wherein the processor is further configured such that the number of parts of the control region is a function of a number of symbols configured for the control region.

20. The method of claim 16, further comprising receiving the one or more search spaces from a wireless communication system network.

* * * * *

UNITED STATES PATENT AND TRADEMARK OFFICE
CERTIFICATE OF CORRECTION

| | |
|---|---|
| PATENT NO. | : 10,813,085 B2 |
| APPLICATION NO. | : 15/775028 |
| DATED | : October 20, 2020 |
| INVENTOR(S) | : Deenoo et al. |

Page 1 of 3

It is certified that error appears in the above-identified patent and that said Letters Patent is hereby corrected as shown below:

In the Specification

In Column 10, Line 46, delete "$N^{TRX}$" and insert --$N_{TRX}$--.

In Column 14, Line 3, delete "FIG." and insert --FIGS.--.

In Column 26, Line 5, delete "beamperfoming" and insert --beamforming--.

In Column 26, Line 7, delete "beamperfoming" and insert --beamforming--.

In Column 27, Line 28, delete "WTRUs," and insert --WTRUs.--.

In Column 42, Line 30, delete "WRTU" and insert --WTRU--.

In Column 42, Line 31, delete "WRTU," and insert --WTRU,--.

In Column 42, Line 38, delete "WRTUs" and insert --WTRUs--.

In Column 47, Line 61, delete "1x" and insert --1X,--.

In the Claims

In Column 54, replace Lines 18-36, (Claim 1) with --1. A wireless transmit/receive unit (WTRU) for wireless communications, the WTRU comprising:
a memory;
a processor configured to:
detect a Physical Downlink Control Channel (PDCCH) in at least a first beam of one or more beams;
determine downlink control information (DCI) from the detected PDCCH;
determine whether spatial information for a downlink (DL) data channel is indicated in the DCI;

Signed and Sealed this
Eighteenth Day of October, 2022

*Katherine Kelly Vidal*

Katherine Kelly Vidal
*Director of the United States Patent and Trademark Office*

CERTIFICATE OF CORRECTION (continued)
U.S. Pat. No. 10,813,085 B2 determine a receive beam based on the spatial information for the DL data channel on condition that the DCI indicates the spatial information for the DL data channel; and
determine that the receive beam is the first beam on condition that the DCI does not indicate the spatial information for the DL data channel; and
a receiver configured to receive a data transmission over the DL data channel on the determined receive beam.--.

In Column 54, replace Lines 41-43, (Claim 3) with --3. The WTRU of claim 1, wherein the spatial information for the DL data channel is indicated in the DCI based on a DL reference signal (RS).--.

In Column 54, replace Lines 44-56, (Claim 4) with --4. The WTRU of claim 1, wherein the processor is further configured to:
monitor one or more search spaces for at least one of: monitoring one or more DL control channels, or receiving signaling over the one or more DL control channels, at least one search space of the one or more search spaces corresponding to at least one reference signal (RS) of one or more reference signals;
monitor at least a part of a control region for the at least one RS of the one or more reference signals;
detect the at least one RS in the at least part of the control region; and
monitor the at least one search space corresponding to the at least one RS for at least one DL control channel upon the detection of the at least one RS.--.

In Column 54, replace Lines 57-60, (Claim 5) with --5. The WTRU of claim 4, wherein the processor is further configured to monitor the at least one DL control channel based at least in part on the DCI.--.

In Column 54, replace Lines 61-63, (Claim 6) with --6. The WTRU of claim 4, wherein the at least part of the control region is one part of a number of parts of the control region.--.

In Column 54, replace Lines 64-67, (Claim 7) with --7. The WTRU of claim 6, wherein the number of parts of the control region is a function of a number of symbols configured for the control region.--.

In Column 55, replace Lines 1-4, (Claim 8) with --8. The WTRU of claim 4, wherein the one or more search spaces are predefined.--.

In Column 55, replace Lines 5-7, (Claim 9) with --9. The WTRU of claim 4, wherein the at least one RS of the one or more reference signals is at least one of: a beam RS, or an antenna port RS.--.

In Column 55, replace Lines 8-11, (Claim 10) with --10. The WTRU of claim 4, wherein the at least one search space of the one or more search spaces is at least one of: a beam search space, or an antenna port search space.--.

In Column 55, replace Lines 12-15, (Claim 11) with --11 The WTRU of claim 4, wherein the at least one RS in the at least part of the control region is detected upon a strength of the at least one RS crossing a predetermined threshold.--.

In Column 55, replace Lines 16-20, (Claim 12) with --12. The WTRU of claim 1, wherein the DCI comprises a DCI format indicating any of: time resource information for the DL data channel, frequency resource information for the DL data channel, and the spatial information for the DL data channel.--.

In Column 55, replace Lines 21-36, and In Column 56, replace Lines 1-2, (Claim 13) with --13. A method performed by a wireless transmit/receive unit (WTRU) for wireless communications, the method comprising:
detecting a Physical Downlink Control Channel (PDCCH) in at least a first beam of one or more beams;
determining downlink control information (DCI) from the detected PDCCH;
determining whether spatial information for a downlink (DL) data channel is indicated in the DCI;
determining a receive beam based on the spatial information for the DL data channel on condition that the DCI indicates the spatial information for the DL data channel;
determining that the receive beam is the first beam on condition that the DCI does not indicate the spatial information for the DL data channel; and
receiving a data transmission over the DL data channel on the determined receive beam.--.

In Column 56, replace Lines 7-9, (Claim 15) with --15. The method of claim 13, wherein the spatial information for the DL data channel is indicated in the DCI based on a DL reference signal (RS).--.

In Column 56, replace Lines 10-22, (Claim 16) with --16. The method of claim 13, further comprising:
monitoring one or more search spaces for at least one of: monitoring one or more DL control channels, or receiving signaling over the one or more DL control channels, at least one search space of the one or more search spaces corresponding to at least one reference signal (RS) of one or more reference signals;
monitoring at least a part of a control region for the at least one RS of the one or more reference signals;
detecting the at least one RS in the at least part of the control region; and
monitoring the at least one search space corresponding to the at least one RS for at least one DL control channel upon the detection of the at least one RS.--.

In Column 56, replace Lines 23-26, (Claim 17) with --17. The method of claim 16, wherein the monitoring the at least one DL control channel is based at least in part on the DCI.--.

In Column 56, replace Lines 27-29, (Claim 18) with --18. The method of claim 16, wherein the at least part of the control region is one part of a number of parts of the control region.--.

In Column 56, replace Lines 30-33, (Claim 19) with --19. The method of claim 18, wherein the number of parts of the control region is a function of a number of symbols configured for the control region.--.

In Column 56, replace Lines 34-36, (Claim 20) with --20. The method of claim 13, wherein the DCI comprises a DCI format indicating any of: time resource information for the DL data channel, frequency resource information for the DL data channel, and the spatial information for the DL data channel.--.